United States Patent
Narasaki et al.

(10) Patent No.: US 12,427,648 B2
(45) Date of Patent: Sep. 30, 2025

(54) ROBOT WITH CHANGEABLE POSITION OF BODY WITH RESPECT TO A VEHICLE PORTION

(71) Applicant: Mitsubishi Electric Corporation, Tokyo (JP)

(72) Inventors: Shota Narasaki, Tokyo (JP); Noboru Kawaguchi, Tokyo (JP); Hayato Hoshino, Tokyo (JP); Yosuke Tomida, Tokyo (JP); Shingo Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/855,651

(22) PCT Filed: Apr. 27, 2023

(86) PCT No.: PCT/JP2023/016596
§ 371 (c)(1),
(2) Date: Oct. 10, 2024

(87) PCT Pub. No.: WO2023/210730
PCT Pub. Date: Nov. 2, 2023

(65) Prior Publication Data
US 2025/0162149 A1    May 22, 2025

(30) Foreign Application Priority Data
Apr. 27, 2022    (JP) .................. 2022-072938

(51) Int. Cl.
*B25J 5/00*    (2006.01)
*B25J 9/00*    (2006.01)
*B25J 9/10*    (2006.01)

(52) U.S. Cl.
CPC ............... *B25J 5/00* (2013.01); *B25J 9/0009* (2013.01); *B25J 9/0087* (2013.01); *B25J 9/106* (2013.01)

(58) Field of Classification Search
CPC .... B25J 5/00–04; B25J 9/0009; B25J 9/0027; B25J 9/0087; B25J 9/04; B25J 9/041; B25J 9/042; B25J 9/106; B25J 9/162
See application file for complete search history.

(56) References Cited

U.S. PATENT DOCUMENTS

2014/0218854 A1*    8/2014    Onda .................... G06F 1/1681
361/679.06
2019/0240832 A1    8/2019    Kawaguchi et al.

FOREIGN PATENT DOCUMENTS

CN    108127640 A    *    6/2018    .............. B25J 5/007
JP    H11-124298 A    5/1999
(Continued)

OTHER PUBLICATIONS

Greathouse, Roger, "Skully", May 18, 2011, https://www.youtube.com/watch?v=36hFci6fBBQ (Year: 2011).*
(Continued)

*Primary Examiner* — Spencer D Patton
(74) *Attorney, Agent, or Firm* — XSENSUS LLP

(57) ABSTRACT

Robot includes two arms, a body, a vehicle portion, and a body position changing mechanism. Body position changing mechanism includes an elevation angle changing mechanism that supports body such that an elevation angle with respect to a vehicle portion reference plane is changeable, and an azimuth angle changing mechanism that supports elevation angle changing mechanism. Elevation angle changing mechanism includes a moving portion that is moved along a straight line parallel to the vehicle portion reference plane, a first link that includes a lower end connected to moving portion rotatably, extends in a direction (Continued)

forming an elevation angle with the vehicle portion reference plane, and supports body, a second link that includes an upper end connected to first link rotatably, and a link lower end support portion to which a lower end of second link is connected rotatably.

19 Claims, 37 Drawing Sheets

(56) References Cited

FOREIGN PATENT DOCUMENTS

| | | | |
|---|---|---|---|
| JP | 2005-193335 | A | 7/2005 |
| JP | 3944171 | B2 | 7/2007 |
| JP | 4509753 | B2 | 7/2010 |
| JP | 4585132 | B2 | 11/2010 |
| JP | 2021-049633 | A | 4/2021 |
| WO | 2018/074101 | A1 | 4/2018 |

OTHER PUBLICATIONS

International Search Report and Written Opinion mailed on Jul. 4, 2023, received for PCT Application PCT/JP2023/016596, filed on Apr. 27, 2023, 8 pages including English Translation.
Decision to Grant a Patent mailed on May 21, 2024, received for JP Application 2024-518017, 5 pages including English Translation.

* cited by examiner (A)            (B)

ROBOT WITH CHANGEABLE POSITION OF BODY WITH RESPECT TO A VEHICLE PORTION

CROSS-REFERENCE TO RELATED APPLICATIONS

The present application is based on PCT filing PCT/JP2023/016596, filed Apr. 27, 2023, which claims priority from Japanese Application No. 2022-072938, filed Apr. 27, 2022, the entire contents of each are incorporated herein by reference.

TECHNICAL FIELD

The present disclosure relates to a robot that moves using wheels and has two arms.

BACKGROUND ART

A humanoid robot that can walk like a human and can move both arms has been developed (for example, see PTL 1). The humanoid robot is suitable for performing a motion similar to that of a human in a building. However, the humanoid robot is not suitable for working on an outdoor rough terrain. On a rough terrain, it is difficult to walk with two feet. On a rough terrain, it is desirable for the robot to move with wheels, a crawler (caterpillar), or the like.

A robot including two arms and moving with a crawler has been developed (for example, see PTLs 2 to 4). In the conventional robot including two arms and moving with a crawler, the two arms are provided apart from each other. Therefore, it is presumed that it is difficult for the conventional robot including two arms to perform fine work like a human using the two arms.

A robot that moves with a crawler and has two arms in the same arrangement as a human has been developed (for example, see PTL 5).

CITATION LIST

Patent Literature

PTL 1: WO 2018/074101 A
PTL 2: Patent No. 4509753
PTL 3: Patent No. 3944171
PTL 4: Patent No. 4585132
PTL 5: Japanese Patent Laid-Open No. 2021-049633

SUMMARY OF INVENTION

Technical Problem

In the robot described in PTL 5, a body has a six joint configuration, which is the same as that of a general industrial robot. There is a problem in that although the robot described in PTL 5 has a high degree of freedom of posture that can be taken, the robot is expensive and heavy because of the large number of axes and components.

Two link members are connected in series to a body. In a posture in which the height of the robot is lowered, the link members connected to the body are arranged to be folded back. Even if the height of the entire robot is tried to be reduced, the height cannot be reduced much in the robot described in PTL 5. Therefore, the center of gravity of the robot is high, and it is difficult to move the robot at a high speed. In addition, the robot cannot pass through a place where the height is restricted.

An object of the present disclosure is to provide a robot which can make the height of the robot lower than that of the conventional one in a posture in which the height of the robot is lowered.

Solution to Problem

A robot according to the present disclosure includes two arms, a body to which the two arms are connected, a vehicle portion that moves by rotation of wheels, and a body position changing mechanism that supports the body such that the position of the body with respect to the vehicle portion is changeable. The body position changing mechanism includes an elevation angle changing mechanism that supports the body such that an elevation angle, which is an angle formed by a vehicle portion reference plane which is a plane perpendicular to an azimuth axis intersecting the vehicle portion and a direction in which the body extends, is changeable, and an azimuth angle changing mechanism to support the elevation angle changing mechanism rotatably around the azimuth axis, the azimuth angle changing mechanism being provided in the vehicle portion. The elevation angle changing mechanism includes a base that is supported by the azimuth angle changing mechanism, a moving portion that is moved along a straight line parallel to the vehicle portion reference plane on an upper side of the base, a first link that has a lower end connected to the moving portion rotatably, extends in a direction forming the elevation angle with the vehicle portion reference plane, and supports the body, a second link that has an upper end connected to the first link rotatably, and a link lower end support portion to which a lower end of the second link is connected rotatably, the link lower end support portion being provided in the base.

Advantageous Effects of Invention

The robot according to the present disclosure can make the height of the robot lower than that of the conventional one in a posture in which the height of the robot is lowered.

DESCRIPTION OF EMBODIMENTS

First Embodiment

Figure 1:
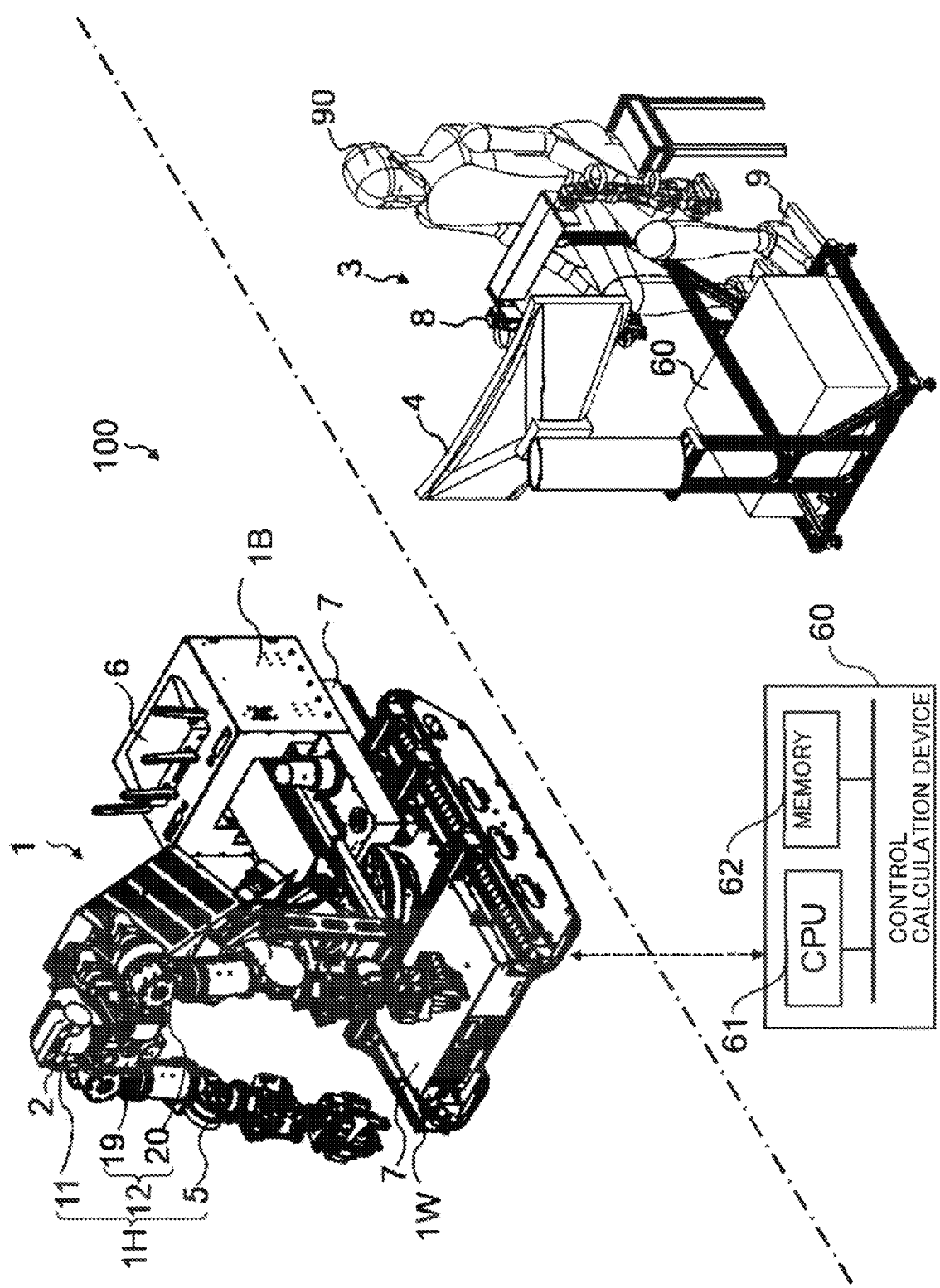
FIG. 1 is a block diagram illustrating a schematic configuration of a robot operation system according to a first embodiment.
Figure 2:
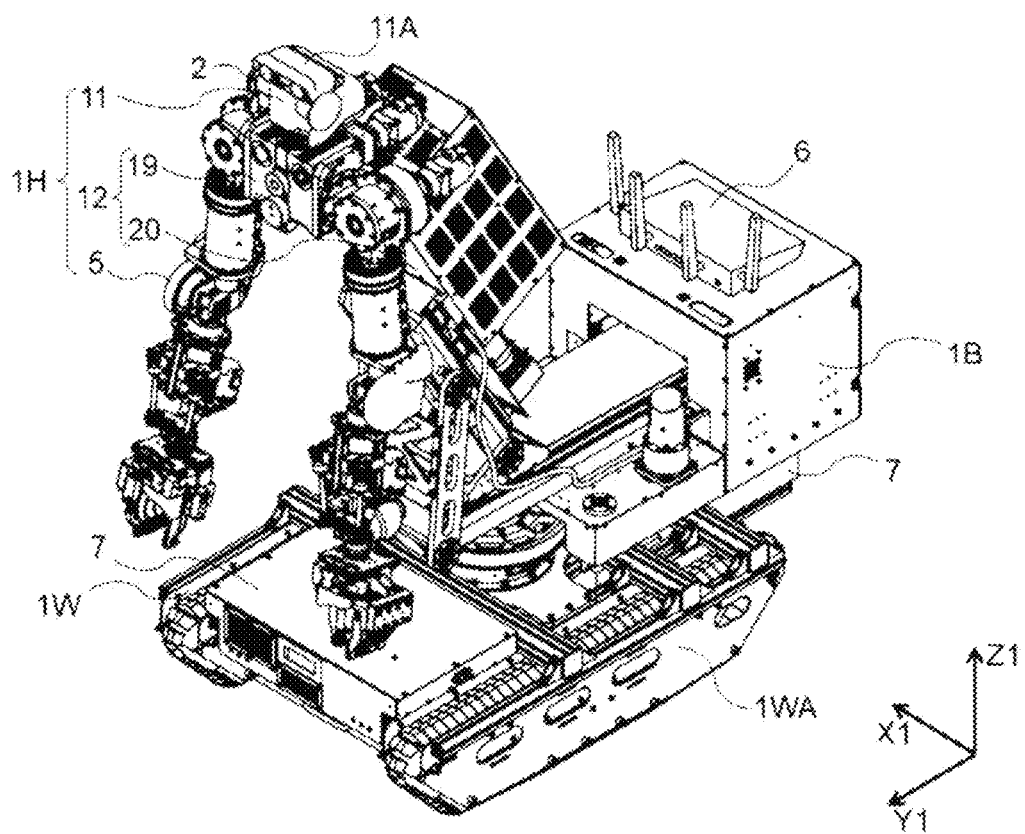
FIG. 2 is a perspective view illustrating a robot operated by the robot operation system according to the first embodiment.

FIG. 1 is a schematic configuration diagram of a robot operation system according to a first embodiment. A robot operation system 100 mainly includes a crawler mobile robot (abbreviated as robot) 1, three on-site cameras 2 mounted on robot 1, an operation device 3, and a display device 4. Robot 1 is a type of robot that has two arms and moves by a crawler (caterpillar). Display device 4 displays an image captured by on-site camera 2. An operator 90 who has grasped the situation of the site by display device 4 operates robot 1 by operation device 3 remotely. Operator 90 is a person who operates robot 1.

Robot 1 includes a vehicle portion 1W, a humanoid 1H, and a body position changing mechanism 1B. Vehicle portion 1W is a vehicle that moves by a crawler. Vehicle portion 1W may be a commercially available product. Humanoid 1H is a robot that includes two arms 5 and a body 12 to which two arms 5 are connected. Body position changing mechanism 1B supports humanoid 1H such that the position of humanoid 1H (body 12) with respect to vehicle portion 1W is changeable. Body position changing mechanism 1B is mounted on the upper surface of vehicle portion 1W.

Body position changing mechanism 1B can change the position of humanoid 1H with respect to vehicle portion 1W with three degrees of freedom. The three degrees of freedom means that the following three angles or length are changeable.

(A) Azimuth angle (AZ angle): An angle that represents which orientation humanoid 1H is directed around an azimuth axis AZ (illustrated in FIG. 29).
(B) Elevation angle (EL angle): An angle formed by the upper surface of vehicle portion 1W and humanoid 1H.
(C) Body length: A distance between the upper surface of vehicle portion 1W and humanoid 1H.

On-site camera 2 includes a right-eye camera $2_R$, a left-eye camera $2_L$, and a wide-angle camera $2_C$. Right-eye camera $2_R$ and left-eye camera $2_L$ are mounted on the upper portion of humanoid 1H. Right-eye camera $2_R$ and left-eye camera $2_L$ capture images that operator 90 views when operating arms 5 remotely. Right-eye camera $2_R$ and left-eye camera $2_L$ capture images as seen when operator 90 is present at the position where humanoid 1H is present. When robot operation system 100 includes a stereoscopic display device, the images captured by right-eye camera $2_R$ and left-eye camera $2_L$ can be presented to operator 90 as a three dimensional image. Wide-angle camera $2_C$ is mounted at the front center of vehicle portion 1W. Wide-angle camera $2_C$ can capture images of the surroundings of 360 degrees. The image captured by wide-angle camera $2_C$ is used for operator 90 to grasp the surrounding environment of robot 1. Display device 4 displays images captured by any of right-eye camera $2_R$, left-eye camera $2_L$, and wide-angle camera $2_C$ in a switching manner in response to an instruction from operator 90 or automatically.

Robot 1 is mounted with a battery 7 serving as a power source. Robot 1 and operation device 3 communicate with each other wirelessly. Robot 1 is also mounted with a wireless communication device 6. Robot 1 does not have a power cord or a communication line for communication. Therefore, robot 1 can move with less restriction.

Operation device 3 includes an input device, which is used by operator 90 to input an operation instruction, and a control calculation device 60. Operator 90 inputs the operation instruction through the input device. The operation instruction is an instruction inputted by operator 90 on a motion of each part included in robot 1. Examples of the operation instruction include raising the right hand, moving forward, and the like. A signal that operates robot 1 actually is a control signal generated from the operation instruction. The control signal is a signal that operates robot 1 actually, setting a length of an actuator to, for example, 30 cm, or rotating a servomotor of shoulder joint by 30 degrees, for example. The actuator, the servomotor of the shoulder joint, and the like are controlled by the control signal. The control signal is generated from the operation instruction. Control calculation device 60 generates the control signal from the operation instruction inputted to the input device by operator 90. Control calculation device 60 controls robot 1 based on the operation instruction.

Operator 90 sits on a chair and operates robot 1 using feet and hands. Operation device 3 includes an upper body input device 8, a mode switching pedal 9, and a foot operation input device (not illustrated) as input devices that inputs the operation instruction. Upper body input device 8 is used to input the operation instruction to the left and right arms 5 included in humanoid 1H. Upper body input device 8 is operated by operator 90 with hands to input the operation instruction. Mode switching pedal 9 is operated by the foot of operator 90 to change an input mode of upper body input device 8. The foot operation input device is used to input the operation instruction to vehicle portion 1W and body position changing mechanism 1B. The foot operation input device is operated by the foot of operator 90 to input the operation instruction.

Control calculation device 60 generates the control signal that operates robot 1 from the operation instruction inputted by operator 90 through the input device. A place where operator 90 is present is called an operation center.

Control calculation device 60 is implemented by an electronic computer including a CPU 61, a memory 62, and the like. Memory 62 stores programs to be executed in CPU 61 and data. The data includes data used for processing, data obtained as a result of processing, and the like. Memory 62 is a semiconductor memory such as a flash memory and a hard disk. Memory 62 includes a volatile storage device and a non-volatile storage device.

With reference to FIGS. 2 to 15, a structure of robot 1 is described. FIGS. 2 to 8 are a perspective view, a front view, a right side view, a rear view, a left side view, a plan view, and a bottom view of entire robot 1. FIGS. 9 to 15 are a perspective view, a front view, a right side view, a rear view, a left side view, a plan view, and a bottom view of body position changing mechanism 1B. A state in which robot 1 takes the posture illustrated in FIGS. 2 to 15 is referred to as reference state.

Robot 1 includes vehicle portion 1W, humanoid 1H, and body position changing mechanism 1B. Humanoid 1H includes two arms 5, ahead 11, and body 12. Vehicle portion 1W is a type of vehicle that moves by a crawler. Vehicle portion 1W includes the crawler, as included in a small power shovel.

Crawler moving portions 13 are provided on the left and right of vehicle portion 1 W. The right side is referred to as crawler moving portion 13R, and the left side is referred to as crawler moving portion 13L. When the left and right are not specified, each of them is referred to as crawler moving portion 13. Similarly, other two left and right components included in vehicle portion 1 W are described with the suffix R Or L or without the suffix. Crawler moving portion 13 includes driven wheels (not illustrated) and a crawler 15 that is wound around wheels 14. Vehicle portion 1 W moves by the rotation of wheels. In wheels, for example, five axle wheels are arranged in a front-rear direction. Crawler 15 is formed in a ring shape in which metal plates are connected. When wheels rotate, crawler 15 also is rotated. Crawler 15 is in contact with the ground or the like. As crawlers 15 rotate while contacting the ground or the like, vehicle portion 1 W moves. Because the crawlers are in contact with the ground or the like, vehicle portion 1 W can move even if there is unevenness on the ground or the like. Left and right crawler moving portions 13R, 13L move independently of each other. For example, right crawler moving portion 13R can be moved forward, and left crawler moving portion 13L can be moved backward.

Vehicle portion 1W includes side covers 1WA covering the side surfaces of crawler moving portions $13_R$ and $13_L$. Battery 7 is mounted on vehicle portion 1W. Battery 7 is a power source that drives robot 1. Battery 7 is mounted between crawler moving portions $13_R$, $13_L$ on the front side and on a platform which protrudes to the rear of vehicle portion 1W. Battery 7 on the front side also includes a device for charging.

Body position changing mechanism 1B includes a vehicle connector 16, a slide mechanism 17, and an expansion mechanism 18. Vehicle connector 16 enables body position changing mechanism 1B and humanoid 1H to be rotated around azimuth axis AZ (illustrated in FIG. 29) with respect to vehicle portion 1W. Slide mechanism 17 changes and maintains an angle (referred to as elevation angle or EL angle) formed by body 12 and the upper surface of vehicle portion 1W. Expansion mechanism 18 changes the position of body 12 with respect to slide mechanism 17. Expansion mechanism 18 supports body 12.

Arm 5 has a shape similar to that of a human arm. Arm 5 includes a hand 26 corresponding to a human hand. A structure of arm 5 is described later. Two arms 5 are connected to the left and right of the upper portion of body 12 rotatably. Body 12 and two arms 5 have the same positional relationship and the same size as those of human body and human arms. Accordingly, robot 1 can perform fine work similar to that performed by a human. The position of body 12 with respect to vehicle 1W is changed by body position changing mechanism 1B.

Head 11 is mounted with right-eye camera $2_R$ and left-eye camera $2_L$. The orientations of right-eye camera $2_R$ and left-eye camera $2_L$ is changeable in the right-left direction and the up-down direction. Head 11 includes ahead cover 11A. Head cover 11A is divided into a part covering right-eye camera $2_R$ and left-eye camera $2_L$ and a remaining part. The part of head cover 11A that covers right-eye camera $2_R$ and left-eye camera $2_L$ is moved with right-eye camera $2_R$ and left-eye camera $2_L$.

Body 12 includes an arm connector 19 and a control board container 20. Two arms 5 are connected to arm connector 19. Control board container 20 is connected to expansion mechanism 18. Control board container 20 contains a control board that drives a motor included in arm 5. Control board container 20 has a rectangular parallelepiped outer shape. Control board container 20 has mesh portions on side surfaces of the housing so that air can easily enter and exit for cooling. I-lead 11 and arm connector 19 are connected to an upper end surface of control board container 20. Control board container 20 is arranged in parallel to expansion mechanism 18. Arm connector 19 is connected to control board container 20 such that the upper surface of arm connector 19 forms an angle of about 30 degrees with respect to the upper end surface of control board container 20.

With reference to FIGS. 9 to 15, the structure of body position changing mechanism 1B is described. Body position changing mechanism 1B includes vehicle connector 16, slide mechanism 17, and expansion mechanism 18. Vehicle connector 16 supports body position changing mechanism 1B and humanoid 1H such that they are rotatable around azimuth axis AZ with respect to vehicle portion 1 W. Vehicle connector 16 includes a vehicle-side fixing portion 16A, a vehicle-side pulley 16B, a rotation-side base 16C, a slide mechanism base 16D, a drive mechanism container 16E, a bearing (not illustrated), a drive belt 16G, a motor 16H, a drive gear 16J, and a moving-side pulley 16K.

Vehicle-side fixing portion 16A is fixed to vehicle portion 1W. Vehicle-side fixing portion 16A is a member having a cylindrical outer shape. Vehicle-side pulley 16B is a disc-shaped member having teeth on a side surface thereof. Vehicle-side pulley 16B is provided on the upper side of vehicle-side fixing portion 16A. The side surface of vehicle-side pulley 16B is engaged with drive belt 16G. Drive belt 16G is an annular belt provided with teeth on the outer side and the inner side. The outer teeth of drive belt 16G mesh with the teeth of vehicle-side pulley 16B. The inner teeth of drive belt 16G mesh with the teeth of drive gear 16J. As drive gear 16J is rotated, drive belt 16O is moved around vehicle-side pulley 16B.

Vehicle-side fixing portion 16A having a cylindrical shape and vehicle-side pulley 16B having a disc shape are provided such that their central axes coincide with each other. Vehicle-side pulley 16B may be formed integrally with vehicle-side fixing portion 16A. Vehicle-side pulley 16B formed separately from vehicle-side fixing portion 16A may be attached to vehicle-side fixing portion 16A. The central axis of vehicle-side fixing portion 16A and vehicle-side pulley 16B is azimuth axis AZ. Vehicle-side fixing portion 16A and vehicle-side pulley 16B are provided with a rotation-side holding hole (not illustrated) having a cylindrical internal space from the upper surface side of vehicle portion 1 W. The rotation-side holding hole exists through vehicle-side pulley 16B. The central axis of the rotation-side holding hole coincides with azimuth axis AZ.

Rotation-side base 16C, slide mechanism base 16D, and drive mechanism container 16E are portions that are rotated around azimuth axis AZ. Rotation-side base 16C is supported rotatably by vehicle-side fixing portion 16A and vehicle-side pulley 16B. Rotation-side base 16C is a member having a cylindrical outer shape. Slide mechanism base 16D is provided on the upper side of rotation-side base 16C. Slide mechanism base 16D is a member on which slide mechanism 17 is provided. Slide mechanism base 16D includes a rectangular parallelepiped outer shape with a low height with respect to the width and the length. Slide mechanism base 16D can also be said to be a thick plate. Drive mechanism container 16E contains the mechanism that rotates rotation-side base 16C and the like. The mechanism that rotates rotation-side base 16C and the like includes drive belt 16G, drive gear 16J, and the like. Drive mechanism container 16E also contains a drive circuit board that drives motor 16H. Drive mechanism container 16E is a member having a rectangular parallelepiped outer shape. Drive mechanism container 16E does not have a bottom surface, and the lower side of drive mechanism container 16E is open. Drive mechanism container 16E is provided on the lower side of slide mechanism base 16D. Slide mechanism base 16D is connected to rotation-side base 16C. Even when rotation-side base 16C is rotated, the positional relationship between slide mechanism base 16D and rotation-side base 16C is not changed. Drive mechanism container 16E is connected to slide mechanism base 16D. Even when rotation-side base 16C is rotated, the positional relationship between drive mechanism container 16E and slide mechanism base 16D is not changed. In slide mechanism 17, slide mechanism base 16D is a base supported by vehicle connector 16.

Rotation-side base 16C is inserted into the rotation-side holding hole. A bearing is provided between vehicle-side fixing portion 16A and rotation-side base 16C, and enables rotation-side base 16C to be rotated with respect to vehicle-side fixing portion 16A with less friction.

Vehicle-side pulley 16B, drive belt 16G, motor 16H, drive gear 16J, and moving-side pulley 16K rotate rotation-side base 16C and the like. Motor 16H generates power that rotates rotation-side base 16C and the like. Drive gear 16J is connected directly to the rotation shaft of motor 16H. When motor 16H is rotated, drive gear 16J is rotated. Drive belt 16G is wound around drive gear 16J and two moving-side pulleys 16K. Annular drive belt 16G is pressed against the side surface of vehicle-side pulley 16B. The inner circumferential surface of drive belt 16G is provided with teeth which mesh with the teeth of drive gear 16J. The outer circumferential surface of drive belt 16G is provided with teeth which mesh with the teeth of vehicle-side pulley 16B. When drive gear 16J is rotated, drive belt 16G is moved. As drive belt 16G is moved, drive gear 16J and drive mechanism container 16E is rotated around vehicle-side pulley 16B. Because drive mechanism container 16E is connected to rotation-side base 16C and slide mechanism base 16D, rotation-side base 16C and slide mechanism base 16D also are rotated around vehicle-side pulley 16B. Because the central axis of vehicle-side pulley 16B is azimuth axis AZ, rotation-side base 16C and slide mechanism base 16D are rotated around azimuth axis AZ.

Slide mechanism 17 is the mechanism that changes the angle (elevation angle) of a first link 17A that supports body 12 with respect to the upper surface of vehicle portion 1W. Slide mechanism 17 includes first link 17A, a slide-moving member 17B, a second link 17C, a rail 17D, a rail holder 17E, a screw rod 17F, a nut 17G, a motor 171H, a drive mechanism container 17J, and a protective plate 17K. First link 17A is a member that supports body 12 with expansion mechanism 18 interposed therebetween. First link 17A is a member having a thick plate shape. Slide-moving member 17B or second link 17C is moved or rotated to change the elevation angle of first link 17A. Slide-moving member 17B supports the lower end of first link 17A. Slide-moving member 17B is moved on the upper side of slide mechanism base 16D in the direction in which slide mechanism base 16D extends.

Slide-moving member 17B is divided into two members, that is, upper and lower members. Protective plate 17K passes between the two members of slide-moving member 17B. Upper slide-moving member 17B which is above protective plate 17K supports the lower end side of the side surfaces of first link 17A rotatably. The upper slide-moving member 17B has a shape in which two substantially triangular members sandwiching the side surfaces of first link 17A are connected by two connection members. In other words, the shape of upper slide-moving member 17B is like a square cylinder with a low height extending in a direction perpendicular to slide mechanism base 16D. Two side surfaces in the direction in which slide mechanism base 16D extends are two substantially triangular members. Two substantially triangular members support the side surface of first link 17A near the lower end from both sides rotatably. A lower member of slide-moving member 17B is connected to a lower side of each member having a substantially triangular shape when viewed from the side. The lower member of slide-moving member 17B has a shape of a plate provided in parallel to the upper surface of slide mechanism base 16D. The lower member of slide-moving member 17B is moved along rail 17D.

One end of second link 17C is connected to slide mechanism base 16D rotatably. The other end of second link 17C is connected to the upper portion of first link 17A rotatably. Second link 17C has a shape in which two link portions 17CA are connected by a connector 17CB. Each link portion 17CA has an outer shape like a thick plate member. The main surface of link portion 17CA has a shape in which both ends of a rectangle are replaced with semicircles. Connector 17CB is connected to the front side surfaces of two link portions 17CA. Connector 17CB has a shape in which two diagonal frames are connected to a frame having a rectangular outer shape.

A place where one end of second link 17C is connected to slide mechanism base 16D rotatably is referred to as vehicle-side link attaching unit J1. Vehicle-side link attaching unit J1 includes a structure in which a shaft member is held rotatably by a bearing. Two vehicle-side link attaching units J1 are provided corresponding to two link portions 17CA. A place where the lower end of first link 17A is connected to slide-moving member 17B rotatably is referred to as moving member attaching unit J2. A place where the other end of second link 17C is connected to first link 17A rotatably is referred to as moving-side link attaching unit J. Moving member attaching unit J2 and moving-side link attaching unit J3 have a structure similar to vehicle-side link attaching unit J1.

Vehicle-side link attaching unit J1 is a link lower end support portion provided in slide mechanism base 16D, to which the lower end of second link 17C is connected rotatably. Moving member attaching unit J2 is a connection point with slide-moving member 17B in first link 17A. Moving-side link attaching unit J3 is a connection point with second link 17C in first link 17A.

When slide-moving member 17B is moved, second link 17C and first link 17A are rotated, and the elevation angle of first link 17A is changed. When the lower end of slide-moving member 17B is moved in a direction away from azimuth axis AZ, the elevation angle of first link 17A is decreased. When the lower end of slide-moving member 17B is moved in a direction approaching azimuth axis AZ, the elevation angle of first link 17A is increased.

First link 17A is supported at its lower end by slide-moving member 17B. First link 17A is supported by second link 17C at the position of moving-side link attaching unit J3. In first link 17A, a portion between moving member attaching unit J2 and moving-side link attaching unit J3 is referred to as supported portion. Moving member attaching unit J2 is a place where first link 17A and slide-moving member 17B are connected rotatably.

Slide-moving member 17B is a moving portion that is moved along a straight line parallel to the upper surface of vehicle portion 1W above slide mechanism base 16D. First link 17A has a lower end connected to slide-moving member 17B rotatably. First link 17A extends in a direction forming an elevation angle with the upper surface of vehicle portion 1W. The elevation angle is an angle formed by the direction in which body 12 extends and the upper surface of vehicle portion 1W. First link 17A supports body 12 with expansion mechanism 18 interposed therebetween. Second link 17C has an upper end (one end) connected to first link 17A rotatably. Vehicle-side link attaching unit J1 is located below a straight line along which slide-moving member 17B is moved.

Rail 17D and rail holder 17E regulate the movement of slide-moving member 17B only in the direction in which slide mechanism base 16D extends. Two rails 17D are provided in parallel on the side surface of slide mechanism base 16D. Rail 17D is a rod-shaped member having a cross section in which two rectangles are stacked. Of the two rectangles, the rectangle farther from slide mechanism base 16D is wider. Rail holder 17E has a cross-sectional shape that surrounds the wide rectangle of rail 17D. Two rail holders 17E are provided for each rail 17D at positions near both ends of the lower surface of slide-moving member 17B in the direction orthogonal to rail 17D. Two rail holders 17E are provided on the same straight line corresponding to rail 17D. There is a suitable spacing between rail holders 17E and rail 17D.

Screw rod 17F, nut 17G, and motor 17H move slide-moving member 17B. Screw rod 17F is provided in parallel to rail 17D at the center in the width direction on the upper side of slide mechanism base 16D. Both ends of screw rod 17F are fixed to the upper surface of slide mechanism base 16D. Nut 17G is fixed to the bottom surface of slide-moving member 17B. Nut 170 has a screw hole provided with a female screw that is engaged with screw rod 17F. Screw rod 17F passes through the screw hole of nut 17G. Screw rod 17F is fixed to the upper surface of slide mechanism base 16D in a state where screw rod 17F passes through the screw hole of nut 17G. Motor 17H is provided to be connected directly to screw rod 17F. When motor 171H is rotated, screw rod 17F also is rotated. When screw rod 17F is rotated, nut 17G cannot be rotated, and nut 171-H and slide-moving member 17B is moved. Protective plate 17K is provided to protect screw rod 17F and the like. Protective plate 17K is a thin plate member provided in parallel to the upper surface of slide mechanism base 16D.

Drive mechanism container 17J contains motor 17H and a drive circuit board that drives a motor of expansion mechanism 18. Drive mechanism container 17J has a rectangular parallelepiped outer shape. Drive mechanism container 17J is connected to an end of slide mechanism base 16D on a side far from azimuth axis AZ. The position of the bottom surface of drive mechanism container 17J in the height direction is substantially the same as the position of the bottom surface of drive mechanism container 16E.

Expansion mechanism 18 moves control board container 20 with respect to first link 17A. Expansion mechanism 18 has a structure similar to the mechanism that moves slide-moving member 17B in slide mechanism 17. Expansion mechanism 18 includes an expansion moving member 18A, a rail 18B, a rail holder 18C, a screw rod 18D, a nut 18E, a motor 18F, a drive mechanism container 18G, a protective plate 18H, and a cable 18J. Expansion moving member 18A supports control board container 20.

Expansion moving member 18A is moved in the direction in which first link 17A extends with respect to first link 17A. Expansion moving member 18A is moved most of the length of first link 17A. Expansion moving member 18A is moved, and thereby, the distance (body length) from the lower end of first link 17A to arm connector 19 is changed. The definition of the body length is described later. Expansion moving member 18A is a body support portion that supports body 12 and is supported by the first link. Expansion mechanism 18 enables expansion moving member 18A to be moved along first link 17A.

Expansion moving member 18A has a shape of square cylinder. The cross section of expansion moving member 18A orthogonal to the direction in which expansion moving member 18A extends is a rectangle whose height is smaller than its width. Expansion moving member 18A is substantially as wide as first link 17A and is about 45% as long as first link 17A. Protective plate 18H that protects screw rod 18D and the like passes through the inside of expansion moving member 18A. Protective plate 18H is a thin plate member provided in parallel to the upper surface of first link 17A. The bottom surface of control board container 20 is connected to expansion moving member 18A. In FIGS. 9 to 15, expansion moving member 18A is illustrated in a state where a part connected to control board container 20 is removed.

Rail 18B and rail holder 18C regulate the movement of expansion moving member 18A only in the direction in which first link 17A extends. Two rails 18B are provided in parallel to the side surface of first link 17A. Rail 18B is a rod-shaped member having a cross section in which two rectangles are stacked. Of the two rectangles, the rectangle farther from first link 17A is wider. Rail holder 18C has a cross-sectional shape that surrounds the wide rectangle of rail 18B. Two rail holders 18C are provided for each rail 18B. Two rail holders 18C are provided on the same straight line corresponding to rail 18B. Rail holder 18C is provided on the lower surface of expansion moving member 18A. Two rail holders 18C are provided respectively at positions close to both ends in the direction in which expansion moving member 18A extends. There is a suitable spacing between the side surface or the bottom surface of rail holder 18C and rail 18B.

Screw rod 18D, nut 18E, motor 18F, and drive mechanism container 18G move expansion moving member 18A. Screw rod 18D is provided in parallel to rail 18B at the center in the width direction on the upper side of first link 17A. Both ends of screw rod 18D are fixed to the upper surface of first link 17A. Nut 18E is fixed to the bottom surface of expansion moving member 18A. Nut 18E has a screw hole provided with a female screw that is engaged with screw rod 18D. Screw rod 18D passes through the screw hole of nut 18E.

Screw rod 18D is fixed to the upper surface of first link 17A in a state where screw rod 18D passes through the screw hole of nut 18E. Motor 18F generates power that rotates screw rod 18D. When motor 18F is rotated, screw rod 18D is rotated. Drive mechanism container 18G contains the mechanism that transmits the rotation of motor 18F to screw rod 18D. When screw rod 18D is rotated, nut 18E cannot be rotated, and nut 18F and expansion moving member 18A are moved.

Drive mechanism container 18G is provided perpendicular to first link 17A at the lower end of first link 17A. Drive mechanism container 18G has a rectangular parallelepiped outer shape. Motor 18F is provided perpendicular to the upper surface of drive mechanism container 18G. Motor 18F is provided at the center in the width direction of the upper surface of drive mechanism container 18O at an end thereof farther from first link 17A.

A hole for housing motor 18F is provided on the bottom surface of control board container 20 such that motor 18F does not interfere with control board container 20 when expansion moving member 18A and control board container 20 are moved to a position close to drive mechanism container 18G.

Cable 18J transmits a current driving motor 18F generated in the circuit board contained in drive mechanism container 17J to expansion mechanism 18. In addition, images captured by right-eye camera $2_R$ and left-eye camera $2_L$ are also transmitted via cable 18J. The images are transmitted to a remote control device 3 through wireless communication by communication device 6 via a device arranged inside drive mechanism container 17J.

The size of robot 1 is as follows. The height from the lower end of vehicle portion 1W to the upper end of head 11 is about 1.6 m at the maximum. Vehicle portion 1W is about 1.3 m long in the front-rear direction. The minimum width of arm connector 19 and arms 5 is about 0.55 m. In the posture in which the height is the lowest, the height is about 1.1 m. The weight of humanoid 1H and body position changing mechanism 1B is about 200 kg, and the weight of entire robot 1 is about 330 kg. In a state where arms 5 are extended horizontally, an object weighing about 5 kg can be held with one hand and an object weighing about 10 kg can be held with two hands. In a state where arms 5 are extended vertically downward, an object weighing about 10 kg can be held with one hand and an object weighing about 20 kg can be held with two hands. Humanoid 1H can be moved with an object being held.

Three types of orthogonal coordinate systems are used to express the posture of robot 1. The three types of orthogonal coordinate systems are a first orthogonal coordinate system, a second orthogonal coordinate system, and a third orthogonal coordinate system. The first orthogonal coordinate system is defined by using vehicle portion 1W as a reference. The second orthogonal coordinate system is defined to be rotated around azimuth axis AZ together with body position changing mechanism 1B. The third orthogonal coordinate system is defined by using arm connector 19 as a reference.

The first orthogonal coordinate system defined by using vehicle portion 1W as a reference is defined as follows. The first orthogonal coordinate system expresses the positions of body position changing mechanism 1B and humanoid 1H with respect to vehicle portion 1W, X1-axis: An axis parallel to a right-left direction of vehicle portion 1W.
Y1-axis: An axis parallel to the front-rear direction of vehicle portion 1W.
Z1-axis: An axis parallel to a height direction of vehicle portion 1W. The Z1-axis coincides with azimuth axis AZ.

The X1-axis, the Y1-axis, and the Z1-axis are orthogonal to each other. An intersection of the Z1-axis and the upper surface of vehicle portion 1W is set to be an origin of the first orthogonal coordinate system. The right side is defined as the positive direction of the X1-axis, the front side is defined as the positive direction of the Y1-axis, and the upper side is defined as the positive direction of the Z1-axis. The X1-axis and the Y1-axis are parallel to the upper surface of vehicle portion 1W. The Z1-axis is orthogonal to the upper surface of vehicle portion 1W. The upper surface of vehicle portion 1W is referred to as vehicle portion reference plane. The vehicle portion reference plane is perpendicular to azimuth axis AZ intersecting vehicle portion 1W. The vehicle portion reference plane is also an X1Y1-plane.

The second orthogonal coordinate system that rotates around azimuth axis AZ together with body position changing mechanism 1B is defined as follows. The operation of slide mechanism 17 and expansion mechanism 18 is described using the second orthogonal coordinate system.

X2-axis: An axis parallel to the tipper surface of vehicle portion 1W and orthogonal to the direction in which slide mechanism 17 extends.
Y2-axis: An axis parallel to the upper surface of vehicle portion 1W and parallel to the direction in which slide mechanism 17 extends.
Z1-axis: The axis parallel to the height direction of vehicle portion 1W.

The X2-axis, the Y2-axis, and the Z1-axis are orthogonal to each other. An origin of the second orthogonal coordinate system is the same as the origin of the first orthogonal coordinate system. In the reference state, the X1-axis and the X2-axis, and the Y1-axis and the Y2-axis coincide with each other, respectively. The direction toward the side where drive mechanism container 17J is provided is defined as the negative direction of the Y2-axis.

The third orthogonal coordinate system defined by using arm connector 19 as a reference is defined as follows. The third orthogonal coordinate system expresses the position of arm 5 with respect to arm connector 19.

X3-axis: A rotation axis passing through two places where two arms 5 are connected to arm connector 19.
Y3-axis: An axis orthogonal to the X3-axis and the Z3-axis.
Z3-axis: An axis perpendicular to the upper surface of arm connector 19.

The X3-axis, the Y3-axis, and the Z3-axis are orthogonal to each other. The origin of the third orthogonal coordinate system is the midpoint of a line segment connecting two places where two arms 5 are connected to arm connector 19. The X3-axis, the Y3-axis, and the Z3-axis pass through the origin. The right side of arm connector 19 is the positive direction of the X3-axis, the front side of an connector 19 is the positive direction of the Y3-axis, and the upper side of arm connector 19 is the positive direction of the Z3-axis. The X3-axis is parallel to the X2-axis. In the reference state, the Y3-axis is parallel to the Y2-axis, and the Z3-axis is parallel to the Z1-axis. The Z3-axis forms an angle of about 30 degrees with respect to the direction in which first link 17A extends.

Figure 3:
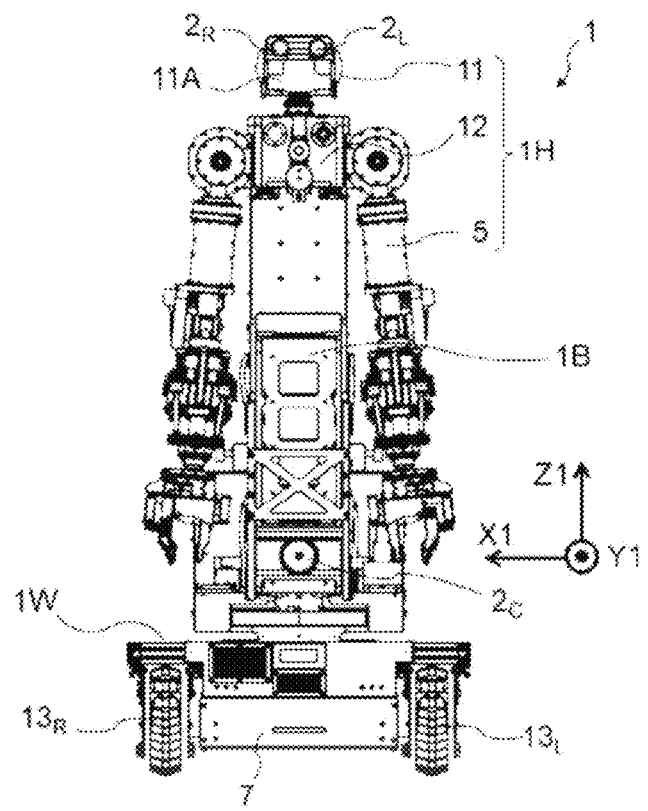
FIG. 3 is a front view illustrating the robot operated by the robot operation system according to the first embodiment.
Figure 4:
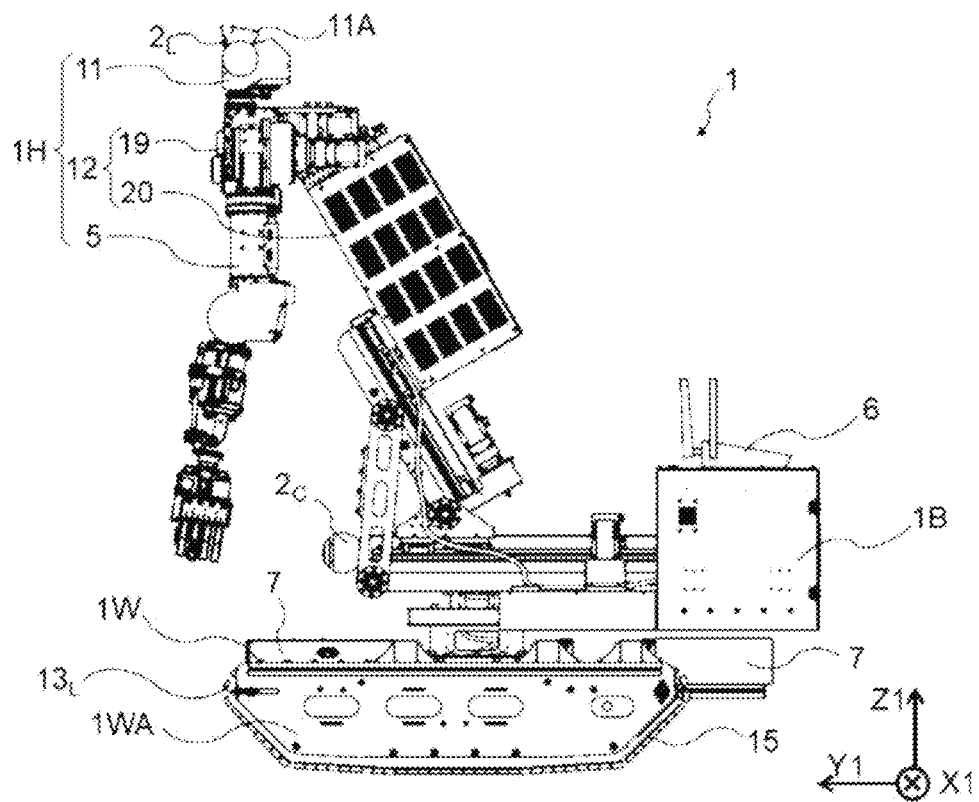
FIG. 4 is a right side view illustrating the robot operated by the robot operation system according to the first embodiment.
Figure 5:
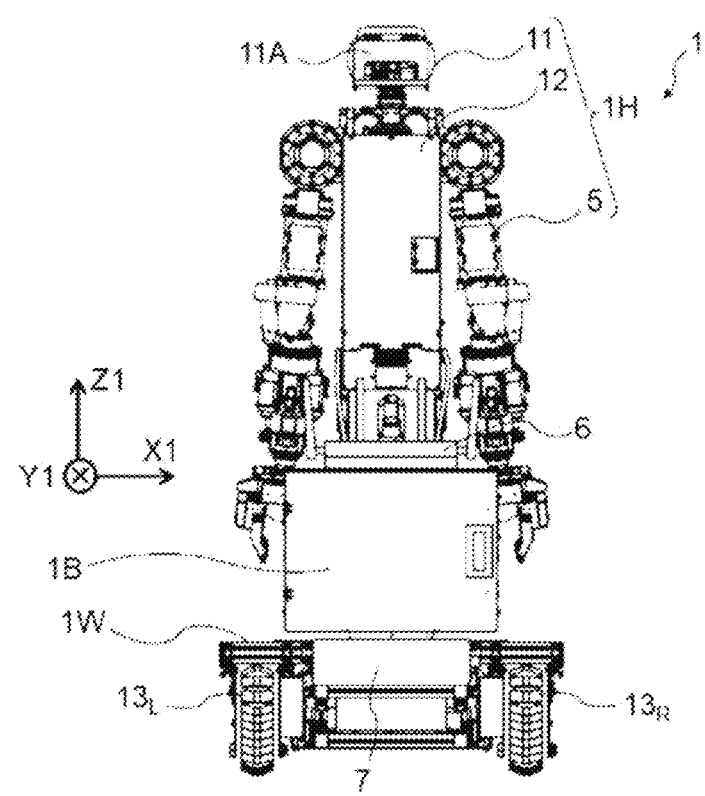
FIG. 5 is a rear view illustrating the robot operated by the robot operation system according to the first embodiment.
Figure 6:
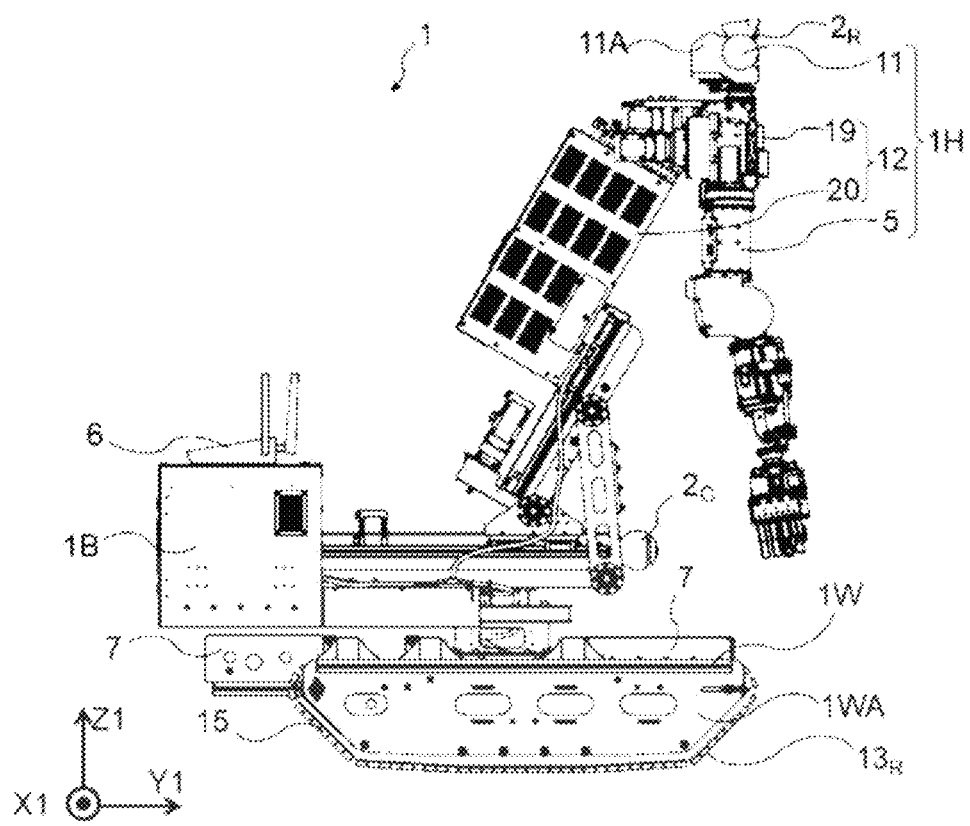
FIG. 6 is a left side view illustrating the robot operated by the robot operation system according to the first embodiment.
Figure 7:
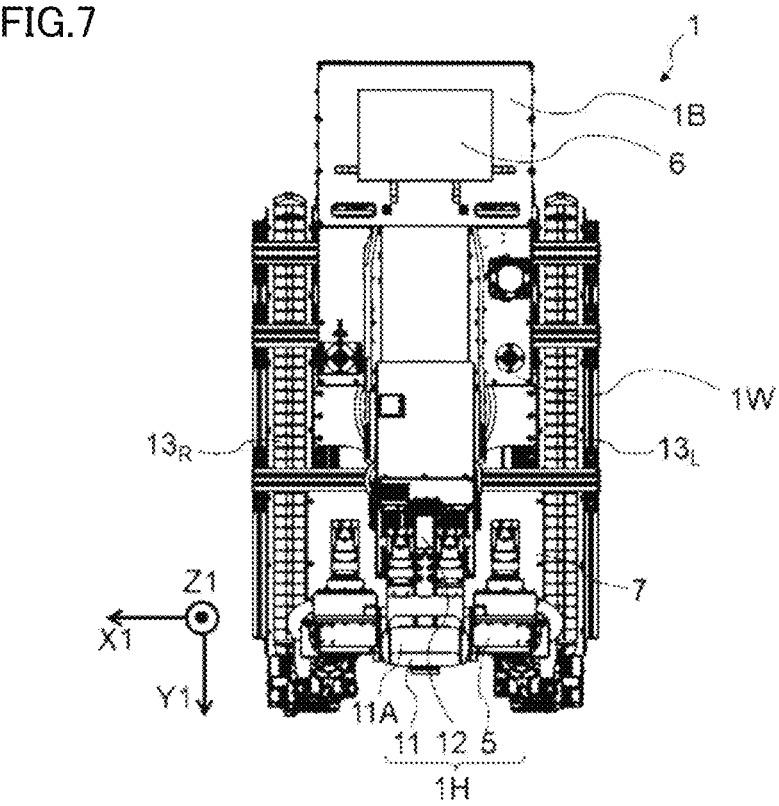
FIG. 7 is a plan view illustrating the robot operated by the robot operation system according to the first embodiment.
Figure 8:
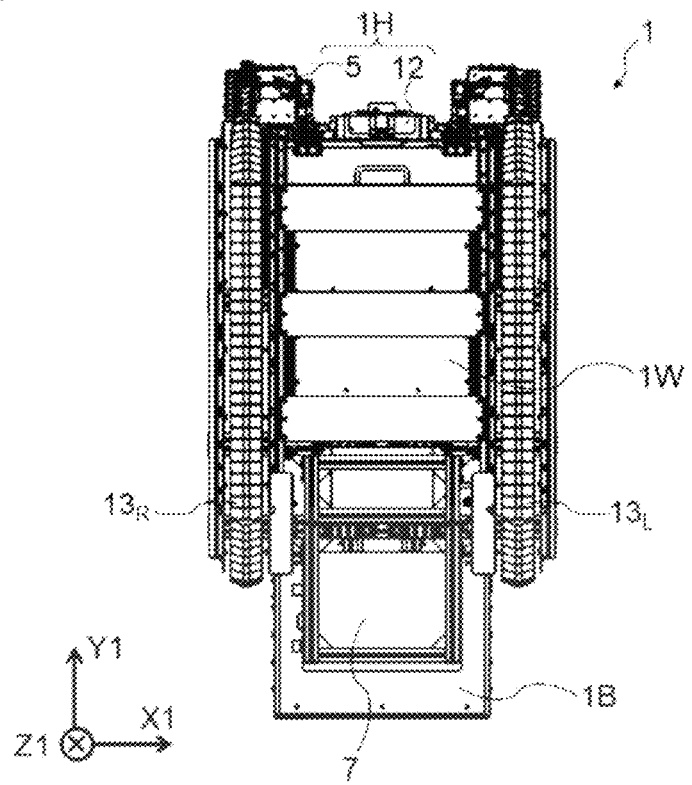
FIG. 8 is a bottom view illustrating the robot operated by the robot operation system according to the first embodiment.
Figure 9:
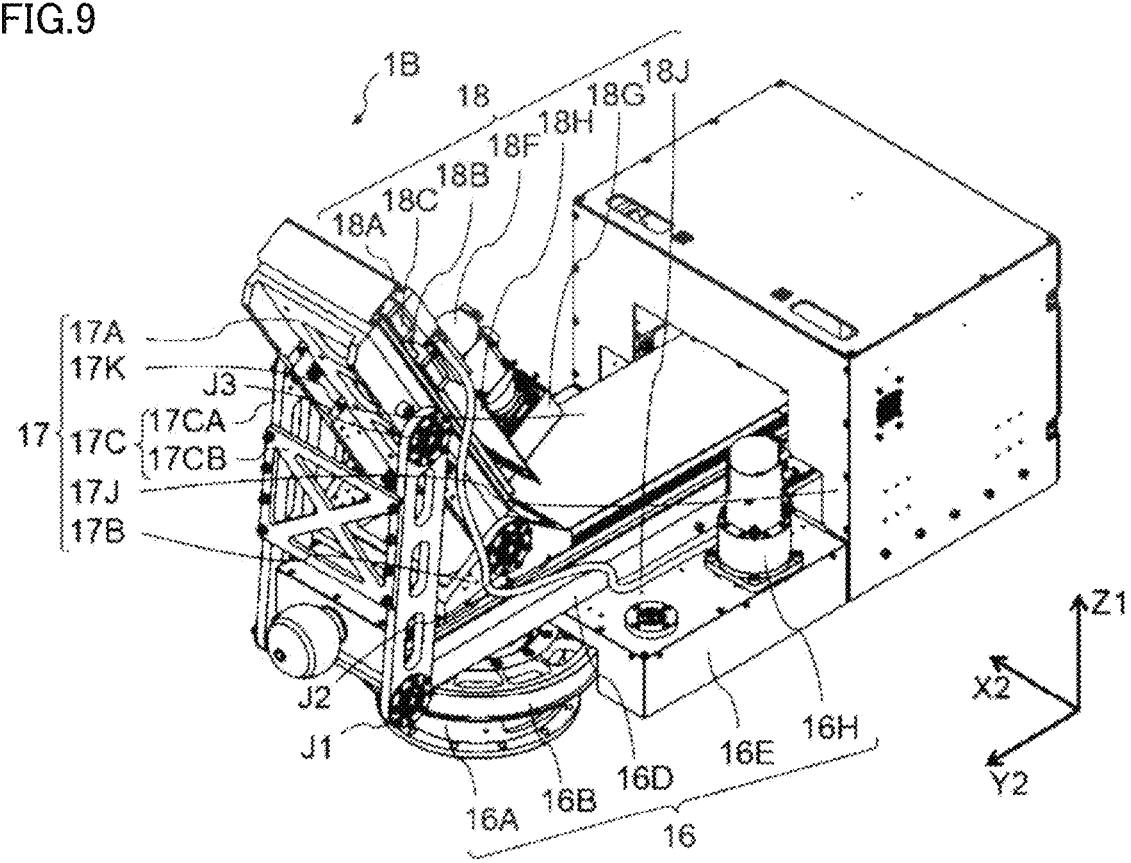
FIG. 9 is a perspective view illustrating a body position changing mechanism included in the robot operated by the robot operation system according to the first embodiment.
Figure 10:
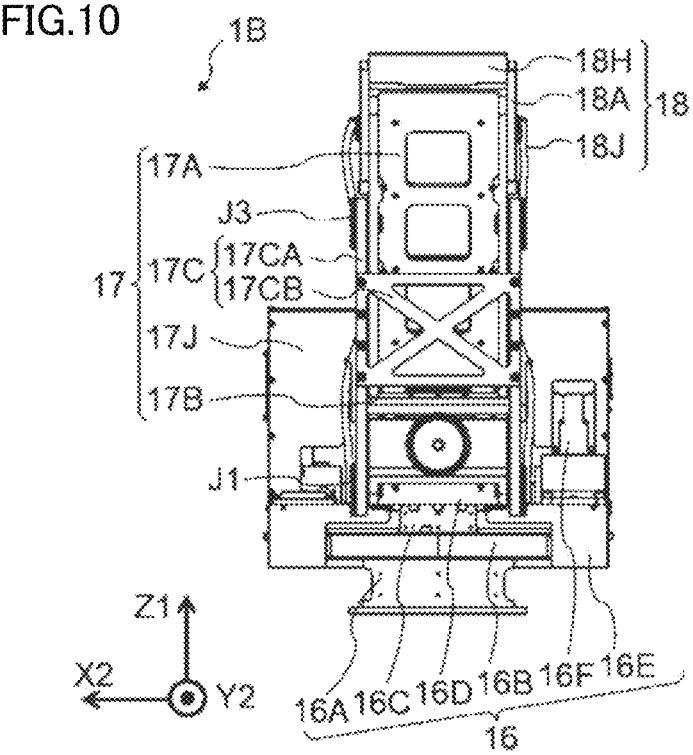
FIG. 10 is a front view illustrating the body position changing mechanism included in the robot operated by the robot operation system according to the first embodiment.
Figure 11:
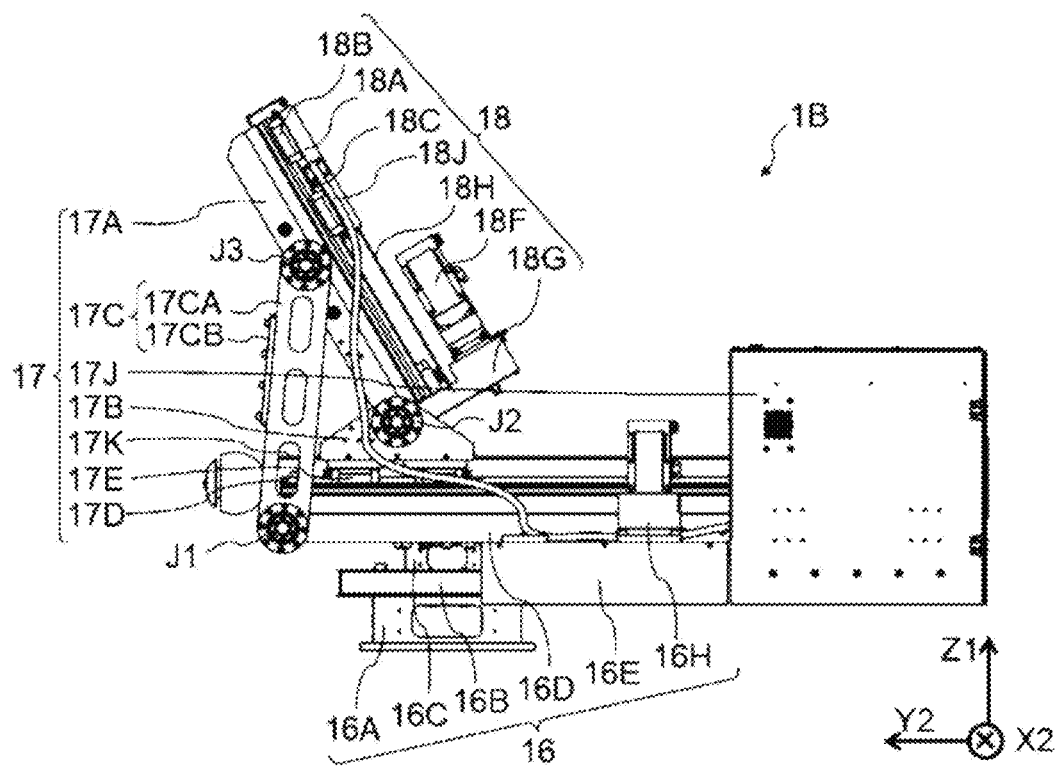
FIG. 11 is a right side view illustrating the body position changing mechanism included in the robot operated by the robot operation system according to the first embodiment.
Figure 12:
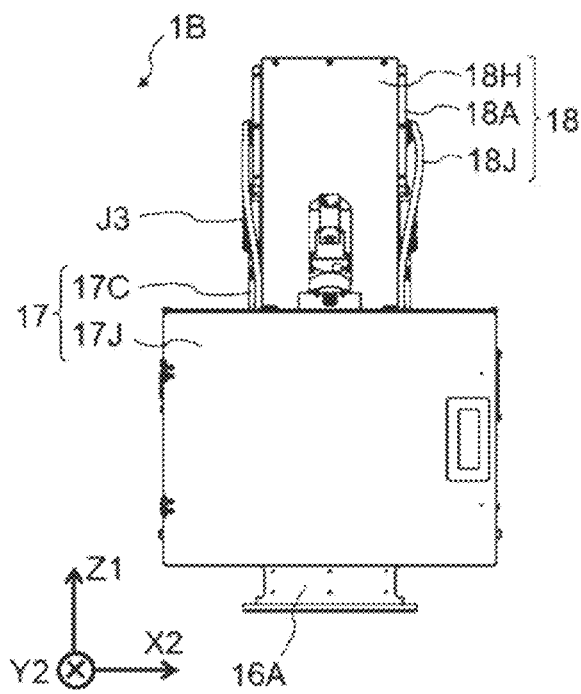
FIG. 12 is a rear view illustrating the body position changing mechanism included in the robot operated by the robot operation system according to the first embodiment.
Figure 13:
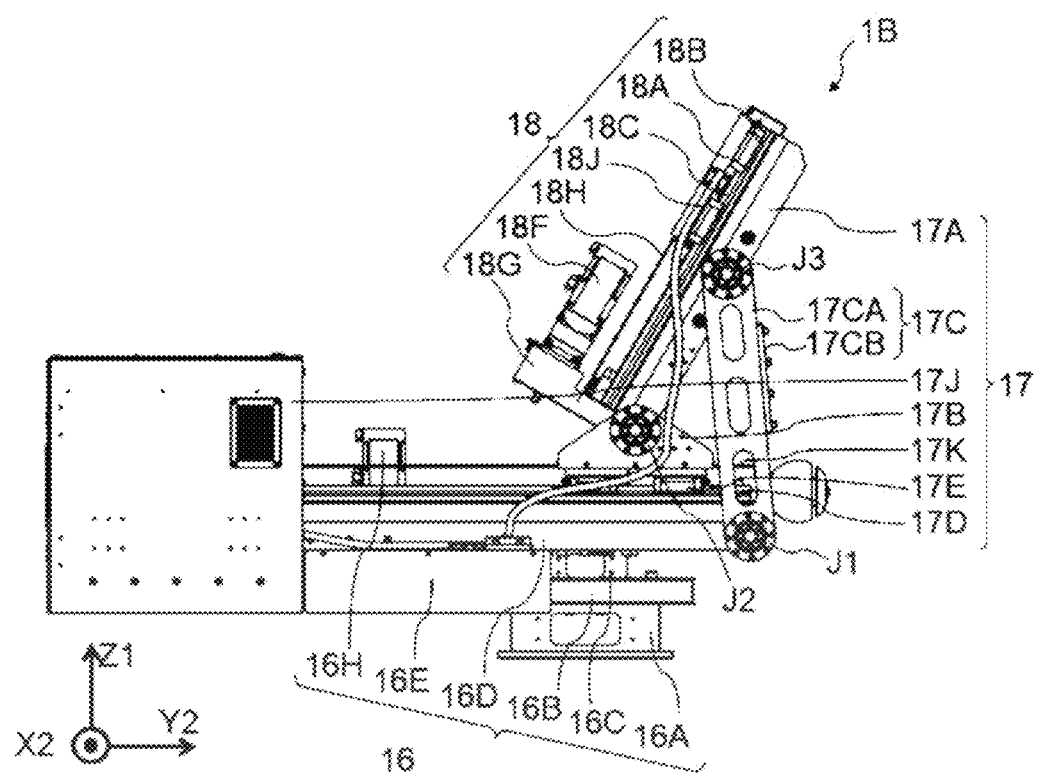
FIG. 13 is a left side view illustrating the body position changing mechanism included in the robot operated by the robot operation system according to the first embodiment.
Figure 14:
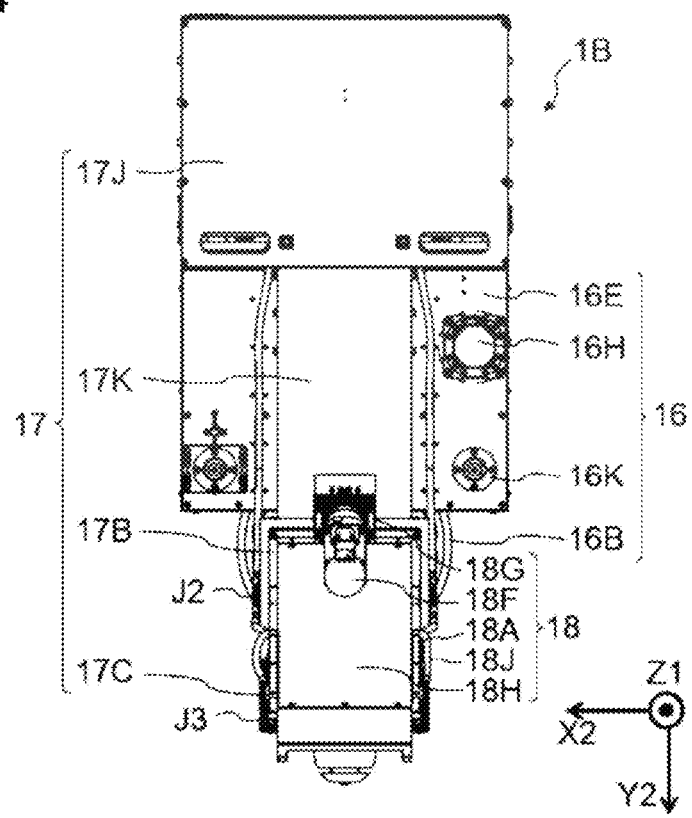
FIG. 14 is a plan view illustrating the body position changing mechanism included in the robot operated by the robot operation system according to the first embodiment.
Figure 15:
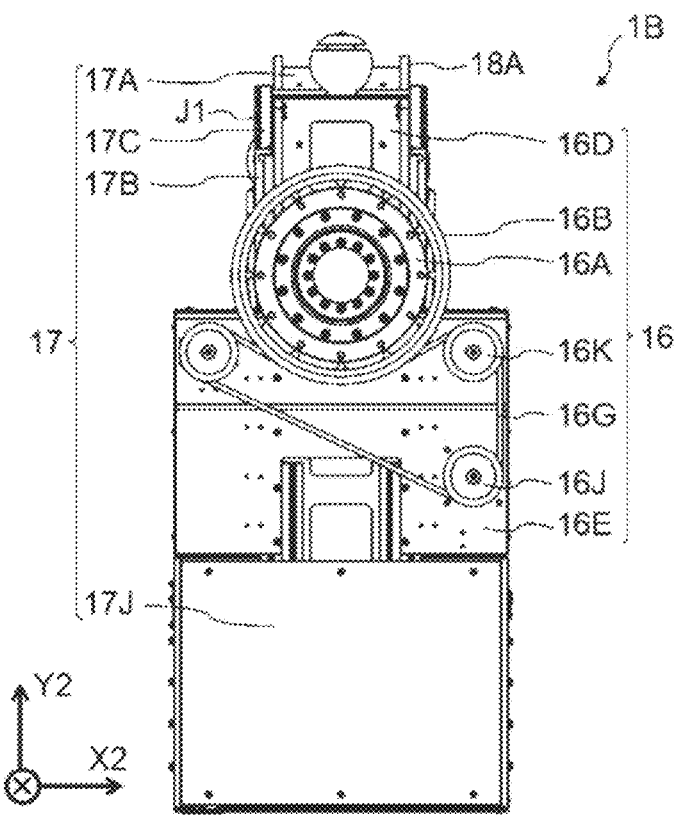
FIG. 15 is a bottom view illustrating the body position changing mechanism included in the robot operated by the robot operation system according to the first embodiment.
Figure 16:
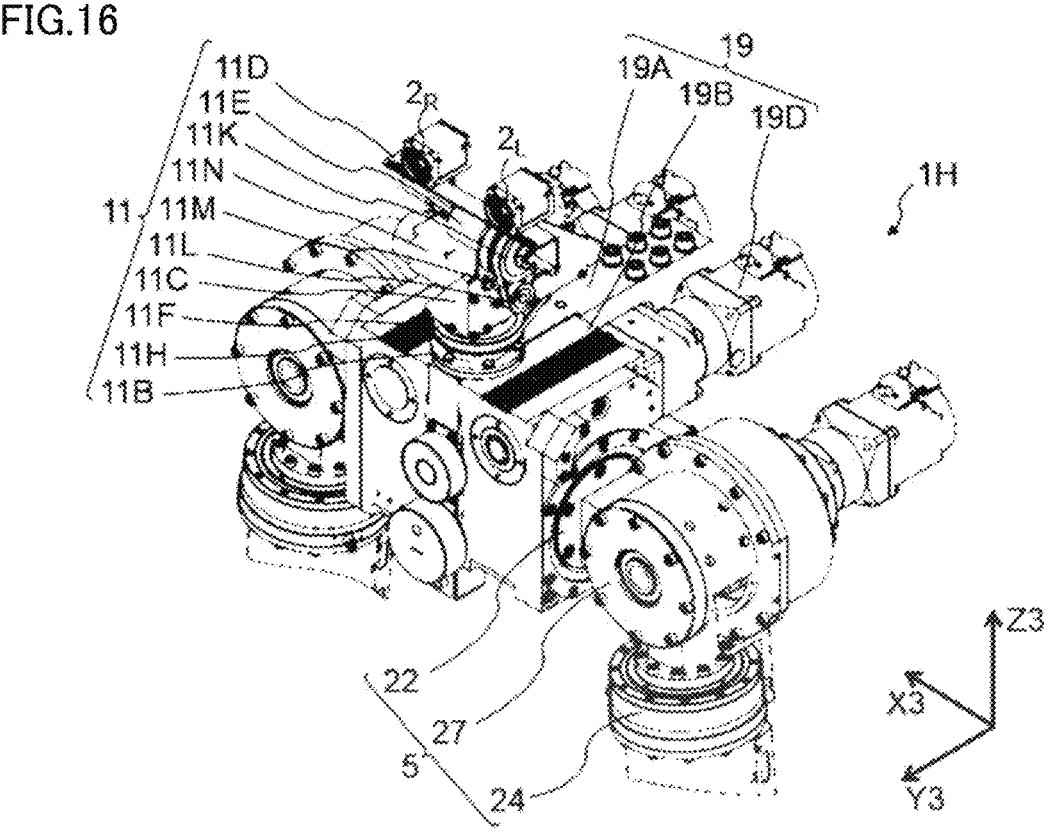
FIG. 16 is an enlarged perspective view illustrating a head included in the robot operated by the robot operation system according to the first embodiment in a state where a head cover is removed.
Figure 17:
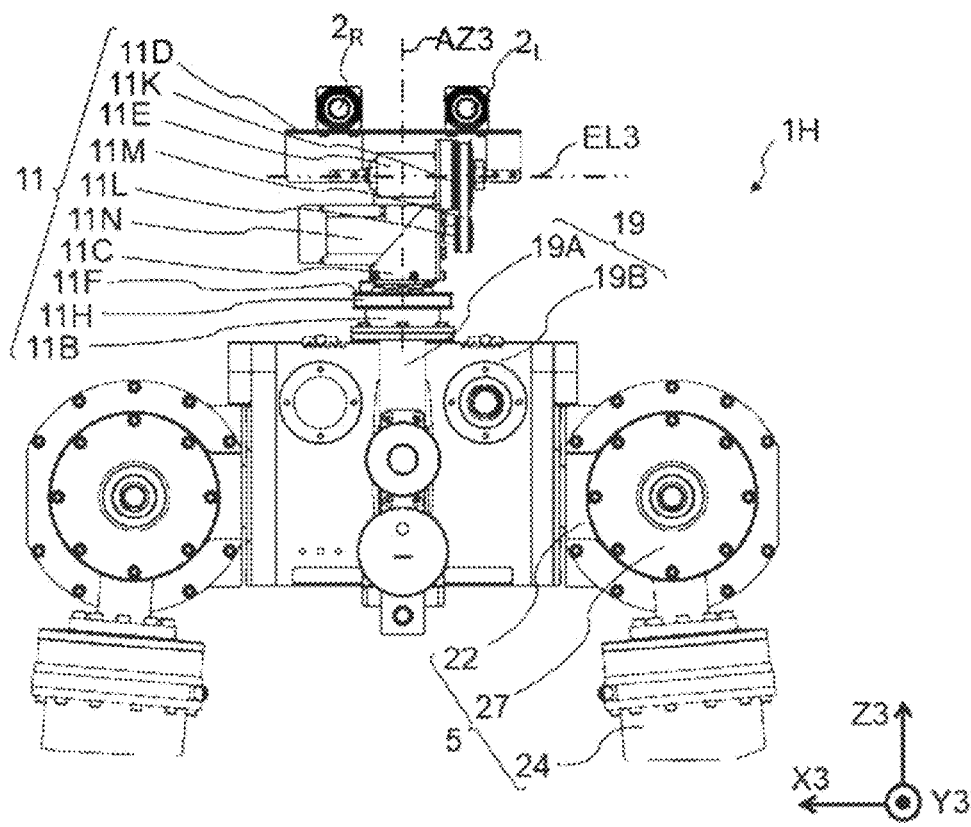
FIG. 17 is an enlarged front view illustrating the head included in the robot operated by the robot operation system according to the first embodiment in the state where the head cover is removed.
Figure 18:
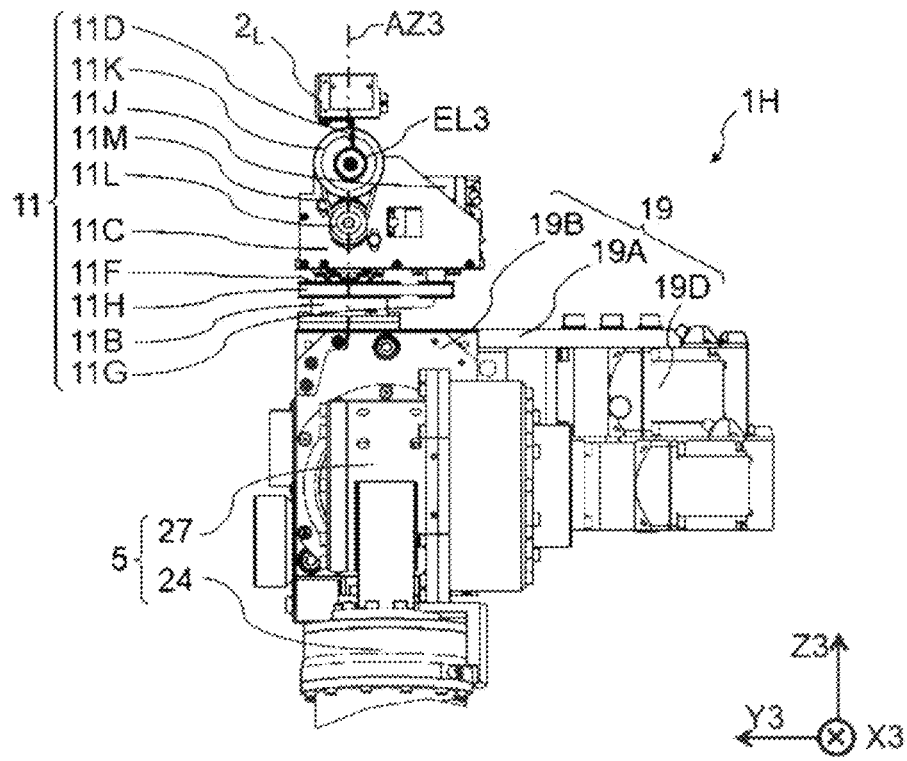
FIG. 18 is an enlarged right side view illustrating the head included in the robot operated by the robot operation system according to the first embodiment in the state where the head cover is removed.
Figure 19:
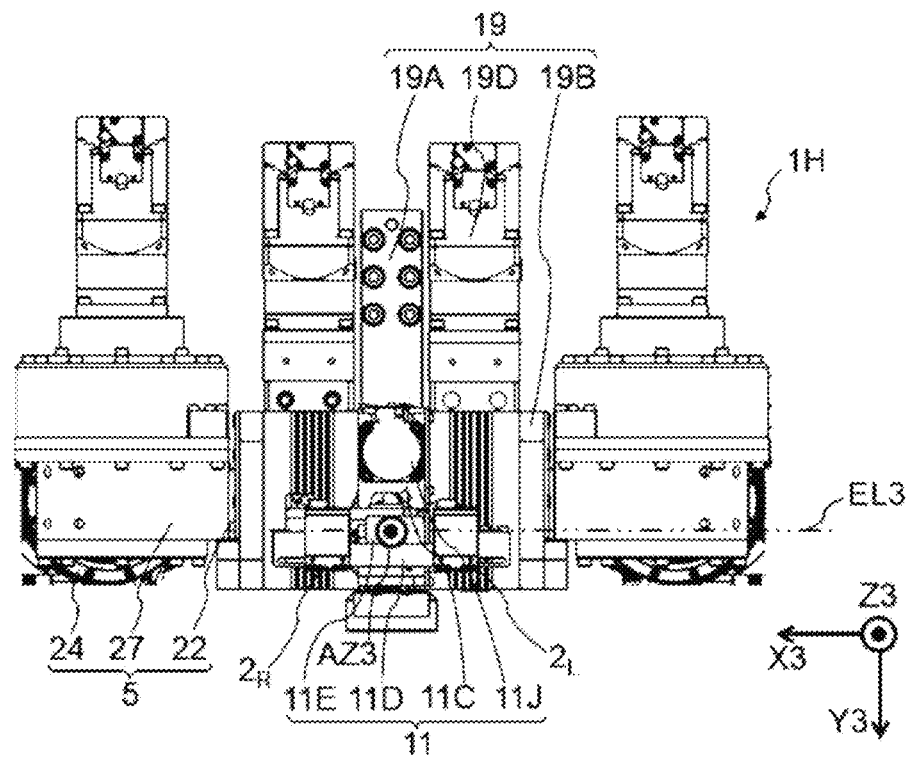
FIG. 19 is an enlarged plan view illustrating the head included in the robot operated by the robot operation system according to the first embodiment in the state where the head cover is removed.
Figure 20:
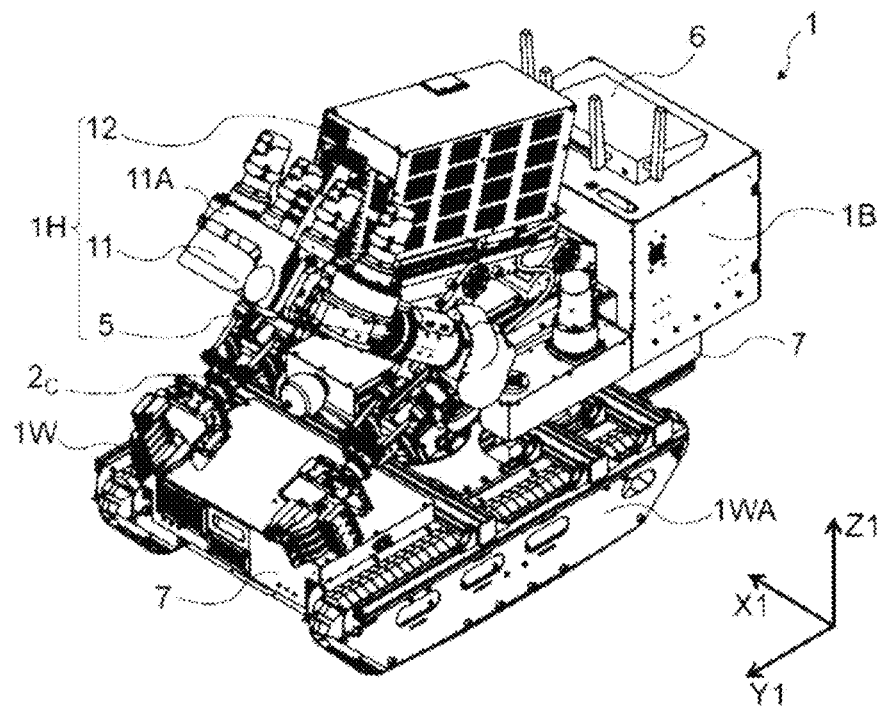
FIG. 20 is a perspective view illustrating the robot operated by the robot operation system according to the first embodiment in another posture 1.
Figure 21:
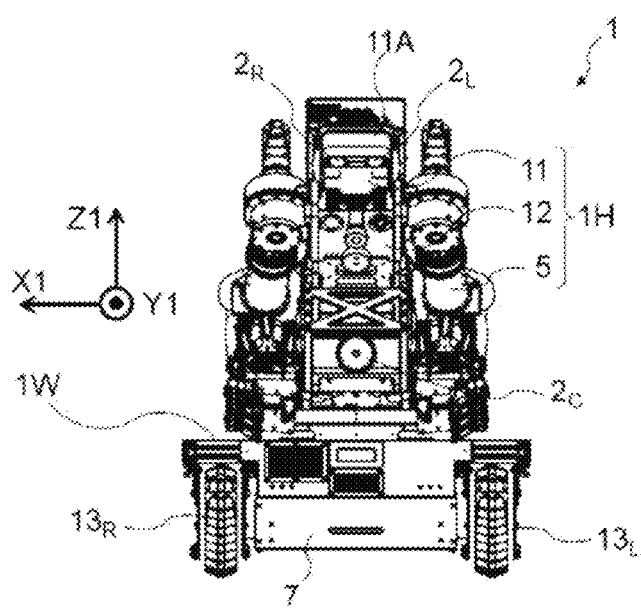
FIG. 21 is a front view illustrating the robot operated by the robot operation system according to the first embodiment in the other posture 1.
Figure 22:
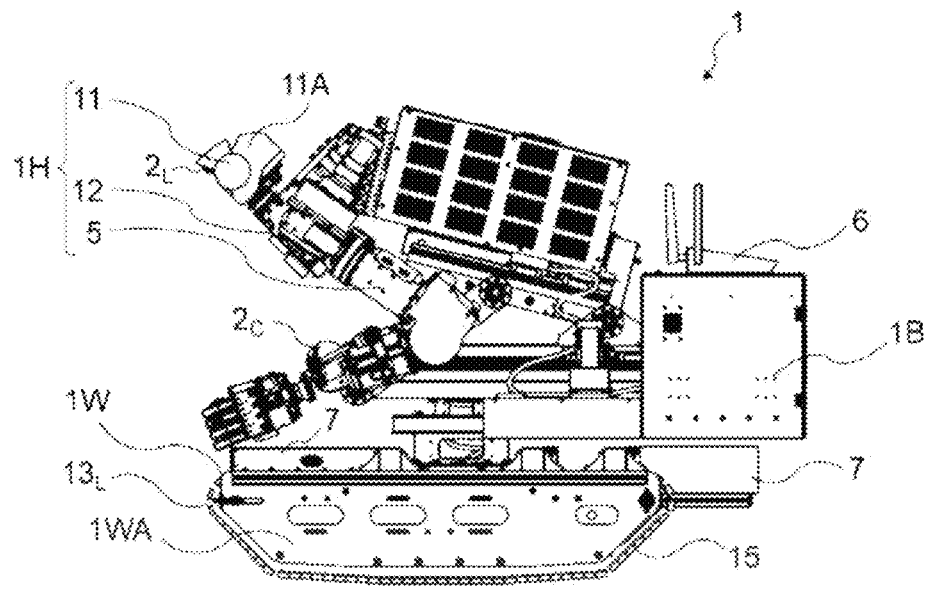
FIG. 22 is a right side view illustrating the robot operated by the robot operation system according to the first embodiment in the other posture 1.
Figure 23:
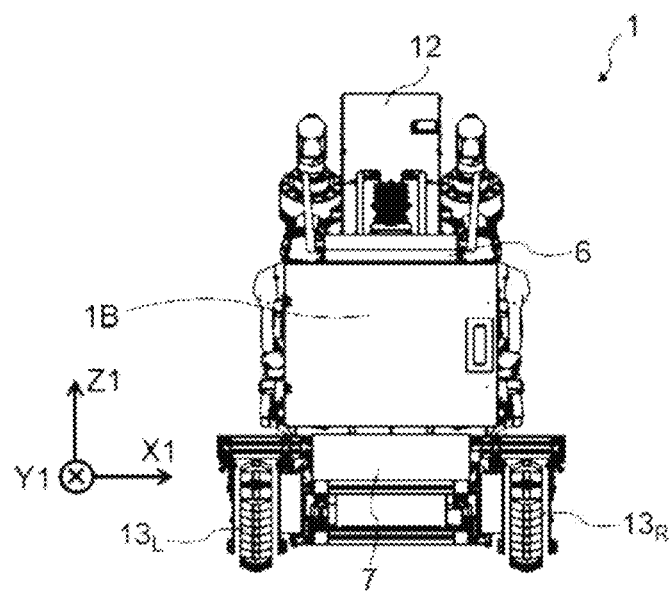
FIG. 23 is a rear view illustrating the robot operated by the robot operation system according to the first embodiment in the other posture 1.
Figure 24:
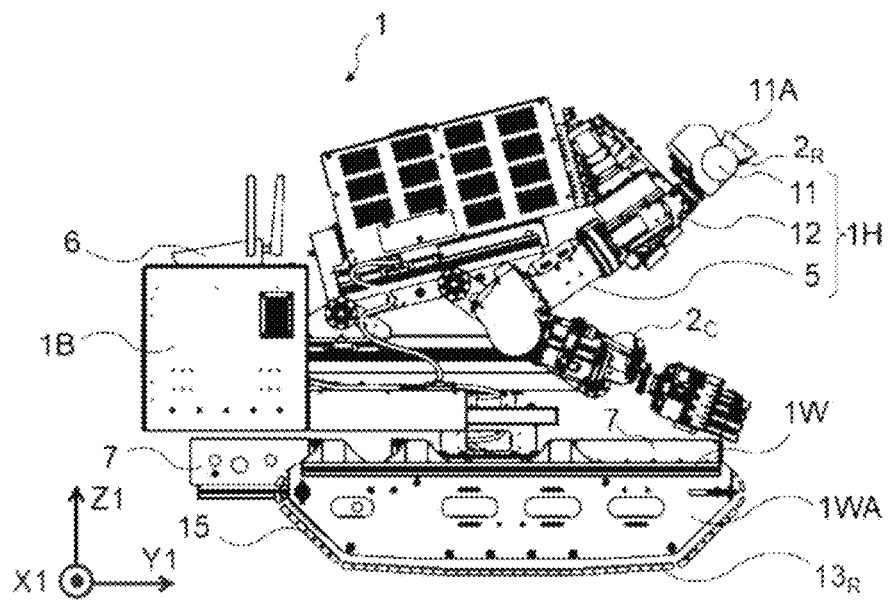
FIG. 24 is a left side view illustrating the robot operated by the robot operation system according to the first embodiment in the other posture 1.
Figure 25:
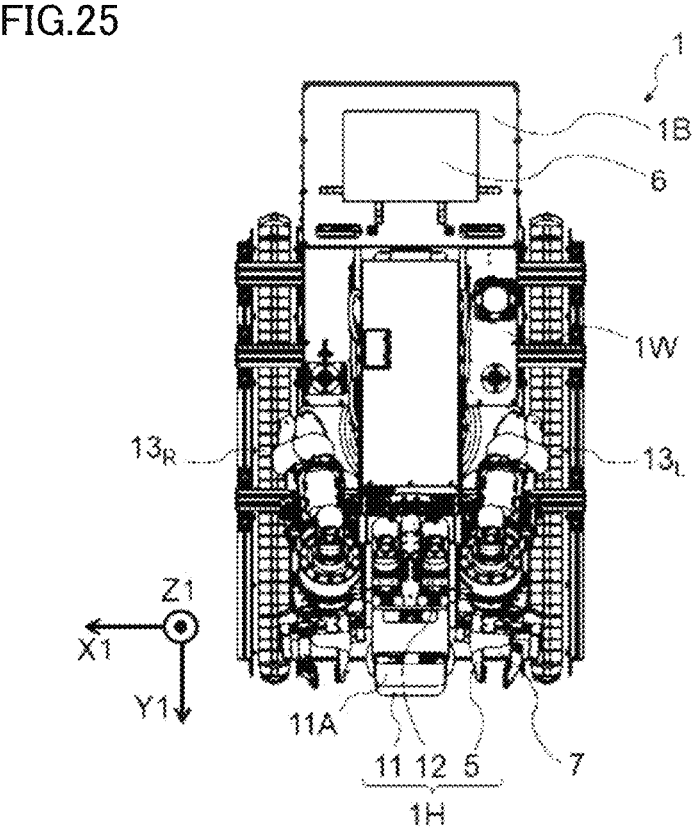
FIG. 25 is a plan view illustrating the robot operated by the robot operation system according to the first embodiment in the other posture 1.

The description of the structure of humanoid 1H is continued. As illustrated in FIG. 3 and the like, head 11 is connected to the upper side of body 12 (arm connector 19). Head 11 is a part that supports right-eye camera $2_R$ and left-eye camera $2_L$ rotatably around an AZ3-axis and an EL3-axis. The AZ3-axis is a rotation axis parallel to the Z3-axis. The EL3-axis is a rotation axis parallel to an X3Y3-plane. The AZ3-axis and the EL3-axis are orthogonal to each other. The AZ3-axis and the EL3-axis are illustrated in FIG. 16 and the like.

Head 11 includes head cover 11A. FIGS. 16 to 19 are a perspective view, a front view, a right side view, and a plan view of humanoid 1H, which are enlarged views of the vicinity of head 11 in a state where head cover 11A is removed. Head 11 includes head cover 11A, a body connector 11B, a neck 11C, a camera holder 11D, an elevation angle shaft bearing 11E, a pulley 11F, a drive pulley 11G, a drive belt 11H, a motor 11J, a pulley 11K, a drive pulley 11L, a drive belt 11M, and a motor 11N. Head cover 11A is a cover that protects the mechanism of head 11 and prevents the mechanism from being seen from the outside. Body connector 11B is a cylindrical member connected to the upper surface of arm connector 19. Body connector 11B is fixed to the upper surface of arm connector 19. Body connector 11B can be considered as a part of body 12. The central axis of the cylinder of body connector 11B coincides with the AZ3-axis. Neck 11C is a member that is rotatable around AZ3-axis with respect to body connector 11B. Neck 11C is a plate-like member having a lower portion with a cylindrical outer shape and an upper portion with a bottom surface and a side surface. The lower cylindrical portion of neck 11C is inserted into a cylindrical hole of body connector 11B rotatably.

Camera holder 11D is a member that holds right-eye camera $2_R$ and left-eye camera $2_L$. Camera holder 11D has a portion having a shape obtained by bending a rectangular plate member at 90 degrees on the upper side. Right-eye camera $2_R$ and left-eye camera $2_L$ are attached to the upper surface of camera holder 11D with a spacing of about several centimeters. Camera holder 11D holds right-eye camera 21 and left-eye camera $2_L$ such that the optical axes thereof are parallel to each other. Camera holder 11D, right-eye camera $2_R$, and left-eye camera $2_L$ can be considered as two cameras arranged such that the optical axes thereof are parallel to each other. A direction in which the optical axes of right-eye camera $2_R$ and left-eye camera $2_L$ extend is referred to as a visual line direction. Camera holder 11D holds right-eye camera $2_R$ and left-eye camera $2_L$ such that the heights thereof from the upper surface of arm connector 19 are the same. Camera holder 11D has a portion having a cylindrical outer shape on the lower side. The cylindrical portion extends in parallel to the upper surface of arm connector 19. The central axis of the cylindrical portion is the EL3-axis. Elevation angle shaft bearing 11E is a member that holds a lower cylindrical portion of camera holder 11D such that the lower cylindrical portion of camera holder 11D is rotatable around the EL3-axis. Elevation angle shaft bearing 11E is attached to the side surface of neck 11C.

The mechanism that rotates neck 11C around the AZ3-axis with respect to body connector 11B is referred to as head rotation portion. The head rotation portion connects neck 11C to body connector 11B rotatably with respect to body connector 11B. The head rotation portion includes pulley 11F, drive pulley 11G, drive belt 11H, and motor 11J. Pulley 11F is fixed to the upper side of body connector 11. Pulley 11F is provided to cover the periphery of the hole of body connector 11B having a cylindrical internal space. The central axis of pulley 11F coincides with the central axis of the hole. The lower cylindrical portion of neck 11C penetrates pulley 11F. Pulley 11F holds the lower cylindrical portion of neck 11 rotatably. Drive pulley 11G is provided to be rotated around the rotation axis parallel to the AZ3-axis.

Pulley 11F and drive pulley 11G are arranged along the Y3-axis in the reference state. Drive belt 11H is wound around drive pulley 11G and pulley 11F. Drive belt 11H enables drive pulley 11G, neck 11C and camera holder 11D to be rotated around pulley 11F as drive pulley 11G is rotated. Motor 11J is attached to the bottom surface of neck 11C. The rotation axis of motor 11J passes through an opening provided on the bottom surface of neck 11C. Drive pulley 11G is attached to the rotation shaft of motor 11J. When motor 11J is rotated, drive pulley 11G is rotated. Drive pulley 11G is rotated and moved on the inside of drive belt 11H. In response to the rotational movement of drive pulley 11G, the portion of drive belt 11H which is in contact with pulley 11F also is rotated and moved. Drive pulley 11G and camera holder 11D are attached to neck 11C, and drive pulley 11G, neck 11C, and camera holder 11D is rotated and moved around pulley 11F. Thus, neck 11C is rotated clockwise or counterclockwise with respect to body connector 11B as motor 11J is rotated forward or backward.

An angle formed by X3Y3-plane and the optical axes of right-eye camera $2_R$ and left-eye camera $2_L$ is referred to as a visual line elevation angle. The EL3-axis is referred to as a visual line elevation angle changing axis. The mechanism that rotates camera holder 11D around the EL3-axis with respect to neck 11C is referred to as a visual line elevation angle changer. The visual line elevation angle changer includes pulley 11K, drive pulley 11L, drive belt 11M, and motor 11N. Pulley 11K is attached to the lower cylindrical portion of camera holder 11D. Pulley 11K and drive pulley 11L are provided to be rotated in a plane perpendicular to the EL3-axis. Pulley 11K and drive pulley 11L are provided such that the centers thereof are arranged vertically on the AZ3-axis. Motor 11N is attached to the side surface of neck 11C. The rotation axis of motor 11N passes through an opening provided on the side surface of neck 11C. Drive pulley 11L is attached to the rotation shaft of motor 11N. When motor 11K is rotated, drive pulley 11L is rotated. Drive belt 11M is wound around drive pulley 11L and pulley 11K. Drive belt 11M transmits the rotation of drive pulley 11L to pulley 11K. When pulley 11K is rotated, camera holder 11D is rotated around the EL3-axis. Thus, camera holder 11D is rotated upward or downward around the EL3-axis with respect to neck 11C as motor 11N is rotated forward or backward.

Right-eye camera $2_R$ and left-eye camera $2_L$ are cameras provided on the upper side of body 12. The AZ3-axis is a head rotation axis that intersects body 12. X3Y3-plane perpendicular to the AZ3-axis is a body reference plane perpendicular to the head rotation axis. Neck 11C is supported by body 12 rotatably around the AZ3-axis. Neck 11C supports camera holder 11D, right-eye camera $2_R$, and left-eye camera $2_L$ such that the visual line elevation angle is changeable.

The head rotation portion rotates head 11 around the AZ3-axis. The head rotation portion connects head 11 to body 12 rotatably around the AZ3-axis. The visual line elevation angle changer rotates camera holder 11D, right-eye camera $2_R$, and left-eye camera $2_L$ around the EL3-axis. The visual line elevation angle changer connects camera holder 11D, right-eye camera $2_R$, and left-eye camera $2_L$ to neck 11C rotatably around the EL3-axis. In the reference state, the optical axes of right-eye camera $2_R$ and left-eye camera $2_L$ are directed in a direction parallel to the Y3-axis.

The visual line elevation angle changer can rotate the optical axes (visual line directions) of right-eye camera $2_R$ and left-eye camera $2_L$ around the EL3-axis, for example, by −30 degrees to 60 degrees. The head rotation portion can rotate neck 11C around the AZ3-axis, for example, by −100 degrees to 100 degrees. In the reference state, the rotation angles around the EL3-axis and the AZ3-axis are both zero degree. The visual line direction in the reference state is parallel to the vehicle portion reference plane (X1Y1-plane) and the head reference plane (X3Y3-plane). When the visual line direction is upward, the rotation angle around the EL3-axis is positive. When the rotation is clockwise around the AZ3-axis as viewed from above, the rotation angle around the AZ3-axis is positive. The rotation angle around a certain axis is an angle of rotation around the axis.

Because the EL3-axis is provided at a position higher than the position where head 11 is connected to body 12, the visual line direction can be directed in a direction different from the direction in which head 11 is directed. Further, the angle at which the visual line direction can be directed upward with respect to the body reference plane is larger than an angle directed downward. The visual line direction of robot 1 can be directed forward in a posture in which the height of the robot is lowered, head 11 is directed downward, and arms 5 are extended forward. Operator 90 can perform remote control while checking the situation in the vicinity of hand 26.

Arm connector 19 includes an arm connection structure 19A and two arm rotation portions 19B. Arm connection structure 19A has a thick plate shape. Arm rotation portion 19B has a rectangular parallelepiped outer shape. Principal surfaces on both sides of arm connection structure 19A face in the right-left direction. Arm rotation portions 19B, which are rectangular parallelepipeds, are connected to the front portions of the principal surfaces on both sides of arm connection structure 19A, respectively. Arm rotation portion 19B contains the mechanism that rotates arm 5. The rear portion of arm connection structure 19A is connected to control board container 20 at a fixed angle. The front direction of arm connector 19 and the front direction of control board container 20 are present on the same plane perpendicular to a horizontal plane. The front direction of arm connector 19 is a direction having an elevation angle of about 30 degrees with respect to the front direction of control board container 20. A motor 19D that generates power that rotates the root of arm 5 is inserted into arm rotation portion 19B from the rear side thereof.

A rotation axis or a changing mechanism included in robot 1 is described. Robot 1 includes the rotation axis or the changing mechanism in a part other than arms 5 as described below.

(Rotation Axis or Changing Mechanism Included in Robot 1 Other than Arms 5)

AZ-axis: An azimuth rotation axis AZ. A rotation axis that allows body position changing mechanism 1B and humanoid 1H to be rotated with respect to vehicle portion 1W. The AZ-axis coincides with the Z1-axis.

Elevation angle changing mechanism: The mechanism that changes an elevation angle (EL angle) which is an angle formed by the upper surface of vehicle portion 1W and the direction in which body 12 (strictly, control board container 20) extends. Slide mechanism 17 is an elevation angle changing mechanism. Slide mechanism 17 changes the elevation angle by moving the position of the lower end of body 12 in a plane parallel to the upper surface of vehicle portion 1W. Slide mechanism 17 supports body 12 such that the elevation angle is changeable.

Expansion mechanism: Expansion mechanism 18 changes the body length. The body length is a distance between the lower end of first link 17A and arm connector 19 on a straight line representing a direction in which first link 17A extends on a Y2Z1-plane.

AZ3-axis: A head rotation axis. A rotation axis that allows head 11 to be rotated with respect to arm connector 19. The head rotation axis is perpendicular to the upper surface of arm connector 19.

EL3-axis: A visual line elevation angle changing axis. The rotation axis that allows the visual line elevation angle to be changed. The visual line elevation angle is an angle formed by X3Y3-plane and the optical axes of right-eye camera $2_R$ and left-eye camera $2_L$.

Vehicle connector 16 connects slide mechanism 17 to vehicle portion 1W rotatably with one rotational degree of freedom. Vehicle connector 16 connects slide mechanism 17 to vehicle portion 1W rotatably around the AZ-axis. The AZ-axis is the rotation axis parallel to the height direction of vehicle portion 1W. Vehicle connector 16 is an azimuth angle changing mechanism which is provided in vehicle portion 1W and supports slide mechanism 17 rotatably around the AZ-axis.

Figure 26:
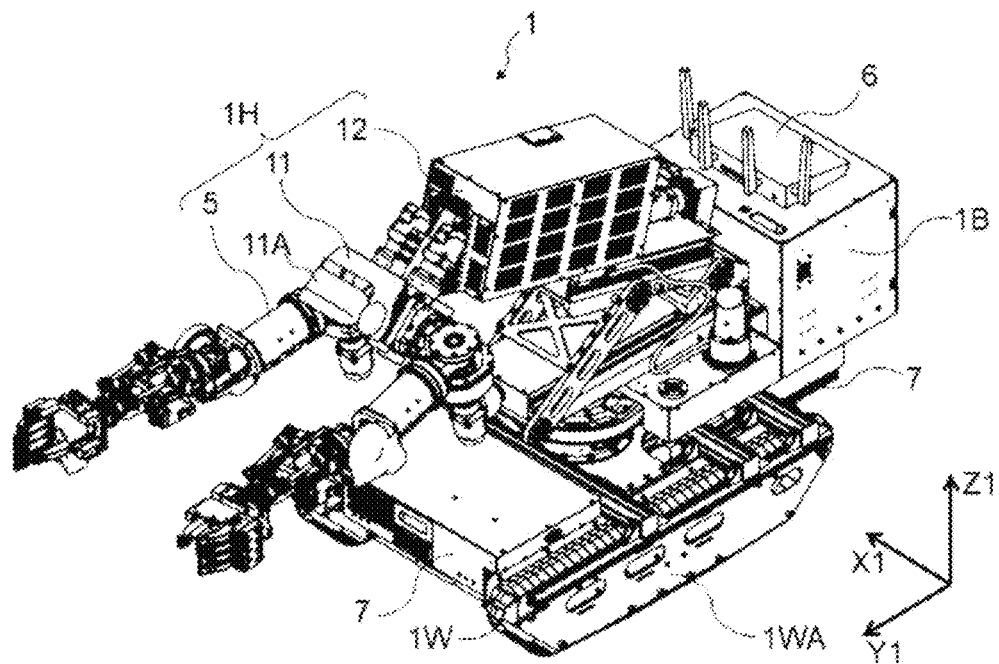
FIG. 26 is a perspective view illustrating the robot operated by the robot operation system according to the first embodiment in another posture 2.
Figure 27:
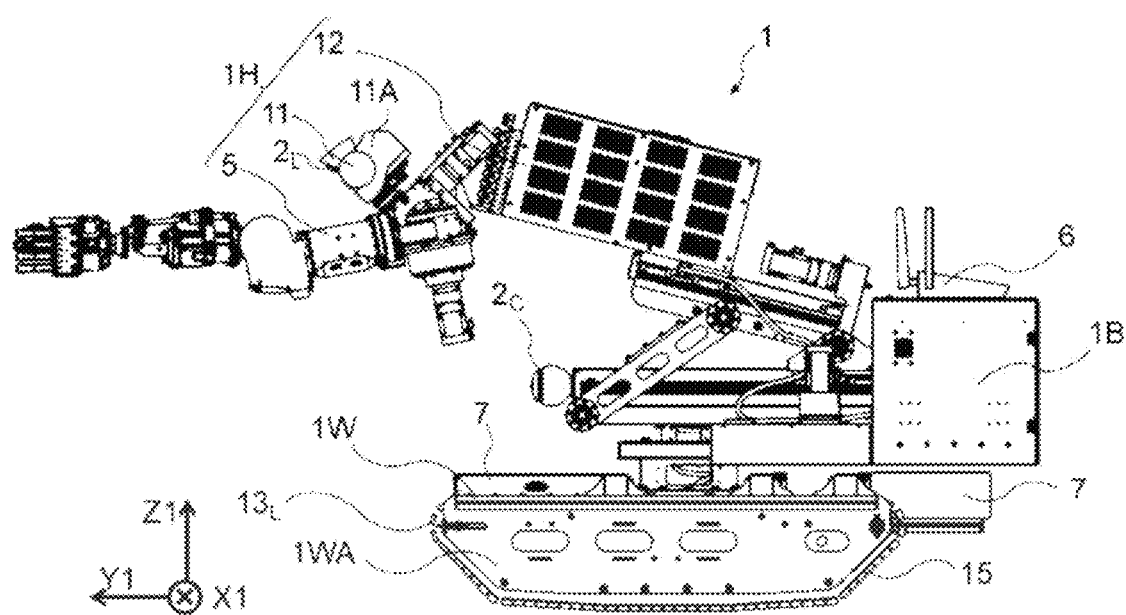
FIG. 27 is a right side view illustrating the robot operated by the robot operation system according to the first embodiment in the other posture 2.
Figure 28:
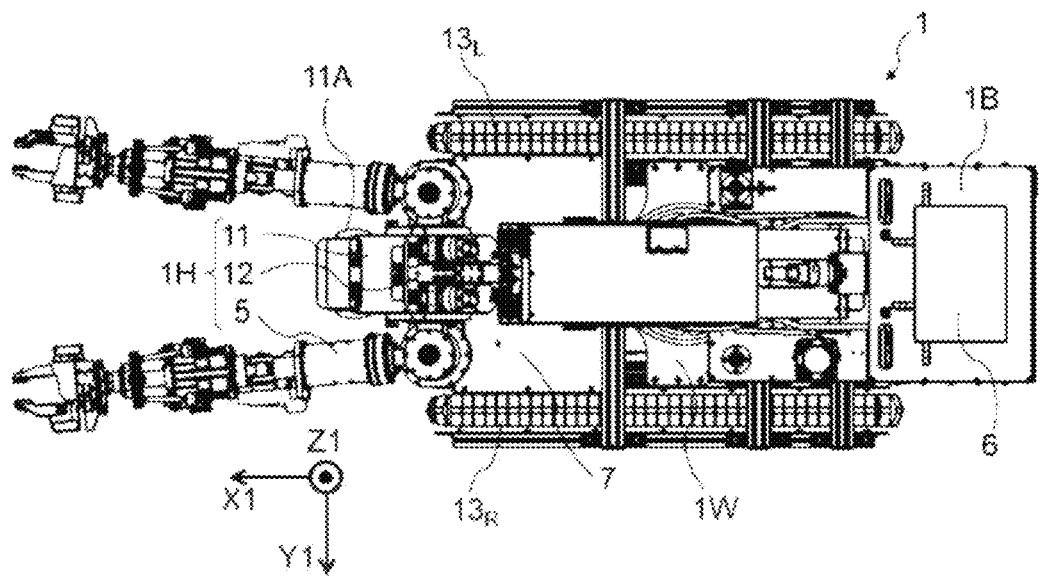
FIG. 28 is a plan view illustrating the robot operated by the robot operation system according to the first embodiment in the other posture 2.

Robot 1 can take a posture (referred to as stored posture) with the lowest height. The stored posture is a posture taken when robot 1 is move. Further, when working, robot 1 can handle an object at a distance through extending arms 5 and maximizing the body length by expansion mechanism 18. FIGS. 20 to 25 illustrate a perspective view, a front view, a right side view, a rear view, a left side view, and a plan view of robot 1 in the stored posture as another posture 1. FIGS. 26 to 28 illustrate a perspective view, a right side view, and a plan view of robot 1 in a posture in which arms 5 are extended as another posture 2.

With the stored posture, it is possible to perform work of searching for an object at a low position such as under a vehicle or under a desk, or work of holding an article placed at a low position.

Figure 29:
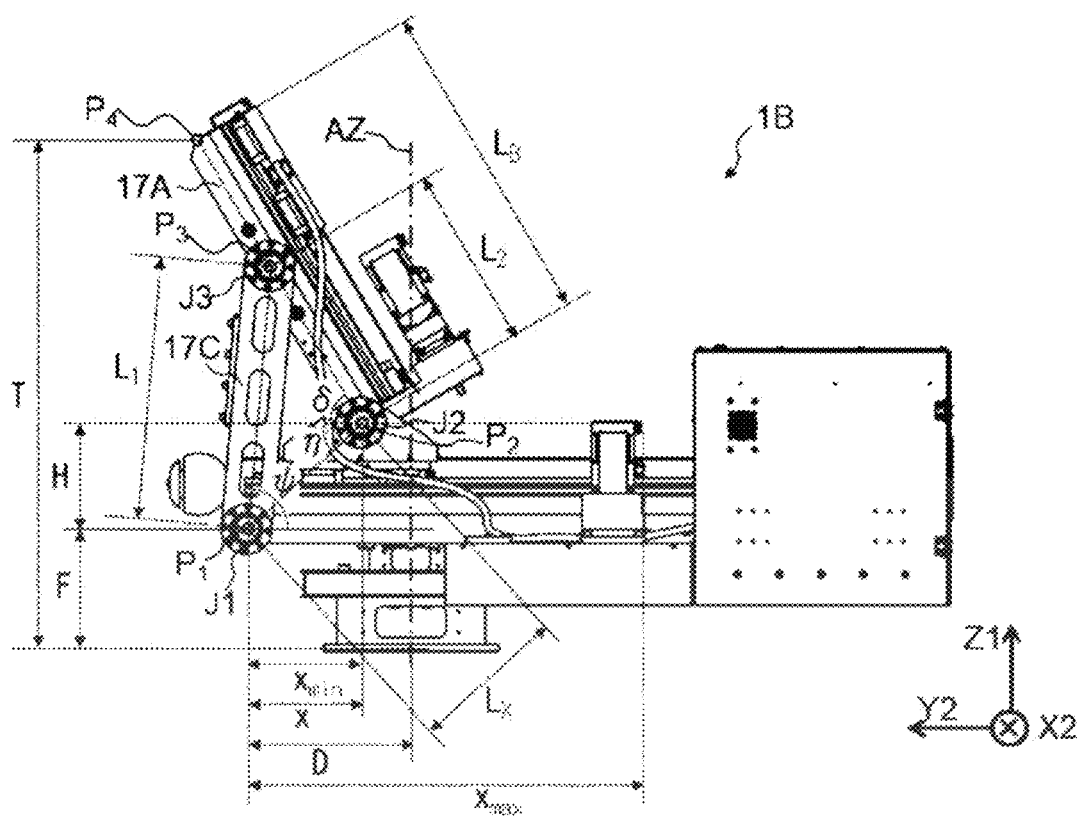
FIG. 29 is a right side view illustrating variables representing lengths of respective portions of a slide mechanism included in the robot operated by the robot operation system according to the first embodiment.

With reference to FIG. 29, the length of each portion of slide mechanism 17, and the like is described. FIG. 29 is a right side view illustrating variables representing the lengths of the respective portions of slide mechanism 17.

The following variables are used to represent the lengths of the respective portions of slide mechanism 17.

$P_1$: A point representing vehicle-side link attaching unit J1 on Y2Z1-plane.

$P_2$: A point representing moving member attaching unit J2 on Y2Z1-plane.

$P_3$: A point representing moving-side link attaching unit J3 on Y2Z1-plane.

$P_4$: A point representing the upper end of first link 17A on Y2Z1-plane.

$L_1$: A length of second link 17C. A distance between points $P_1$ and $P_3$.

$L_2$: A length of the supported portion of first link 17A. A distance between points $P_2$ and $P_3$.

$L_B$: A length of first link 17A. A distance between points $P_2$ and $P_4$.

x: A difference in Y2 coordinates between points $P_1$ and $P_2$. Referred to as horizontal distance.

$x_{min}$: A lower limit of possible horizontal distance x. Referred to as horizontal distance lower limit.

$x_{max}$: An upper limit of possible horizontal distance x. Referred to as horizontal distance upper limit.

H: A difference in Z2 coordinates between points $P_1$ and $P_2$. Referred to as vertical distance.

$L_x$: A distance between points $P_1$ and $P_2$. Referred to as linear distance.

D: A distance between point $P_1$ and azimuth axis AZ.

F: A height of point $P_1$ from the upper surface of vehicle portion 1W.

T: A height from the upper surface of vehicle portion 1W to point $P_4$. Referred to as robot height.

ψ: An angle formed by second link 17C and the Y2-axis. Referred to as control angle.

δ: An angle formed by first link 17A and the Y2-axis. Referred to as elevation angle.

η: An angle formed by the Y2-axis and a straight line connecting point $P_1$ and point $P_2$. Referred to as inclination angle.

FIG. 29 illustrates a state in which horizontal distance x is set to be a horizontal distance lower limit $x_{min}$.

The following relational expressions are established among these variables.

$$x_{min} \leq x \leq x_{max} \tag{1}$$

$$L_1 * \sin\psi = H + L_2 * \sin\delta \tag{2}$$

$$L_1 * \cos\psi + L_2 * \cos = x \tag{3}$$

$$L_x = \sqrt{(H^2 + x^2)} \tag{4}$$

$$\sin\eta = H/L_x \tag{5}$$

$$\cos\eta = x/L_x \tag{6}$$

$$T = F + H + L_B * \sin\delta \tag{7}$$

$L_1$, $L_2$, $L_B$, D, H, $x_{min}$, and $x_{max}$ are determined in advance. When horizontal distance x satisfying Expression (1) is determined, control angle ψ, elevation angle δ, and inclination angle η are determined so as to satisfy Expressions (2) to (6). Robot height T is determined from elevation angle δ by Expression (7). H is a difference in height between the straight line along which slide-moving member 17B is moved and vehicle-side link attaching unit J1.

The actual height of the robot is the height obtained by adding the height of vehicle portion 1W and the height from the upper end of first link 17 to the highest portion of head 11 to robot height T. When considering reducing robot height T, expansion mechanism 18 is assumed to be in its shortest state.

The following expression is obtained by transforming Expressions (2) and (3) so as to eliminate control angle ψ.

$$L_1^2 = L_2^2 + H^2 + x^2 + 2 * L_2 * (H * \sin\delta - x * \cos\delta) \tag{8}$$

When Expressions (4) to (6) are substituted into Expression (8) and the addition theorem of trigonometric functions is applied, the following expression is obtained.

$$L_1^2 = L_2^2 + L_x^2 - 2 * L_2 * L_x * \cos(\delta + \eta) \tag{9}$$

Expression (9) is an expression representing the cosine theorem for the interior angle at a vertex $P_2$ in a triangle having points $P_1$, $P_2$, $P_3$ as the vertices.

By transforming Expression (9), the following expression is obtained.

$$\cos(\delta + \eta) = (1/2) * (L_1^2 - L_2^2 - L_x^2)/L_2/L_x \tag{10}$$

Further, the following expressions are established.

$$\sin(\delta + \eta) = \sqrt{(1 - \cos^2(\delta + \eta))} \tag{11}$$

$$\sin\delta = \sin(\delta + \eta) * \cos\eta - \cos(\delta + \eta) * \sin\eta \tag{12}$$

$$\cos\delta = \sin(\delta + \eta) * \sin\eta + \cos(\delta + \eta) * \cos\eta \tag{13}$$

The following variables are defined for the maximum and minimum values of elevation angle δ and robot height T when horizontal distance x is within the range defined by Expression (1).

$L_{xH}$: A maximum value of linear distance $L_x$.

$L_{xL}$: A minimum value of linear distance $L_x$.

$δ_H$: A maximum value of elevation angle δ.

$δ_L$: A minimum value of elevation angle δ.

$η_H$: A maximum value of inclination angle n.

$η_L$: A minimum value of inclination angle n.

$T_L$: A minimum value of robot height T.

$δ_{H0}$: An allowable limit value that a maximum value 8H of elevation angle δ should satisfy.

$δ_{L0}$: An allowable limit value that a minimum value &L of elevation angle δ should satisfy.

$T_{L0}$: An allowable limit value that a minimum value $T_L$ of robot height T should satisfy.

$δ_{L0}$: An allowable limit value that a minimum value $δ_L$ of elevation angle δ should satisfy.

$T_{L0}$: An allowable limit value that a minimum value $T_L$ of robot height T should satisfy.

These variables can be calculated based on the following expressions.

$$L_{xH} = \sqrt{(H^2 + x_{max}^2)} \tag{14}$$

$$L_{xL} = \sqrt{(H^2 + x_{max}^2)} \tag{15}$$

$$\sin\eta_H = H/L_{xL} \tag{16}$$

$$\cos\eta_H = x_{min}/L_{xL} \tag{17}$$

$$\sin\eta_L = H/L_{xH} \tag{18}$$

$$\cos\eta_L = x_{max}/L_{xH} \tag{19}$$

$$\cos(\delta_H + \eta_H) = (1/2) * (L_1^2 - L_2^2 - L_{xL}^2)/L_2/L_{xL} \tag{20}$$

$$\sin(\delta_H + \eta_H) = \sqrt{(1 - \cos^2(\delta_H + \eta_H))} \tag{21}$$

$$\sin\delta_H = \sin(\delta_H - \eta_H) * \cos\eta_H - \cos(\delta_H + \eta_H) * \sin\eta_H \tag{22}$$

$$\cos\delta_H = \sin(\delta_H + \eta_H) * \sin\eta_H + \cos(\delta_H + \eta_H) * \cos\eta_H \tag{23}$$

$$\cos(\delta_L + \eta_L) = (1/2) * (L_1^2 - L_2^2 - L_{xH}^2)/L_2/L_{xH} \tag{24}$$

$$\sin(\delta_L + \eta_L) = \sqrt{(1 - \cos^2(\delta_L + \eta_L))} \tag{25}$$

$$\sin\delta_L = \sin(\delta_L + \eta_L) * \cos\eta_L - \cos(\delta_L + \eta_L) * \sin\eta_L \tag{26}$$

$$\cos\delta_L = \sin(\delta_L + \eta_L) * \sin\eta_L + \cos(\delta_L + \eta_L) * \cos\eta_L \tag{27}$$

$$T_L = F + H + L_B * \sin\delta_L \tag{28}$$

The following expressions are established for the allowable limit values.

$$\delta_L \leq \delta_{L0} \tag{29}$$

$$\delta_H \geq \delta_{H0} \tag{30}$$

-continued $$T_L \leq T_{L0} \quad (31)$$

Although not shown in the expressions, there is a constraint on horizontal distance upper limit $x_{max}$ determined by the length of vehicle portion 1W. In order to ensure stability in the standing posture while working, the upper limit of control angle v and horizontal distance lower limit $x_{min}$ are constrained. It is also necessary to ensure the stability of the center of gravity by allowing the center of gravity to be present in the vicinity of azimuth axis AZ in all the postures that robot 1 can take while moving and for work. All the postures include postures in which the body length is changed. When humanoid 1H takes the stored posture, it is necessary to prevent body position changing mechanism 1B, arm 5, and vehicle portion 1W from interfering with each other. In addition, it is desirable that the range in which robot 1 can work is as large as possible. It is desirable that the height in the stored posture is also as small as possible within the range which is less than or equal to the allowable limit value.

The dimensions of the respective portions of robot 1 are determined by trial and error so as to satisfy all of these constraint conditions and conditions to be optimized, wherein $x_{max}$, $x_{min}$, H, D, $L_1$, and $L_2$ are determined in consideration of trade-offs between contradictory required values.

Expression (1) is an expression that defines a movable range which is a range in which slide-moving member 17B can be moved. $\delta_L$ is the minimum value of elevation angle $\delta$ (minimum elevation angle) obtained in each state in which slide-moving member 17B is moved in the movable range. $\delta_{L0}$ is the minimum allowable limit value of elevation angle determined for minimum elevation angle $\delta_L$. Expression (29) represents that minimum elevation angle SL is less than or equal to minimum allowable limit value of elevation angle $\delta_{L0}$. $\delta_H$ is the maximum value of elevation angle $\delta$ (maximum elevation angle) obtained in each state in which slide-moving member 17B is moved in the movable range. $\delta_{H0}$ is the maximum allowable limit value of elevation angle determined for maximum elevation angle $\delta_H$. Expression (30) represents that maximum elevation angle $\delta_H$ is greater than or equal to maximum allowable limit value of elevation angle $\delta_{H0}$.

Point $P_4$ is a point representing a predetermined point of body 12. Point $P_4$ is a point which is located outside body 12 but whose position with respect to body 12 is determined. $T_L$ is the minimum value of robot height T (minimum robot height) obtained in each state in which slide-moving member 17B is moved in the movable range. $T_{L0}$ is the allowable limit value of robot height determined with respect to minimum robot height $T_L$. Expression (31) represents that minimum robot height $T_L$ is less than or equal to allowable limit value of robot height $T_{L0}$.

It is also possible to determine $x_{max}$ and $x_{min}$, establish Expressions (29) to (31), and then determine H, D, $L_1$, and $L_2$ so as to minimize minimum robot height $T_L$. In this case, H, D, $L_1$, and $L_2$ are determined by obtaining values that take extreme values by, for example, taking partial differentials of Expressions (14) to (31) with respect to each variable. The determination of H, D, $L_1$ and $L_2$ in this manner means that minimum robot height $T_L$ is determined to be minimized in the movable range which is predetermined.

In a robot including a humanoid, when various kinds of work are performed by one robot, a body that can position a hand at a desired position is required. When the arm having the hand is moved in a wider range of positions and angles, the body including a large number of joints is effective. However, when the number of joints is increased to provide a large number of degrees of freedom, the number of necessary components is increased, and the cost and the mass are increased. In addition, a large number of components leads to an increase in failure rate.

In addition, a self-propelled robot including a humanoid moves to a work site by self-propelling and works at the work site. The robot is required to be small enough to pass narrow passages and height-restricted places when moving to the work site. On the other hand, there is a demand for the hand to be able to access a wide range when the robot is operated. These conflicting demands must be satisfied in order to increase the number of scenes where self-propelled humanoid robots are used. Cost is also an important factor. The inventors believe that robot 1 is one solution that balances compactness when moving, a wide operable range, and cost.

Robot 1 includes body position changing mechanism 1B including vehicle connector 16, slide mechanism 17, and expansion mechanism 18. Body position changing mechanism 1B can change the azimuth and the elevation angle of the position of body 12 and can change the body length. Comparing with the robot disclosed in PTL 5 in which the body includes six rotation axes, only the azimuth angle and the elevation angle are changeable. The body included in the robot disclosed in PTL 5 has a large degree of freedom in the posture that the robot can take. However, it is considered that most of the postures that can be taken are postures that are not used at all or postures that are used with a low frequency when the robot is actually used. Even if the body can only change the azimuth and the elevation angle, the arms can be directed at a wide range of different angles with respect to the body. Even if the variation in the posture that the body can take is reduced, it is not considered to be much of a problem in practical use.

The elevation angle is changed by the slide mechanism, and a ratio between the weight of the robot and the thrust (movable load) can be increased. In the joints of the rotary system, it is necessary to use many gears in order to increase the thrust. The use of many gears increases mass. The use of the slide mechanism realizes weight reduction while maintaining a necessary thrust.

In the slide mechanism, the inclination angle (elevation angle) of the first link extending in the direction of the elevation angle is changed, and when the elevation angle is reduced, the height required for the slide mechanism can be reduced as compared with the robot of PTL 5.

The body length can be increased by expansion mechanism 18. The body length is a distance from vehicle portion 1W to arm connector 19. The body length can be increased or decreased by expansion mechanism 18. Therefore, robot 1 can take a compact stored posture with a small volume occupied by robot 1 when moving, and can have a wider workable range than a robot without expansion mechanism 18 while working. While moving, expansion mechanism 18 is set to the shortest state, and the center of gravity of robot 1 can be lowered from the ground, and the stability while moving is improved.

Vehicle connector 16 is rotatable around the A-axis in a range of, for example, −165 degrees to 185 degrees. Here, the rotation angle around the AZ-axis is set to zero degree when the direction in which humanoid 1H faces is parallel to the direction in which vehicle portion 1W is directed. The rotation angle around the AZ-axis is positive when the rotation is clockwise as viewed from above.

Slide mechanism 17 can be changed the elevation angle in a range of 15 degrees to 60 degrees. Expansion mechanism 18 can move body 12 by a maximum of 0.2 m with respect to first link 17A.

In robot 1, two arms 5 can be moved largely with respect to vehicle portion 1W, and two arms 5 can be directed in a direction suitable for work. Expansion mechanism 18 can also expand the range in which hand 26 can be present, and robot 1 can work in a wider space. Body position changing mechanism 1B allows arm connector 19 to be positioned at any position in a predetermined range of a three dimensional space. Further, two arms 5 can be positioned at any position in a three dimensional space within the range determined with respect to arm connector 19.

By controlling head 11 according to the posture of robot 1, right-eye camera $2_R$ and left-eye camera $2_L$ can be directed in the direction in which hand 26 is present. In addition, even when the elevation angle is changed by slide mechanism 17, the operation can be performed in a mode (referred to as a visual line linked mode) in which the directions of the optical axes of right-eye camera $2_R$ and left-eye camera $2_L$ are not changed. In the visual line linked mode, when the elevation angle is changed by slide mechanism 17, camera holder 11D that holds right-eye camera $2_R$ and left-eye camera $2_L$ is rotated around the EL3-axis by the same angle as the angle by which the elevation angle is changed in the direction opposite to the direction in which the elevation angle is changed. That is, when the elevation angle is changed by δ1 by slide mechanism 17, camera holder 11D is rotated by δ2 (=−δ1) around the EL3-axis. δ1 is a first angle that changes the elevation angle. δ2 is a second angle having the same absolute value as δ1 and a different sign from δ1. A control device 60 in the visual line linked mode is a visual line linked controller that controls the visual line elevation angle changer to change the visual line elevation angle by a second angle δ2 (=−δ1) when slide mechanism 17 changes elevation angle δ by a first angle δ1.

Figure 30:
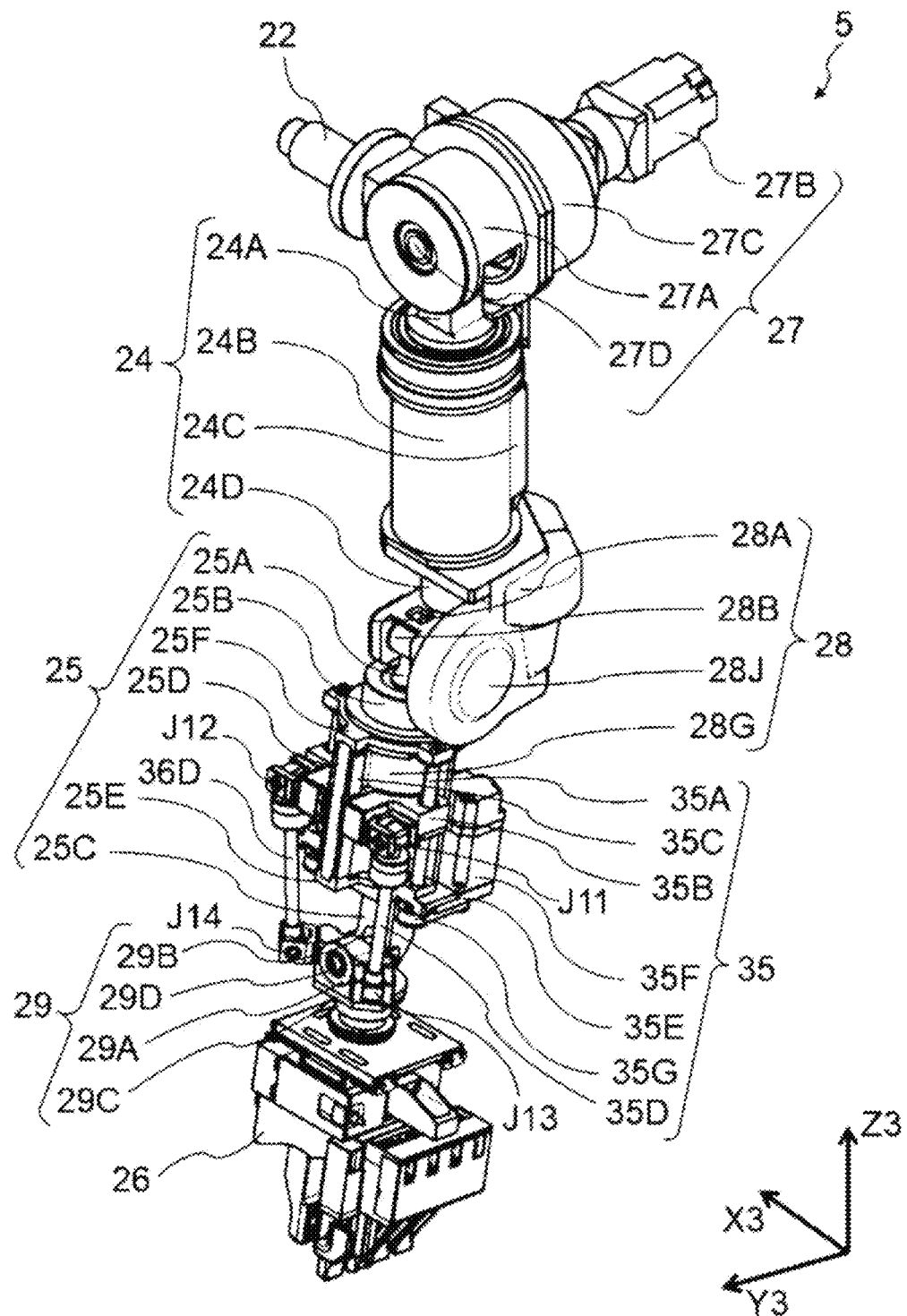
FIG. 30 is a perspective view illustrating an arm included in the robot operated by the robot operation system according to the first embodiment.
Figure 31:
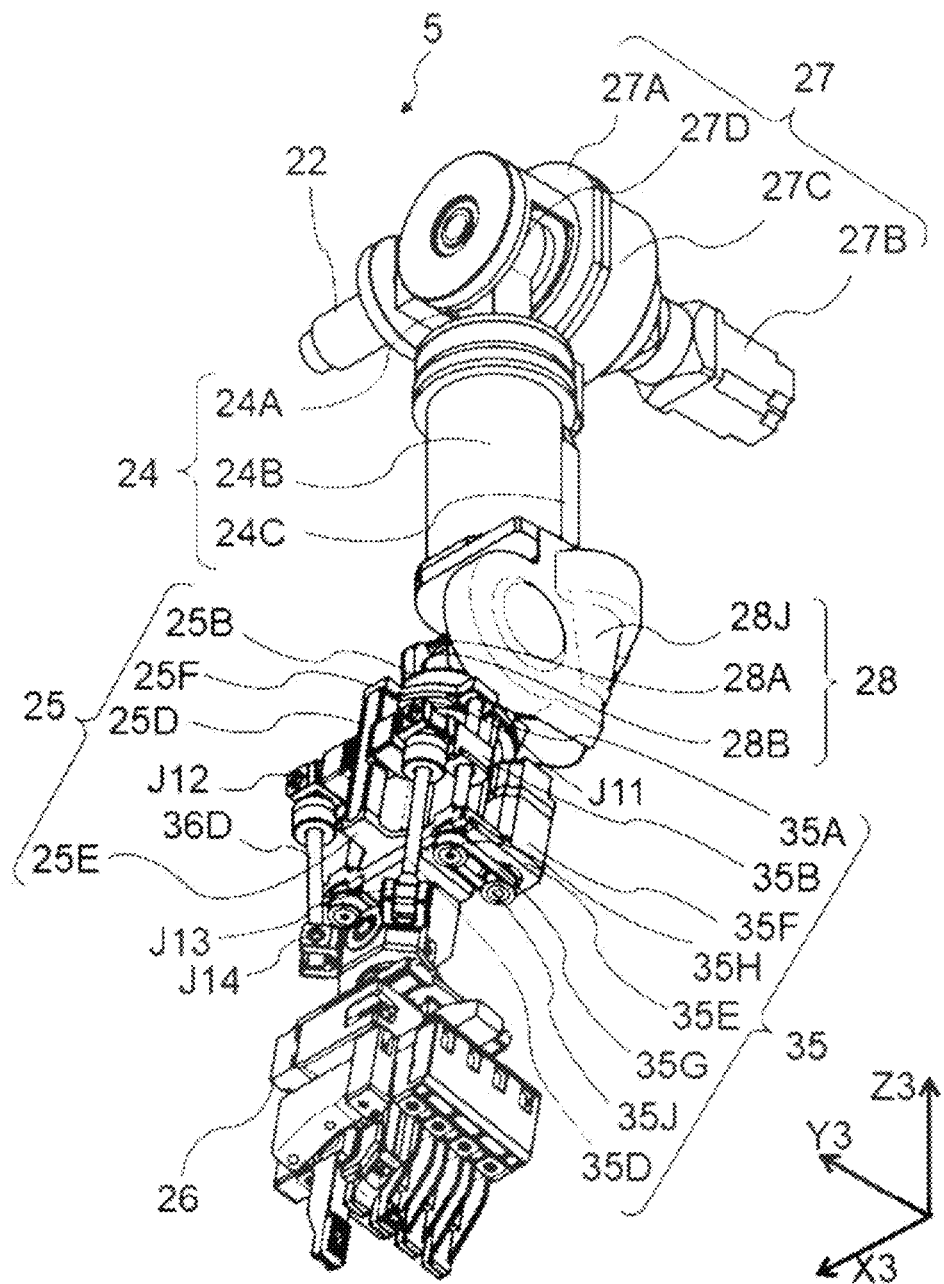
FIG. 31 is another perspective view illustrating the arm included in the robot operated by the robot operation system according to the first embodiment.
Figure 32:
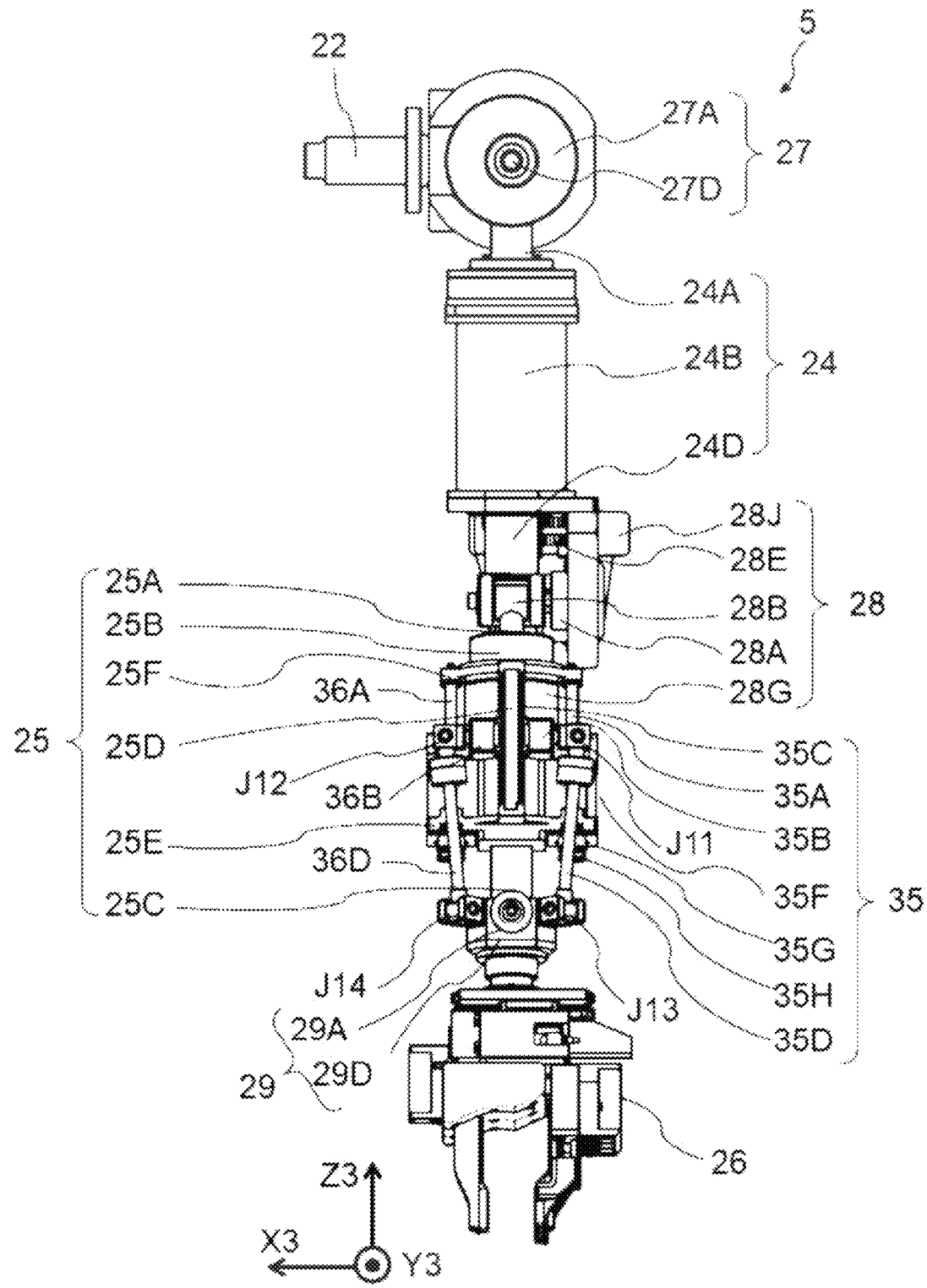
FIG. 32 is a front view illustrating the arm included in the robot operated by the robot operation system according to the first embodiment.
Figure 33:
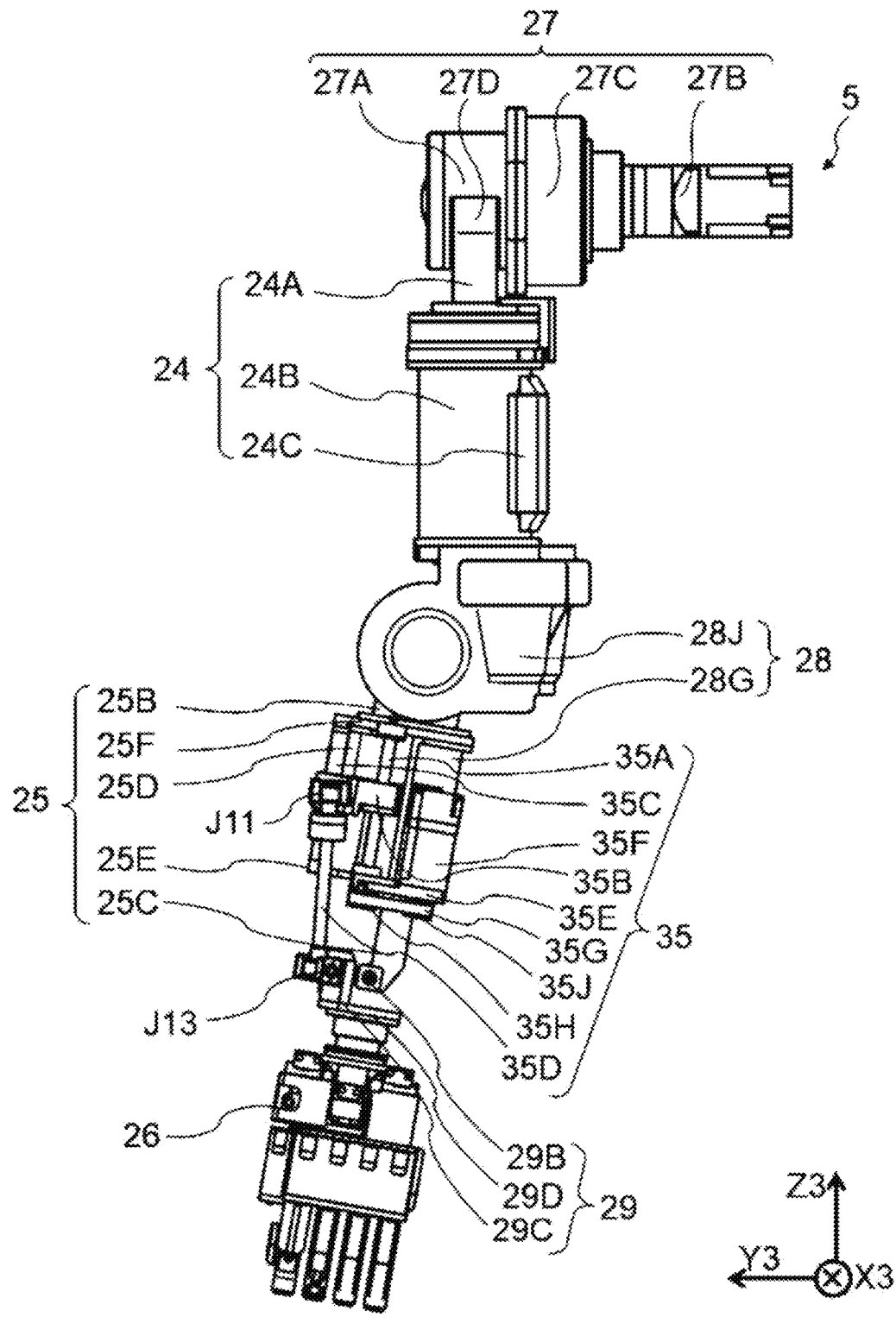
FIG. 33 is a right side view illustrating the arm included in the robot operated by the robot operation system according to the first embodiment.

With reference to FIGS. 30 to 37, the structure of arm 5 is described. FIG. 30 is a perspective view of arm 5. FIG. 31 is another perspective view of arm 5. FIGS. 32 to 37 are a front view, a right side view, a rear view, a left side view, a plan view, and a bottom view of arm 5. Arm 5 has the same structure as the arm included in the robot according to Embodiment 5 of PTL 5 except for hand 26.

Arm 5 includes an arm base 22, an upper arm 24, a forearm 25, and hand 26 connected in series. Arm base 22 is supported rotatably by arm connector 19. Upper arm 24 is connected to arm base 22 by a shoulder joint 27 rotatably with two rotational degrees of freedom. Forearm 25 is connected to upper arm 24 by an elbow joint 28 rotatably with two rotational degrees of freedom. Hand 26 is connected to forearm 25 by a wrist joint 29 rotatably with two rotational degrees of freedom.

Figure 38:
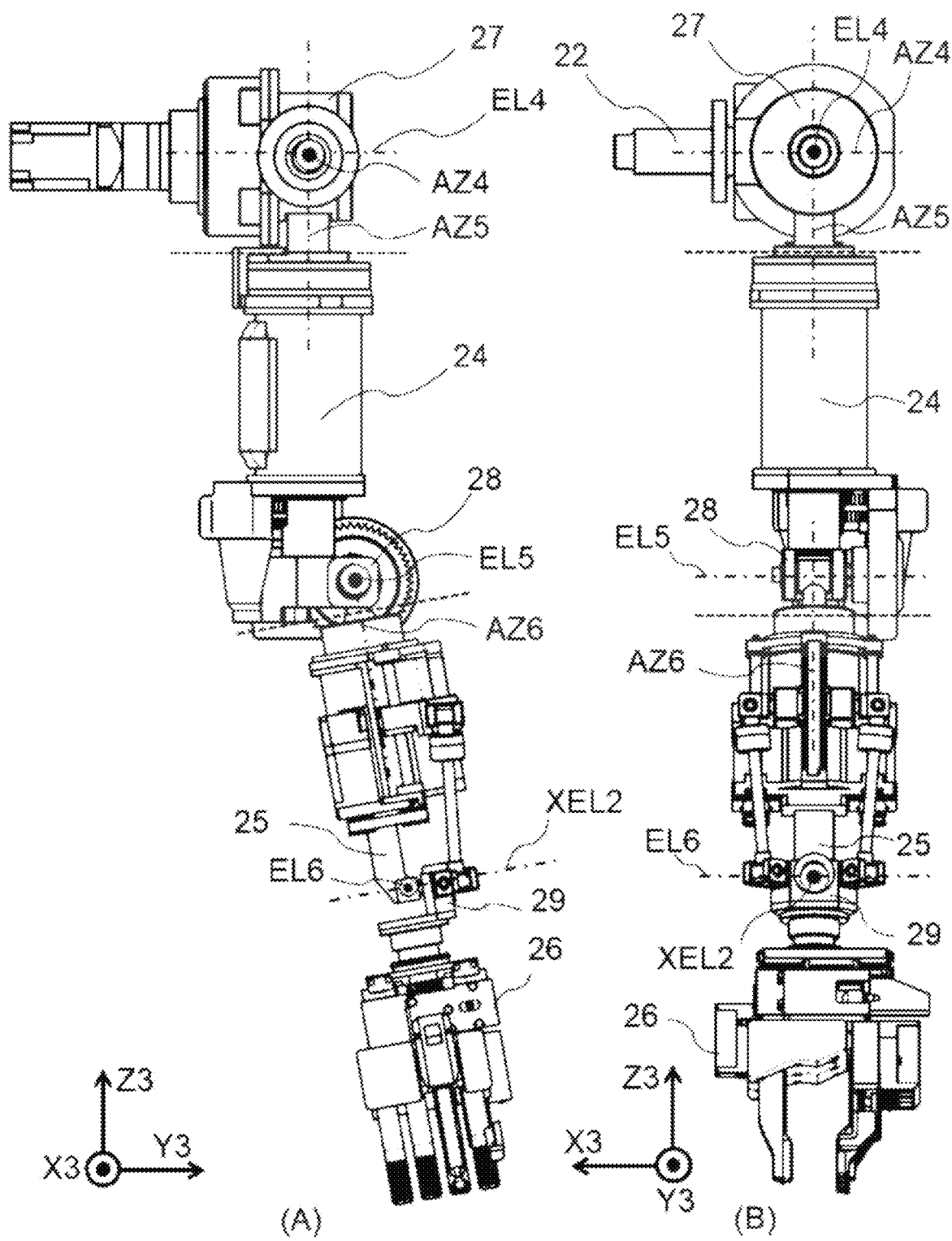
FIG. 38 is a view illustrating rotation axes included in the arm included in the robot operated by the robot operation system according to the first embodiment.

With reference to FIG. 38, the rotation axes included in arm 5 is described. FIG. 38 is a view illustrating the rotation axes included in arm 5. FIG. 38(A) is a left side view of left arm 5, and FIG. 38(B) is a front view of left arm 5.

Arm 5 has the following seven rotation axes.

AZ4-axis: A rotation axis that allows arm 5 to be rotated with respect to arm connector 19. A rotation axis that passes through arm base 22 to rotate arm base 22. The AZ4-axis is referred to as an arm base rotation axis. The rotation angle around the AZ4-axis is referred to as an arm base rotation angle. The arm base rotation angle is represented by a variable $\theta_{AZ4}$.

EL4-axis: A rotation axis that allows an angle formed by upper arm 24 and arm base 22 to be changed. The EL4-axis is orthogonal to the AZ4-axis. The rotation angle around the EL4-axis is referred to as an upper arm inclination angle. The upper arm inclination angle is represented by a variable $\delta_{EL4}$.

AZ5-axis: A rotation axis that passes through upper arm 24 and allows upper arm 24 to be rotated. The A5-axis is orthogonal to the EL4-axis. The AZ5-axis is referred to as an upper arm rotation axis. The rotation angle around the AZ5-axis is referred to as an upper arm rotation angle. The upper arm rotation angle is represented by a variable $\theta_{AZ5}$.

EL5-axis: A rotation axis that allows an angle formed by forearm 25 and upper arm 24 to be changed. The FL5-axis is orthogonal to the AZ5-axis. The rotation angle around the EL5-axis is referred to as forearm inclination angle. The forearm inclination angle is represented by a variable $\delta_{EL5}$.

AZ6-axis: A rotation axis that passes through forearm 25 and allows forearm 25 to be rotated. The AZ6-axis is orthogonal to the EL5-axis. The AZ6-axis is referred to as a forearm rotation axis. The rotation angle around the AZ6-axis is referred to as a forearm rotation angle. The forearm rotation angle is represented by a variable $\theta_{AZ6}$.

EL6-axis: A rotation axis that allows an angle formed by hand 26 and forearm 25 (AZ6-axis) to be rotated on a plane including the AZ6-axis and the XEL2-axis (front-rear direction rotation plane). The EL6-axis is orthogonal to the AZ6-axis and the XEL2-axis. The rotation angle around the EL6-axis is referred to as a hand first inclination angle. The hand first inclination angle is represented by a variable $\delta_{EL6}$.

XEL2-axis: A rotation axis that allows the angle formed by hand 26 and forearm 25 (AZ6-axis) to be rotated on a plane including the AZ6-axis and the EL6-axis (right-left direction rotation plane). The XEL2-axis is orthogonal to the AZ6-axis and the EL6-axis. The rotation angle around the XEL2-axis is referred to as a hand second inclination angle. The hand second inclination angle is represented by a variable $\delta_{XEL2}$.

The front-rear direction rotation plane is a first plane including the AZ6-axis. The right-left direction rotation plane is a second plane that intersects with the front-rear direction rotation plane and includes the AZ6-axis. Although the calculation becomes complicated, the first plane and the second plane may not be orthogonal to each other. The first plane and the second plane may include the AZ6-axis and intersect with each other.

The AZ4-axis is the rotation axis that allows arm base 22 to be rotated with respect to arm connector 19. The EL4-axis and the AZ5-axis are rotation axes that change the connection angle between arm base 22 and upper arm 24 in shoulder joint 27. The ELLS-axis and the AZ6-axis are rotation axes that change the connection angle between upper arm 24 and forearm 25 in elbow joint 28. The EL6-axis and the XEL2-axis are rotation axes that change the connection angle between forearm 25 and hand 26 at wrist joint 29. The front-rear direction rotation plane and the right-left direction rotation plane are two planes that pass through forearm 25 and are orthogonal to each other.

The AZ4-axis is perpendicular to arm connector 19. The AZ4-axis may cross arm connector 19. The AZ4-axis is also referred to as shoulder rotation axis. The shoulder rotation axis is the rotation axis that crosses arm connector 19. The rotation angle around the AZ4-axis is referred to as arm base rotation angle or shoulder rotation angle.

Arm base 22 has a columnar shape. Arm base 22 is inserted rotatably into a hole made in arm rotation portion 19B included in arm connector 19. Motor 19D is inserted into arm rotation portion 19B from the rear side. Inside arm rotation portion 19B, a worm gear mechanism that rotates arm base 22 by the rotational torque outputted by motor 19D is contained. A worm wheel (not illustrated) is provided at an end of arm base 22. The worm wheel meshes with a worm (not illustrated) that is rotated by the rotation of motor 19D. When motor 19D and the worm rotate, the worm wheel, arm base 22, and arm 5 are rotated around the AZ4-axis. In the reference state, arm 5 is rotated in the front-rear direction of humanoid 1H. A flange is provided at an end of arm base 22 on the side of shoulder joint 27. Shoulder joint 27 is connected to the flange of arm base 22. Arm base 22 is rotated around the AZ4-axis. The AZ4-axis passes through the center of arm base 22 having the columnar shape. The hole made in arm rotation portion 19B and to which arm base 22 is inserted rotatably is an arm base joint (reference numeral is not illustrated) that connects arm base 22 to body 12 rotatably with at least one rotational degree of freedom.

For example, the rotatable range of arm base 22 is the range of −35 degrees to 180 degrees. Here, the angle (arm base rotation angle) at which arm base 22 is rotated around the AZ4-axis is set such that the arm base rotation angle is zero degrees when upper arm 24 is directed downward, and such that the arm base rotation angle is positive when upper arm 24 is rotated forward. Upper arm 24 can be directed right above by the rotation of arm base 22. Upper arm 24 can be rotated from the direction directly downward to behind by 35 degrees. For example, arm base rotation angle $\theta_{AZ4}$ can take any value within the range of −35 degrees≤$\theta_{AZ4}$≤180 degrees.

Shoulder joint 27 may be considered to include a mechanism that rotates an intermediate cylindrical portion 24B with respect to a joint connected portion 24A. In this case, shoulder joint 27 connects upper arm 24 to arm base 22 rotatably with two rotational degrees of freedom. Shoulder joint 27 enables the rotation around the upper arm rotation axis (AZ5-axis) passing through upper arm 24 and the rotation around the rotation axis (EL4-axis) that allows the angle formed by upper arm 24 and arm base 22 to be changed. The rotation around the AZ5-axis of shoulder joint 27 causes upper arm 24 and forearm 25 to be rotated. When upper arm 24 is rotated around the AZ5-axis, the structure is simpler than when forearm 25 is rotated around the AZ5-axis by elbow joint 28.

Shoulder joint 27 may be considered to connect upper arm 24 to upper arm base 22 rotatably with one rotational degree of freedom around the EL4-axis. The mechanism that enables upper arm 24 to be rotated around the upper arm rotation axis (AZ5-axis) may be considered to be provided in upper arm 24 rather than in shoulder joint 27. In this case, shoulder joint 27 connects upper arm 24 to upper arm base 22 rotatably with at least one rotational degree of freedom. Upper arm 24 is rotatable around the upper arm rotation axis passing through upper arm 24.

In addition to considering that the shoulder joint includes a mechanism that rotates intermediate cylindrical portion 24B with respect to joint connected portion 24A, arm base 22 and an arm base joint may be considered as a part of the shoulder joint. In this case, the shoulder joint connects upper arm 24 to arm rotation portion 19B so as to be rotatable with three rotational degrees of freedom. The three rotational degrees of freedom of the shoulder joint are rotational degrees of freedom around the AZ4-axis, the EL4-axis, and the AZ5-axis. Because arm rotation portion 19B is included in arm connector 19, the shoulder joint connects upper arm 24 to arm connector 19 so as to be rotatable with three rotational degrees of freedom. Because arm connector 19 is included in body 12, the shoulder joint connects upper arm 24 to body 12 so as to be rotatable with three rotational degrees of freedom. The shoulder joint connects arm 5 to body 12 rotatably.

In shoulder joint 27, for example, the rotatable range around the EL4-axis is −10 degrees to 75 degrees. Here, the rotation angle (upper arm inclination angle) of the EL4-axis in shoulder joint 27 is set to zero degree when upper arm 24 is orthogonal to arm base 22. When the angle formed by upper arm 24 and arm base 22 becomes small, namely, when upper arm 24 is rotated so as to be separated from body 12, the angle of the EL4-axis is set to be positive. In shoulder joint 24, upper arm 24 can be raised up to 75 degrees outward in the right-left direction in the reference state, and upper arm 24 can be rotated up to 10 degrees in the direction in which upper arm 24 is moved closer to body 12. For example, upper arm inclination angle $\delta_{EL4}$ can take any value within the range of −10 degrees≤$\delta_{EL4}$≤75 degrees.

In shoulder joint 27, the rotatable range around the AZ5-axis passing through upper arm 24 is, for example, −90 degrees to 20 degrees. Here, the rotation angle (upper arm rotation angle) around the AZ5-axis is zero degree in the reference state, and the angle is negative when upper arm 24 is rotated toward body 12. In the state where upper arm 24 is directed downward and elbow joint 28 is bent at 90 degrees, forearm 25 can be rotated inward until it becomes parallel to the front surface of arm connector 19 by rotation around the AZ5-axis. On the outside, forearm 25 can be rotated until forearm 25 forms an angle of 20 degrees with respect to the front direction of arm connector 19. Upper arm rotation angle $\theta_{AZ5}$ can take any value within the range of −90 degrees≤$\theta_{AZ5}$≤20 degrees, for example.

Elbow joint 28 may be considered to include a mechanism that rotates a forearm base 25B with respect to a rotation shaft connected portion 25A. In this case, elbow joint 28 connects forearm 25 to upper arm 24 so as to be rotatable with two rotational degrees of freedom. Elbow joint 28 enables rotation around the forearm rotation axis (AZ6-axis) passing through forearm 25 and rotation around the rotation axis (EL5-axis) that allows the angle formed by forearm 25 and upper arm 24 to be changed. By the rotation around the AZ6-axis, forearm 25 and hand 26 are rotated. When forearm 25 is rotated around the AZ6-axis, the structure becomes simpler than when hand 26 can be rotated around the AZ6-axis by wrist joint 29.

Elbow joint 28 may be considered to connect forearm 25 to upper arm 24 rotatably with one rotational degree of freedom around the EL5-axis. The mechanism that enables forearm 25 to be rotated around the forearm rotation axis (AZ6-axis) may be considered to be provided in forearm 25 rather than in elbow joint 28. In this case, elbow joint 28 connects forearm 25 to upper arm 24 rotatably with at least one rotational degree of freedom. Forearm 25 is rotatable around the forearm rotation axis passing through forearm 25.

In elbow joint 28, for example, the rotatable range around the EL5-axis is 10 degrees to 125 degrees. Here, the rotation angle (forearm inclination angle) around the EL5-axis is set to zero degree when forearm 25 and upper arm 24 are present on the same straight line. That is, the rotation angle around the EL5-axis is the angle formed by forearm 25 and the straight line obtained by extending upper arm 24 from elbow joint 28 to the side where forearm 25 is provided. In the case that forearm 25 is present in front of upper arm 24, the rotation angle around the EL5-axis is positive.

When the forearm inclination angle is zero degree, the angle formed by forearm 25 and upper arm 24 is 180 degrees. Accordingly, elbow joint 28 can be bent and stretched within the range in which the angle formed by forearm 25 and upper arm 24 is about 170 degrees to about 55 degrees. For example, forearm inclination angle $\delta_{EL5}$ can take any value within the range of −10 degrees≤$\delta_{EL5}$≤125 degrees.

In elbow joint 28, for example, the rotatable range around forearm rotation axis (AZ6-axis) is from −100 degrees to 100 degrees. In the reference state, the front-rear direction rotation plane becomes parallel to the front direction of forearm 25. The rotation angle (forearm rotation angle) around the AZ6-axis is set such that the angle of the AZ6-axis is zero degree in the reference state. When the front-rear rotation plane is inclined outward, the angle of the AZ6-axis is positive. For example, forearm rotation angle $\theta_{AZ6}$ can take any value within the range of −100 degrees≤$\theta_{AZ6}$≤100 degrees.

Wrist joint 29 connects hand 26 to forearm 25 rotatably with two rotational degrees of freedom. Wrist joint 29 is a biaxial gimbal. Wrist joint 29 can be changed the angle formed by forearm 25 and hand 26 on each of the front-rear direction rotation plane and the right-left direction rotation plane. Both the front-rear direction rotation plane and the right-left direction rotation plane are planes including forearm 25, and are orthogonal to each other. The EL6-axis is orthogonal to the front-rear direction rotation plane. The EL6-axis is the rotation axis that enables hand 26 to be rotated in the front-rear direction rotation plane. The XEL2-axis is orthogonal to the right-left direction rotation plane. The XEL2-axis is the rotation axis that enables hand 26 to be rotated in the right-left direction rotation plane. The front-rear direction rotation plane is a first forearm plane including the forearm rotation axis (AZ6-axis). The right-left direction rotation plane is a second forearm plane that includes the AZ6-axis and is orthogonal to the front-rear direction rotation plane. The front-rear direction rotation plane and the right-left direction rotation plane may not be orthogonal to each other, but may cross each other. The front-rear direction rotation plane which is the first forearm plane may not include the AZ6-axis. The right-left direction rotation plane, which is the second forearm plane, may not include the AZ6-axis. The front-rear direction rotation plane and the right-left direction rotation plane may cross each other.

In wrist joint 29, for example, the rotation angle on the front-rear direction rotation plane by the rotation around the EL6-axis enables hand 26 to be rotated from −45 degrees to 60 degrees. For example, the rotation angle on the right-left direction rotation plane by the rotation around the XEL2-axis enables hand 26 to be rotated from −60 degrees to 60 degrees. When hand 26 and forearm 25 are present on the same straight line, the rotation angles around the EL6-axis and the XEL2-axis are set to zero degree. When hand 26 is present on the front side in the front-rear direction rotation plane, the rotation angle (hand first inclination angle) around the EL6-axis is positive. When hand 26 is present on the outer side in the right-left direction rotation plane, the rotation angle (band second inclination angle) around the XEL2-axis is positive. For example, hand first inclination angle $\delta_{EL6}$ can take any value within the range of −45 degrees≤$\delta_{EL6}$≤60 degrees. For example, hand second inclination angle $\delta_{XEL2}$ can take any value within the range of −60 degrees≤$\delta_{XEL2}$≤60 degrees.

Forearm 25 is rotated around the forearm rotation axis (AZ6-axis) at elbow joint 28, so that hand 26 can change the direction largely with respect to forearm 25. In wrist joint 29, the connection angle between forearm 25 and hand 26 is changeable in the front-rear direction rotation plane and the right-left direction rotation plane that are orthogonal to each other, so that hand 26 can be directed in an intended direction with respect to forearm 25 easily. When the wrist joint is a joint in which hand 26 is rotated with respect to forearm 25 and the angle formed by hand 26 and forearm 25 is changed, in the case where the angle formed by hand 26 and forearm 25 is close to 180 degrees (in the case where hand 26 is present in the direction in which forearm 25 extends), hand 26 is required to be rotated around the forearm rotation axis largely, and it becomes difficult to direct hand 26 in the intended direction with respect to forearm 25.

The wrist joint may be configured to change by only the angle formed by hand 26 and forearm 25. In this case, the rotational degree of freedom at the wrist joint may be one rotational degree of freedom, and the wrist joint can be simplified. Forearm 25 is rotated around the forearm rotation axis (AZ6-axis) at elbow joint 28, so that the rotatable range of hand 26 with respect to the forearm rotation axis can be determined to the range required for the wrist joint. However, when the angle formed by hand 26 and forearm 25 is close to 180 degrees, it is difficult to direct hand 26 in the intended direction with respect to the forearm rotation axis.

The arm base joint may have two rotational degrees of freedom. Shoulder joint 27 may have one rotational degree of freedom or three rotational degrees of freedom. Elbow joint 28 may have one rotational degree of freedom or three rotational degrees of freedom. Wrist joint 29 may have one rotational degree of freedom or three rotational degrees of freedom. The sum of the rotational degrees of freedom of the arm base joint, the rotational degrees of freedom of shoulder joint 27, the rotational degrees of freedom of elbow joint 28, and the rotational degrees of freedom of wrist joint 29 may be six rotational degrees of freedom or eight rotational degrees of freedom.

Shoulder joint 27 includes a shoulder joint structure 27A, a motor 27B, a motor installation portion 27C, and a rotation shaft member 27D. Rotation shaft member 27D is a rod-like member parallel to the EL4-axis. Upper arm 24 is connected to rotation shaft member 27D. When rotation shaft member 27D is rotated, upper arm 24 is rotated around the EL4-axis. The mechanism that rotates upper arm 24 around the AZ5-axis is provided in upper arm 24.

Shoulder joint structure 27A and motor installation portion 27C are members that hold rotation shaft member 27D rotatably. Rotation shaft member 27D is perpendicular to shoulder joint structure 27A. In the reference state, shoulder joint structure 27A extends horizontally in the front-rear direction, and rotation shaft member 27D extends downward. Shoulder joint structure 27A has a shape including a cylinder with a flange and a rectangular parallelepiped connected to arm connector 19 side. When the cylinder of shoulder joint structure 27A is viewed from the front, the flange has a shape in which left and right portions of the circle are cut out with straight lines facing each other. Motor installation portion 27C also has a cylindrical shape with a flange. In shoulder joint structure 27A and motor installation portion 27C, the flanges have the same shape. The flange of the cylinder of shoulder joint structure 27A and the flange of motor installation portion 27C are joined to each other. Motor 27B is installed inside motor installation portion 27C. Motor 27B generates power rotating rotation shaft member 27D. Inside motor installation portion 27C, a gear that transmits the rotational torque of motor 27B to rotation shaft member 27D is also contained.

Upper arm 24 includes joint connected portion 24A, intermediate cylindrical portion 241B, a lid 24C and a lower column 24D. Joint connected portion 24A is a member having a rectangular rod-shaped portion connected to rotation shaft member 27D of shoulder joint 27. Rotation shaft member 27D and joint connected portion 24A are integrally formed. Joint connected portion 24A includes a columnar portion on the lower side of the rectangular rod-shaped portion. The columnar portion is inserted rotatably into intermediate cylindrical portion 24B. When intermediate cylindrical portion 24B is rotated with respect to joint connected portion 24A, upper arm 24 is rotated around the AZ5-axis.

Joint connected portion 24A passes through an opening provided in shoulder joint structure 27A. The opening provided in shoulder joint structure 27A is directed downward in the reference state. Through the rectangular rod-shaped portion of joint connected portion 24A coming into contact with the opening, the rotation angle in the right-left direction is limited in shoulder joint 27. When shoulder joint 27 is rotated outward in the right-left direction from the state in which upper arm 27 is directed downward, upper arm 27 can be rotated until upper arm 27 becomes the angle close to the horizontal.

In intermediate cylindrical portion 24B, an opening is provided on the rear side. The opening on the rear side is provided for maintenance or the like of the motor or the like inside intermediate cylindrical portion 24B. Lid 24C closes the opening of intermediate cylindrical portion 24B. Inside the upper side of intermediate cylindrical portion 24B, the motor and gears that rotate intermediate cylindrical portion 24B with respect to joint connected portion 24A are contained. A motor (not illustrated) used in elbow joint 28 is also contained in the lower part of intermediate cylindrical portion 24B. The rotation shaft of the motor is extended to the outside from the lower side of intermediate cylindrical portion 24B.

Lower column 24D is connected onto the lower side of intermediate cylindrical portion 24B. Lower column 24D is a cylinder having a smaller diameter than that of intermediate cylindrical portion 24B. Joint connected portion 24A, intermediate cylindrical portion 24B and lower column 24D are provided on one straight line. Lower column 24D is connected to a rotation shaft holding yoke 28A of elbow joint 28.

Elbow joint 28 connects forearm 25 to upper arm 24 with two rotational degrees of freedom. Elbow joint 28 enables the rotation around the forearm rotation axis (AZ6-axis) passing through forearm 25 and the rotation changing the angle formed by upper arm 24 and forearm 25. Elbow joint 28 includes rotation shaft holding yoke 28A, a rotation shaft member 28B, a worm wheel 28C, a worm 28D, a gear portion 28E, a motor 28F, a gear portion 28G, a motor container 28H, and a gear cover 28J.

The worm gear mechanism is used, so that the angle formed by forearm 25 and upper arm 24 at elbow joint 28 can be maintained even when the supply of electric power is interrupted.

Rotation shaft member 28B is a shaft member constituting a rotation axis (EL5 axis) that allows the angle formed by forearm 25 and upper arm 24 to be changed. Forearm 25 is connected to rotation shaft member 28B. Rotation shaft member 28B extends in the direction orthogonal to upper arm 24. Rotation shaft holding yoke 28A holds rotation shaft member 28B rotatably. Rotation shaft holding yoke 28A has a shape including two plate-like portions facing each other and through which rotation shaft member 28B passes and a plate-like portion connecting upper portions of the two plates. Rotation shaft holding yoke 28A is connected to lower column 24D at the upper plate-like portion.

Figure 35:
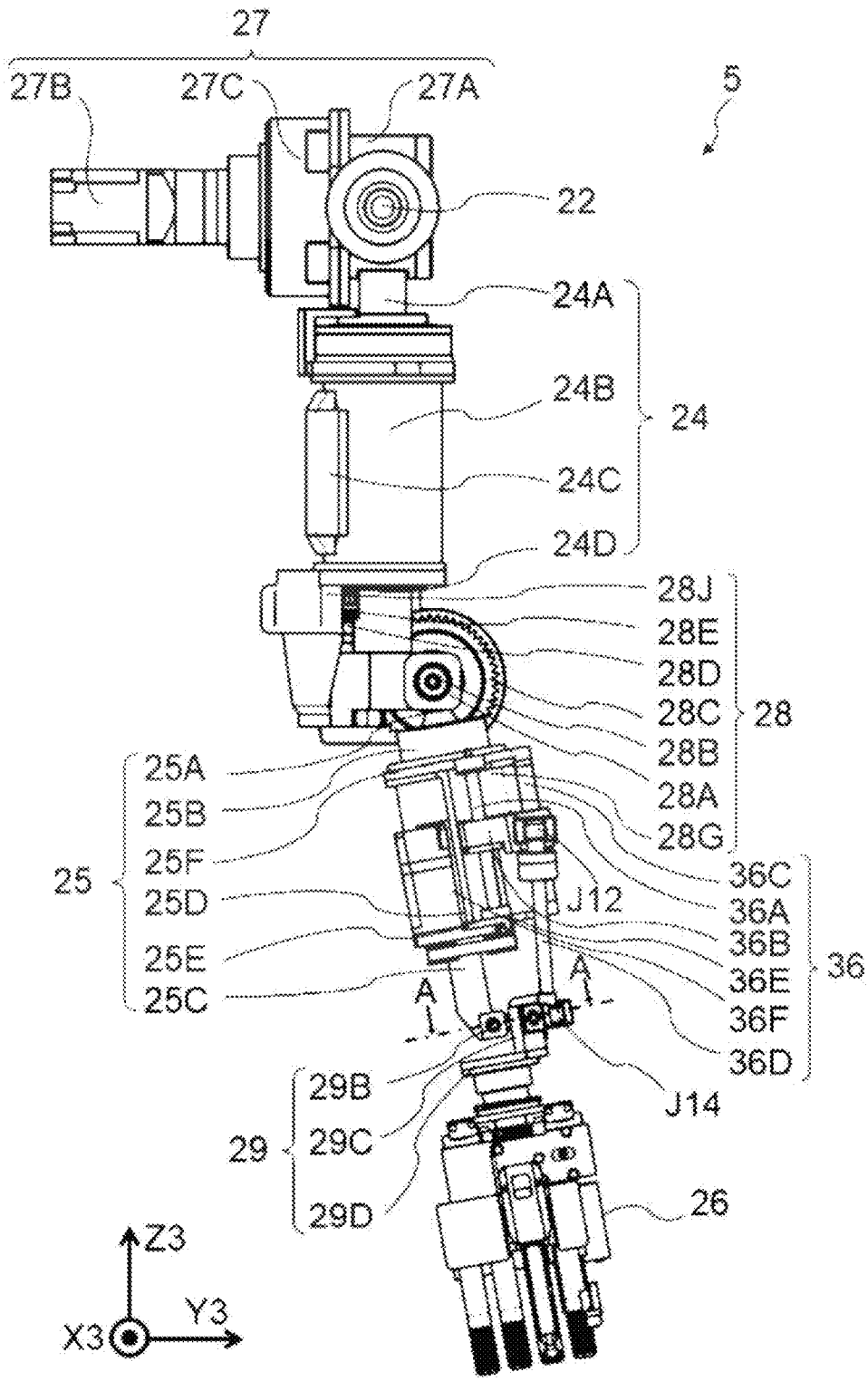
FIG. 35 is a left side view illustrating the arm included in the robot operated by the robot operation system according to the first embodiment.
Figure 36:
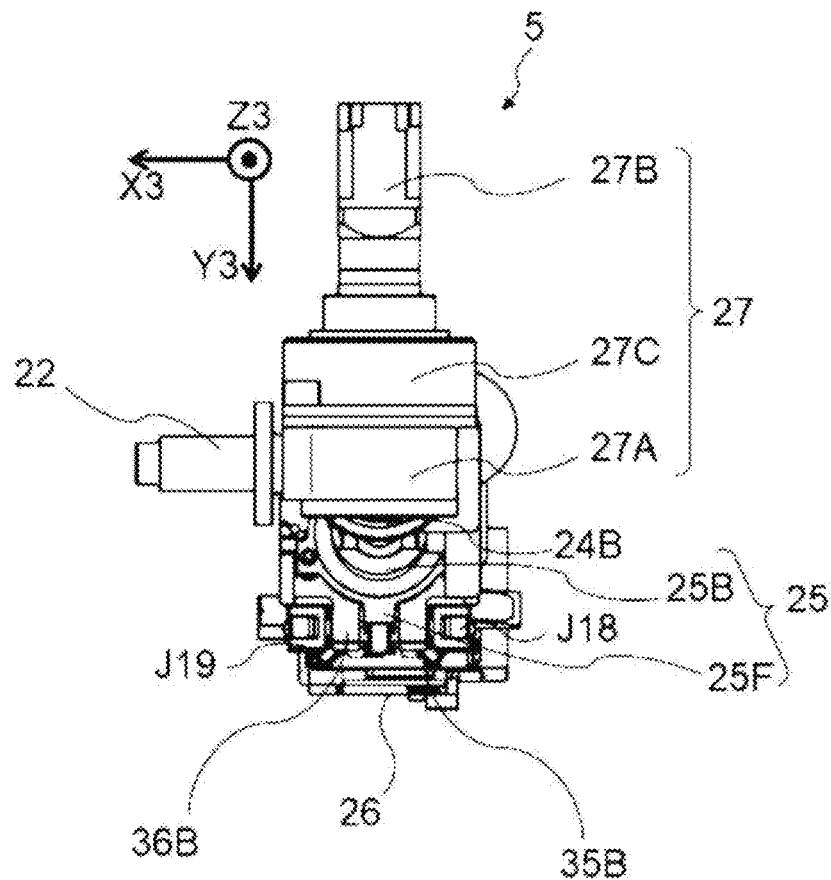
FIG. 36 is a plan view illustrating the arm of a robot operated by the robot operation system according to the first embodiment.
Figure 37:
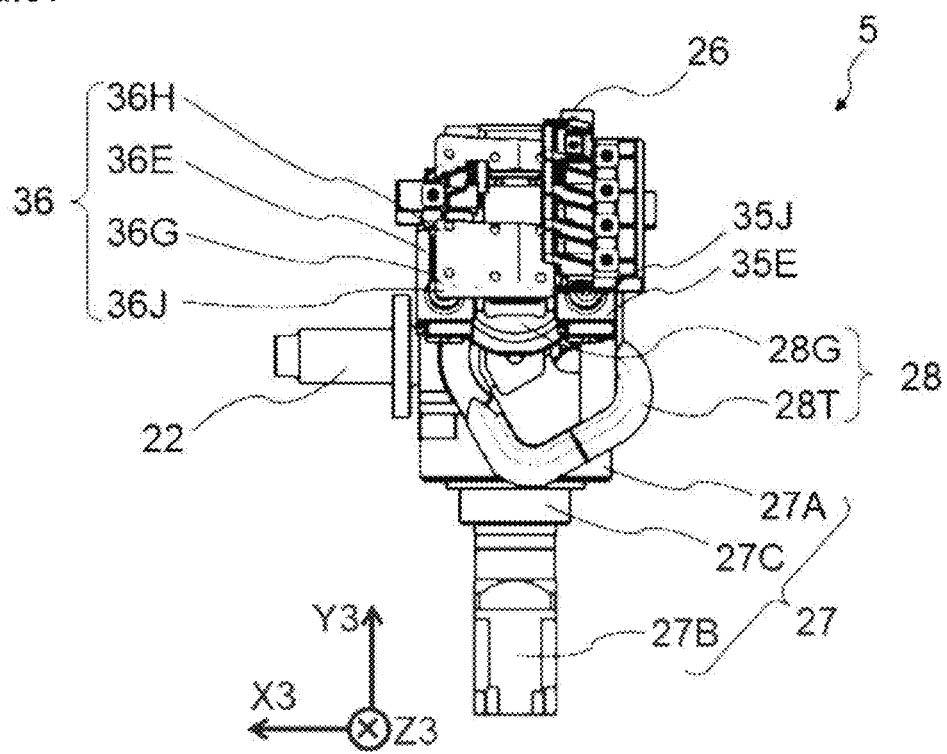
FIG. 37 is a bottom view illustrating the arm included in the robot operated by the robot operation system according to the first embodiment.

As illustrated in FIG. 35, worm wheel 28C, worm 28D, and gear portion 28E constitute a mechanism to rotate rotation shaft member 28B by a motor 24E contained in upper arm 24. Worm wheel 28C is attached to rotation shaft member 28B. When worm wheel 28C is rotated, rotation shaft member 28B is rotated. Worm wheel 28C is provided on the outer side of elbow joint 28 in the right-left direction. Gear portion 28E is rotated by the rotation of the motor. Gear portion 28E is installed to be parallel to the lower surface of intermediate cylindrical portion 24B. Gear portion 28E includes a gear that meshes with the rotation shaft of the motor and a gear that meshes with worm 28D. Worm 28D is provided in the direction in which intermediate cylindrical portion 24B extends. Worm 28D meshes with gear portion 28E on the side close to intermediate cylindrical portion 24B. Worm 28D meshes with worm wheel 28C on the side far from intermediate cylindrical portion 24B. Gear cover 28J is a cover that covers worm wheel 28C, worm 28D, and gear portion 28E.

When the motor is rotated, the rotation of the motor is transmitted to worm 28D by gear portion 28E, and worm 28D is rotated. When worm 28D is rotated, worm wheel 28C and rotation shaft member 28B rotate, and the angle formed by forearm 25 and upper arm 24 is changed.

Figure 34:
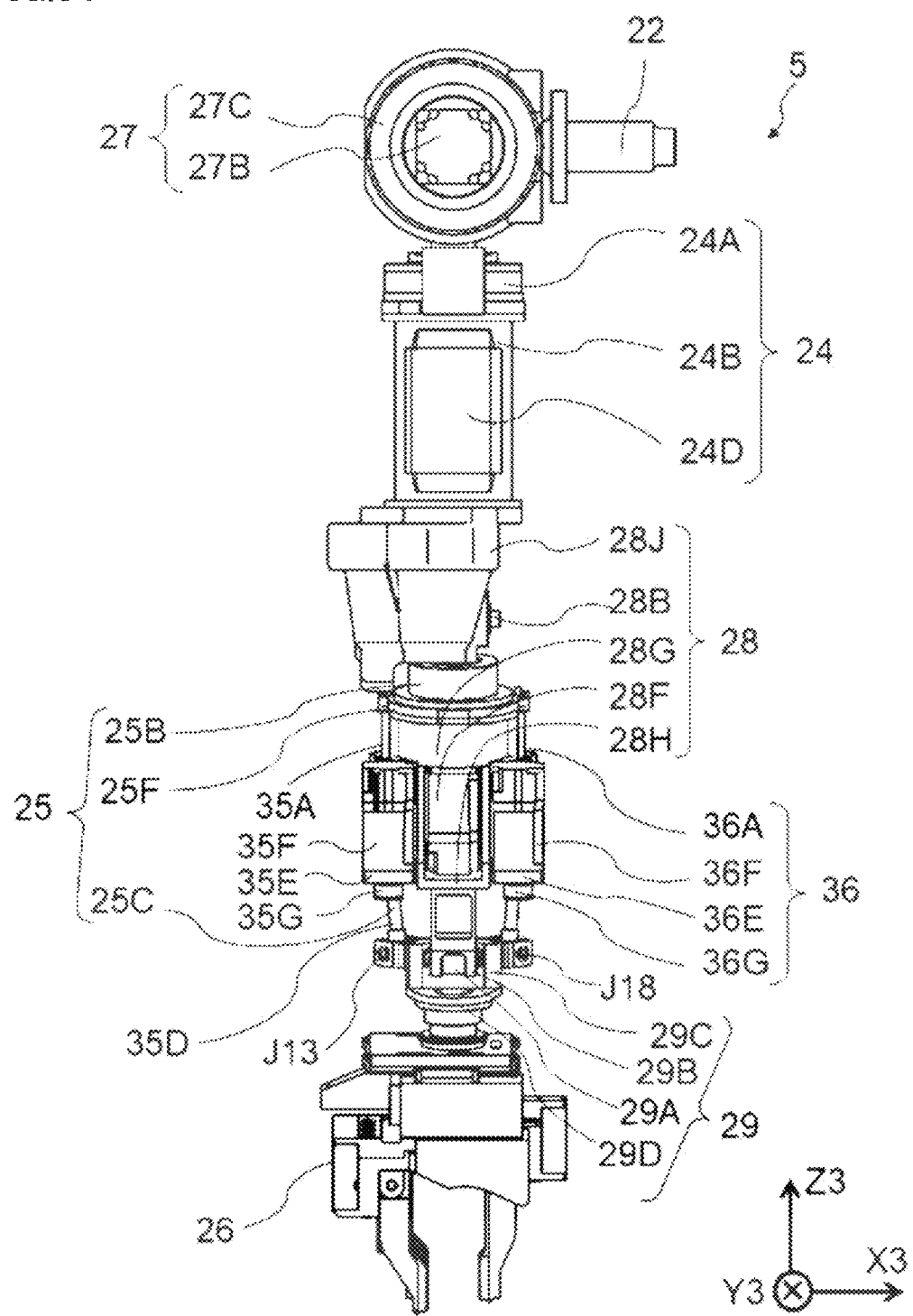
FIG. 34 is a rear view illustrating the arm included in the robot operated by the robot operation system according to the first embodiment.

As illustrated in FIG. 34, motor 28F, gear portion 28G, and motor container 28H are provided in forearm 25. Motor 28F, gear portion 28G, and motor container 2811 constitute a mechanism to rotate forearm portion 25 around the forearm rotation axis passing through forearm 25 at elbow joint 28. Motor 28F generates power rotating forearm 25. Gear portion 28G is a gear that rotates forearm 25 by the rotation of motor 28F. Motor container 28H contains motor 28F. The outer shape of gear portion 28G is a cylindrical shape with a flange. Motor container 28H is connected to the wrist side of gear portion 28G. Motor container 28H is a member having two side surfaces sandwiching motor 28F and a bottom surface connecting the side surfaces. Gear portion 28G is provided between motor 28F and forearm base 25B (described later). Rotation shaft connected portion 25A (described later), a gear mechanism, and a rotation shaft of motor 28F are present inside gear portion 28G. The gear mechanism is a mechanism to rotate forearm base 25B with respect to rotation shaft connected portion 25A by the rotation of motor 28F.

Forearm 25 includes rotation shaft connected portion 25A, forearm base 25B, a forearm bone 25C, an actuator structure 25D, a screw rod holder 25E, and a screw rod holder 25F. Rotation shaft connected portion 25A is a member that is rotated together with rotation shaft member 28B. Rotation shaft connected portion 25A and rotation shaft member 28B are integrally formed. Rotation shaft connected portion 25A has a shape similar to that of joint connected portion 24A. Rotation shaft connected portion 25A has a columnar portion connected to rotation shaft member 28B of elbow joint 28 and a cylindrical portion connected to the lower side of the columnar portion. Forearm base 251B has a cylindrical shape with a flange. The cylindrical portion of rotation shaft connected portion 25A is inserted rotatably into the circular opening on the upper surface of forearm base 25B. Gear portion 28G with the flange to which the flange of forearm base 25B are joined is provided on the side where hand 26 is provided with respect to forearm base 25B. When motor 28F is rotated, forearm base 25B is rotated with respect to rotation shaft connected portion 25A by the gear mechanism provided inside gear portion 28G.

Forearm bone 25C is a prismatic member connected onto the side of forearm base 25B where hand 26 is provided. Wrist joint 29 is provided at a tip of forearm bone 25C. Gear portion 28G having a cylindrical outer shape is connected to the lower side of forearm base 25B. Forearm bone 25C penetrates gear portion 28G and extends to the wrist side.

Actuator structure 25D is a structural member on which two actuators that change the connection angle at wrist joint 29 are installed. Actuator structure 25D is fixed to forearm bone 25C. The surface to which actuator structure 25D is fixed is a surface of forearm bone 25C that is directed the front side in the reference state.

Actuator structure 25D is a member having a shape in which a half on the side of wrist joint 29 has a T-shaped section and a half on the side of elbow joint 28 has only a T vertical rod section of the T-shape. A portion (vertical plate portion) of only the T vertical rod is connected to the outside of gear portion 28G having a cylindrical outer shape and the flange. Screw rod holder 25E is attached to an end of actuator structure 25D on the side of hand 26 having a T-shaped section. Screw rod holder 25F is connected to the end of the vertical plate portion of actuator structure 25D and the flange of forearm base 25B. Two screw rods are held rotatably between screw rod holder 25E and screw rod holder 25F.

Figure 39:
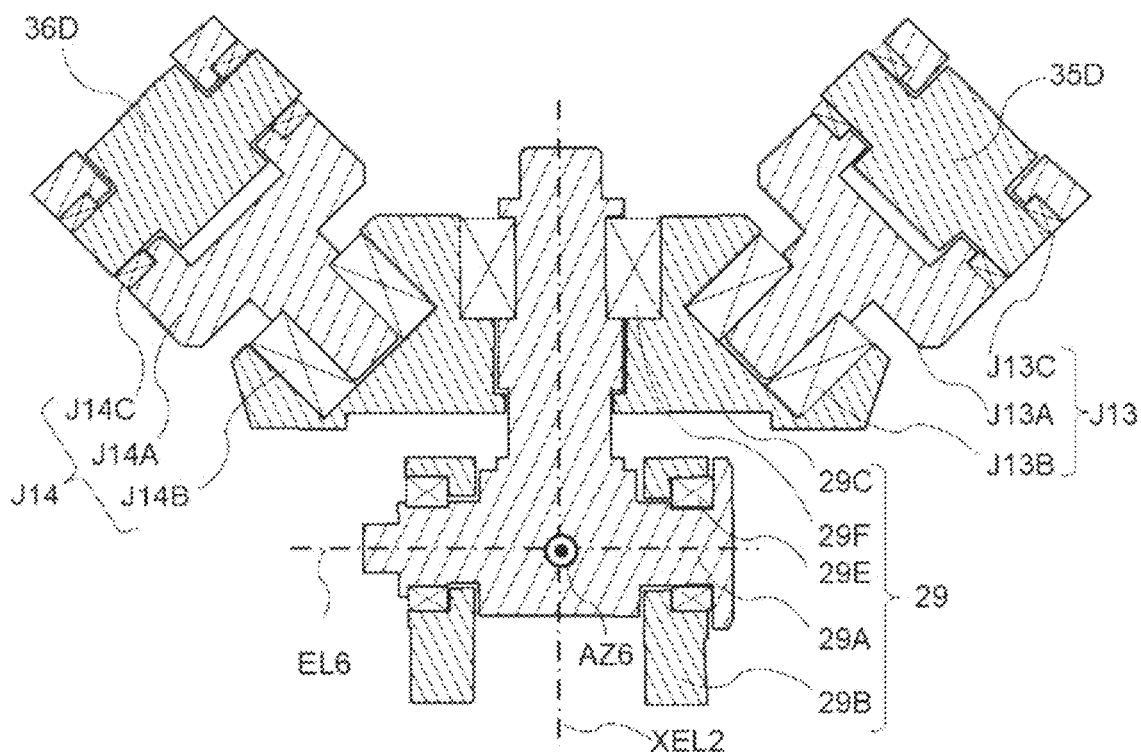
FIG. 39 is a sectional view illustrating a structure of a wrist joint included in the robot operated by the robot operation system according to the first embodiment.

Wrist joint 29 connects hand 26 to forearm 25 with two rotational degrees of freedom. Wrist joint 29 changes the angle formed by hand 26 and forearm 25 on each of two planes orthogonal to each other where the line intersection of the two planes passes through forearm 25. The front-rear direction rotation plane and the right-left direction rotation plane are two planes orthogonal to each other where the line intersection passes through forearm 25. The front-rear direction rotation plane and the right-left direction rotation plane form an angle of 45 degrees with respect to the plane determined by actuator structure 25D. FIG. 39 illustrates a sectional view of wrist joint 29. FIG. 39 is a sectional view taken along a line A-A in FIG. 35.

Wrist joint 29 includes a T-shaped member 29A, a T-shaped member holding yoke 29B, a T-shaped member holder 29C, and a wrist base 29D. T-shaped member 29A is a member having a T shape and enabling connection with two rotational degrees of freedom. T-shaped member 29A connects forearm bone 25C and wrist base 29D with two rotational degrees of freedom. T-shaped member holding yoke 29B is provided at the tip of forearm bone 25C. T-shaped member holder 29C is provided on wrist base 29D. The EL6-axis passes through the portion of the T horizontal rod of T-shaped member 29A, and the XEL2-axis passes through the portion of the T vertical rod of T-shaped member 29A. The portion of the T horizontal rod of T-shaped member 29A has a columnar shape, and the center of the column of the portion of the T horizontal rod of T-shaped member 29A is the E16-axis. The portion of the T vertical rod of T-shaped member 29A has a columnar shape, and the center of the column of the portion of the T vertical rod of T-shaped member 29A is the XEL2-axis. In T-shaped member 29A, the EL6-axis and the XEL6-axis are provided on the same plane.

T-shaped member holding yoke 29B is a member including two plate members facing each other and a plate member connecting the two plate members on the side of forearm bone 25C. T-shaped member holding yoke 29B holds both ends of the T horizontal rod of T-shaped member 29A rotatably. A bearing 29E (illustrated in FIG. 39) is provided between T-shaped member holding yoke 29B and T-shaped member 29A to make them rotatable. T-shaped member holder 29C is a member that holds the T vertical rod of T-shaped member 29A rotatably. A bearing 29F (illustrated in FIG. 39) is provided between T-shaped member holder 29C and T-shaped member 29A to make them rotatable relative to each other. T-shaped member holder 29C is a member having a section shaped like an isosceles trapezoid. The portion of the T vertical rod of T-shaped member 29A is inserted into a side surface on the lower bottom side of the trapezoid of T-shaped member holder 29C. Wrist base 29D is a disc-shaped member. T-shaped member holder 29C is connected vertically to the surface of wrist base 29D on the side opposite to the side where hand 26 is provided. The portion where the XEL2-axis included in T-shaped member 29A extends (the portion of the T vertical rod) is held by T-shaped member holder 29C rotatably. The XEL2-axis and the EL6-axis are parallel to disc-shaped wrist base 29D. The forearm rotation axis (AZ6-axis) passes through the intersection of the XEL2-axis and the EL6-axis.

The other ends of fixed-length links of a forearm outside actuator 35 and a forearm inside actuator 36 are connected to T-shaped member holder 29C rotatably.

Forearm outside actuator 35 and forearm inside actuator 36 change the rotation angle at wrist joint 29. Forearm outside actuator 35 and forearm inside actuator 36 have similar shapes. Each of forearm outside actuator 35 and forearm inside actuator 36 includes a moving member and a fixed-length link having one end connected to the moving member. The other ends of the two fixed-length links are connected to wrist joint 29. Wrist joint 29 is driven by the two fixed length links in each of which one end is moved by the moving member. Forearm outside actuator 35 and forearm inside actuator 36 are provided in forearm 25.

The structure of forearm outside actuator 35 is described. Forearm outside actuator 35 includes a screw rod 35A, a moving member 35B, a rail 35C, a link 35D, a motor installation plate 35E, a motor 35F, a belt 35G, a pulley 35H, and a pulley 35J. Both ends of screw rod 35A are held rotatably by screw rod holder 25E and screw rod holder 25F. In screw rod holder 25E and screw rod holder 25F, a rectangular parallelepiped member is provided at a portion for holding screw rod 35A. Moving member 35B has a through hole in which a female screw that meshes with the male screw of screw rod 35A is provided. Rail 35C is provided on the side surface of the vertical plate portion of actuator structure 25D in parallel to screw rod 35A. Moving member 35B includes a portion for sandwiching rail 35C. Because moving member 35B sandwiches rail 35C, when screw rod 35A is rotated, moving member 35B is moved along screw rod 35A without rotation.

Motor installation plate 35E is provided on screw rod holder 25E which is provided on the side where hand 26 is provided. Motor installation plate 35E is provided substantially perpendicular to the direction in which forearm 25 extends. Motor 35F is attached to motor installation plate 35 while being perpendicular to motor installation plate 35E and parallel to screw rod 35A. The rotation axes of screw rod 35A and motor 35F pass through an opening provided in motor installation plate 35. Belt 35G, pulley 35H and pulley 35J transmit the rotation of motor 35F to screw rod 35A. Pulley 35H is attached to screw rod 35A. Pulley 35J is attached to the rotation shaft of motor 35F. Belt 350 is stretched over pulley 35H and pulley 35J. Pulley 35H, pulley 35J, and belt 35G are provided on the side of motor installation plate 35 where motor 35F is not provided.

Because pulley 35H and pulley 35J are coupled by belt 35G, screw rod 35A is rotated when the rotation shaft of motor 35F is rotated.

When viewed from the direction in which screw rod 35A extends, moving member 35B has a shape in which two rectangles, which are orthogonal to each other, with sharing one corner, are combined and a shared corner of the two rectangles is removed to form a recessed are surface. The thicknesses of the two rectangular parts of moving member 35B are the same. In other words, moving member 35B is a member including a shape in which two rectangular parallelepipeds are connected by a coupling member. The coupling member is a member having a shape including a recessed arc-shaped side surface and two planes orthogonal to each other. Screw rod 35A penetrates one rectangular parallelepiped of moving member 35B. The other rectangular parallelepiped sandwiches rail 35C. One end of link 35D is connected to a rectangular parallelepiped part sandwiching rail 35C rotatably with two rotational degrees of freedom. The length of link 35D is constant and is not changed. Link 35D has one rotational degree of freedom that enables twisting.

A place where one end of link 35D is connected to moving member 35B rotatably is referred to as forearm outside link attaching unit J11. Forearm outside link attaching unit J11 is a biaxial gimbal. In forearm outside link attaching unit J11, a yoke provided rotatably in moving member 35B holds a shaft member provided at one end of link 35D rotatably. The yoke of forearm outside link attaching unit J11 is provided to be perpendicular to the vertical plate portion of actuator structure 25D.

The other end of link 35D is connected to hand 26 (strictly speaking, T-shaped member holder 29C) rotatably with two rotational degrees of freedom. A place where one end of link 35D is connected to hand 26 is referred to as a hand outside link attaching unit J13. Hand outside link attaching unit J13 and forearm outside link attaching unit J11 have the same structure.

Forearm inside actuator 36 includes a screw rod 36A, a moving member 36B, a rail 36C, a link 36D, a motor installation plate 36E, a motor 36F, a belt 36G, a pulley 36H, and a pulley 36J. One end of link 36D is connected to moving member 36D rotatably with two rotational degrees of freedom by a forearm inside link attaching unit 312. Forearm inside link attaching unit J12 is a biaxial gimbal. Forearm inside link attaching unit J12 has the structure similar to that of forearm outside link attaching unit J11. The other end of link 36D is connected to moving member 36D rotatably with two rotational degrees of freedom by a hand inside link attaching unit J14.

Forearm inside actuator 36 has a structure similar to that of forearm outside actuator 35. Detailed description of the structure of forearm inside actuator 36 is omitted.

Motor 35F, motor 28F, and motor 36F are arranged in parallel on the rear side of forearm 25. By doing so, the width and thickness of forearm 25 can be reduced.

Arm 5 adopts a hybrid driving system in which the joint by gear drive and the joint by link drive are combined. The shoulder joint have two rotational degrees of freedom, including one rotational degree of freedom around the axis passing through the upper arm and rotating the upper arm. The elbow joint have two rotational degrees of freedom, including one rotational degree of freedom around the axis passing through the forearm and rotating the forearm. Consequently, arm 5 can be made compact, and the range in which 26 can be present can be made greater than or equal to that of a human. In the hybrid drive system, arm 10 can output the required power and is quiet. In addition, in the hybrid drive system, each joint included in arm 5 can be driven with high accuracy.

Robot 1 can also operate in a mode (referred to as arm linked mode) in which the connection angle of the arm base joint is changed to be linked with the elevation angle when the elevation angle is changed by slide mechanism 17. The elevation angle is an angle formed by the direction in which body 12 extends and the vehicle portion reference plane. In the arm linked mode, even when slide mechanism 17 changes the elevation angle, the direction in which arm 5 extends is not changed. Therefore, when the elevation angle is changed by slide mechanism 17, the connection angle at the arm base joint is changed around the AZ4-axis by the same angle as an angle, by which the elevation angle is changed, in the direction opposite to the direction in which the elevation angle is changed. That is, when the elevation angle is changed by δ1 by slide mechanism 17, the arm base joint is rotated by δ2 (=−δ1) around the EL4-axis. δ1 is the first angle that changes the elevation angle. δ2 is the second angle having the same absolute value as δ1 and a different sign from δ1. Control device 60 in the arm linked mode is an arm linked controller that controls the arm base joint to change the arm base rotation angle by second angle δ2 (=−δ1) when slide mechanism 17 changes elevation angle δ by first angle δ1.

Even when the elevation angle of body 12 is changed by body position changing mechanism 1B, operator 90 can operate the robot while keeping arms 5, right-eye camera $2_R$, and left-eye camera $2_L$ directing the same direction, in combination with the function of not changing the directions of the optical axes of right-eye camera $2_R$ and left-eye camera $2_L$. It is no longer necessary for operator 90 to perform an operation of changing the directions of arms 5 and the visual line directions of right-eye camera $2_R$ and left-eye camera $2_L$ to match the change in the elevation angle.

Figure 40:
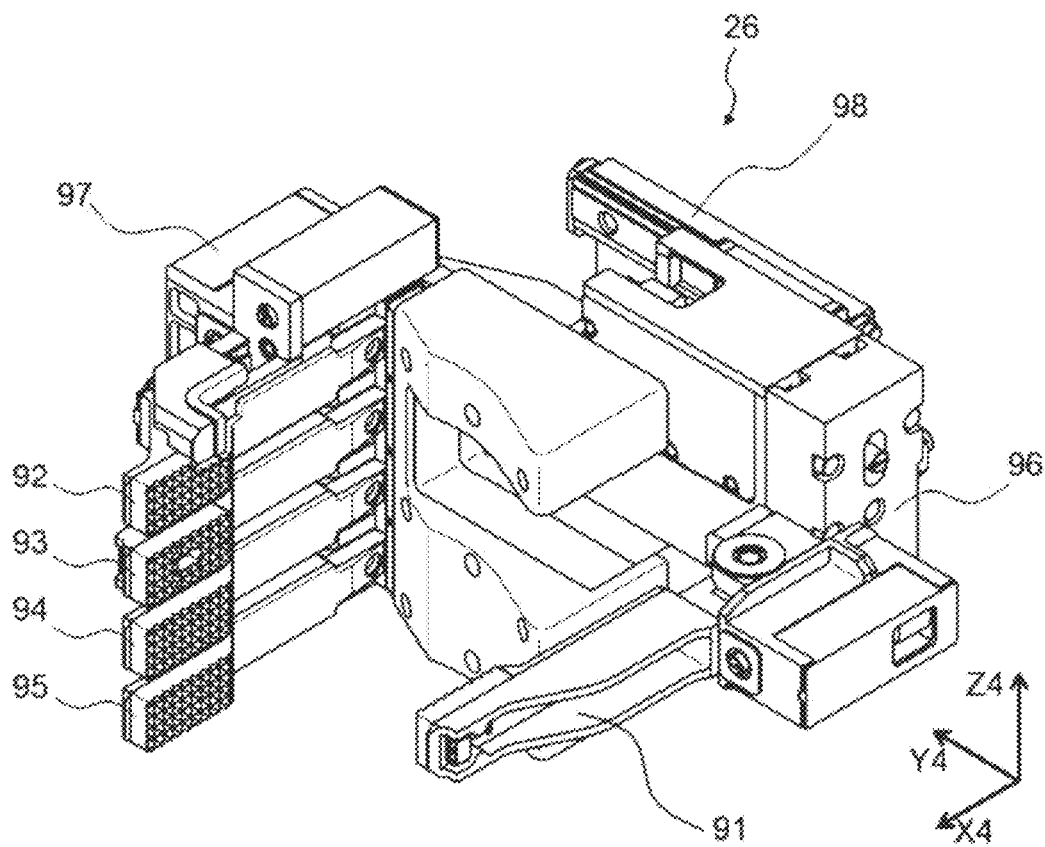
FIG. 40 is a perspective view illustrating a hand included in the robot operated by the robot operation system according to the first embodiment.
Figure 41:
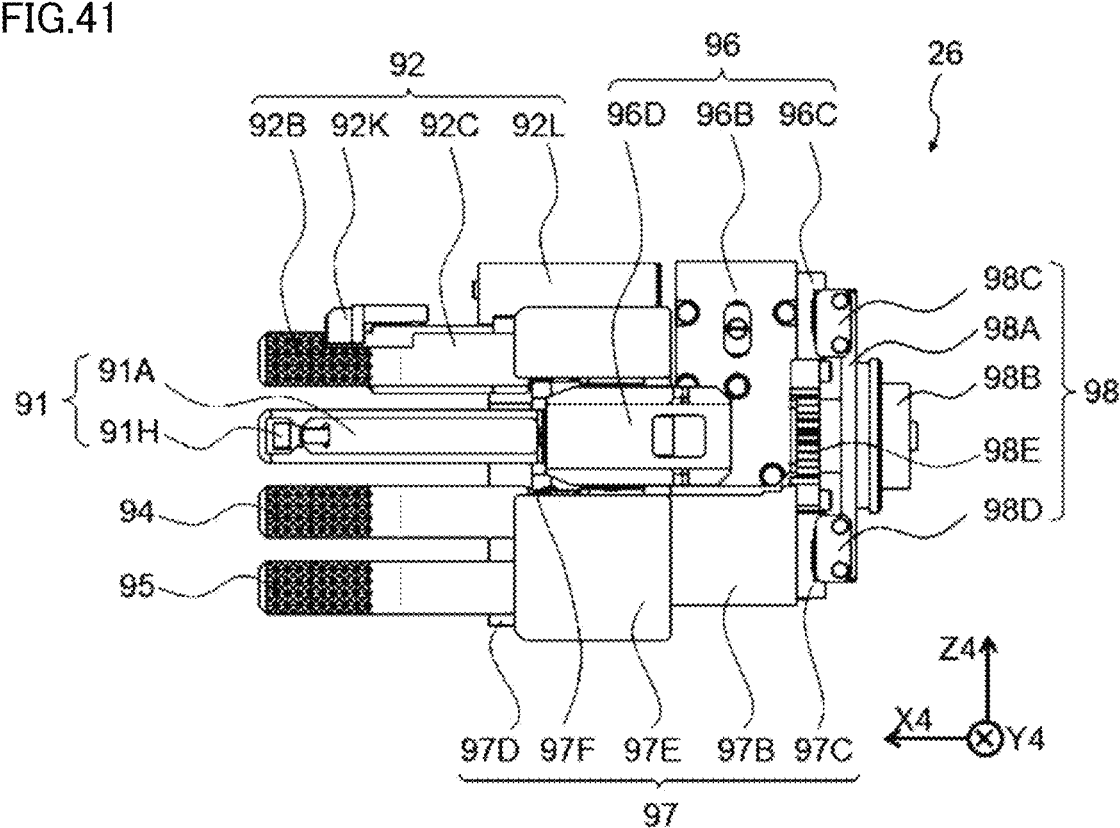
FIG. 41 is a front view illustrating the hand included in the robot operated by the robot operation system according to the first embodiment.
Figure 42:
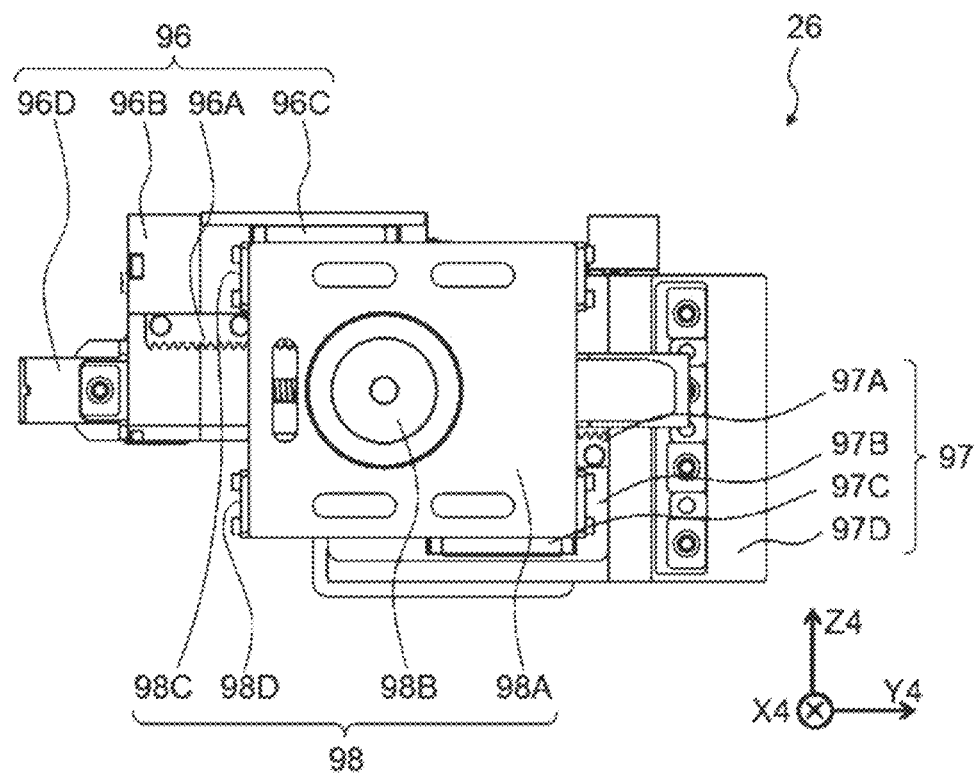
FIG. 42 is a right side view illustrating the hand included in the robot operated by the robot operation system according to the first embodiment.
Figure 43:
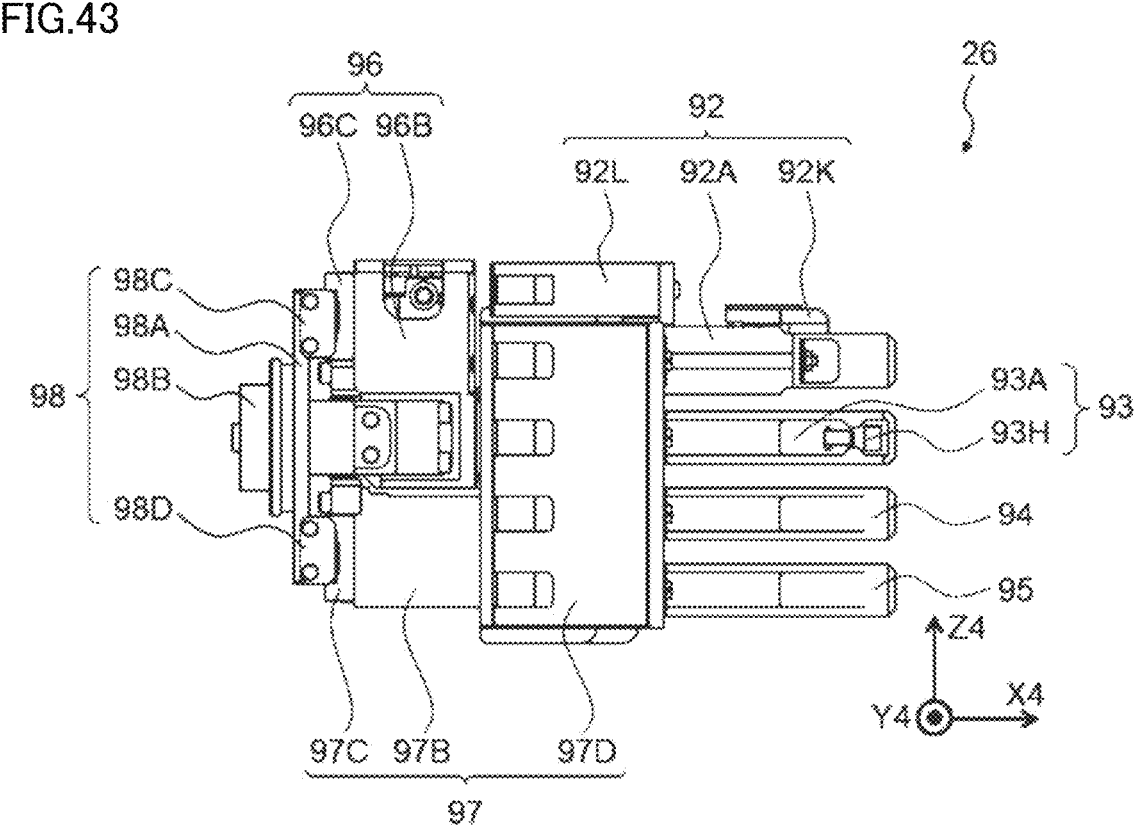
FIG. 43 is a rear view illustrating the hand included in the robot operated by the robot operation system according to the first embodiment.
Figure 44:
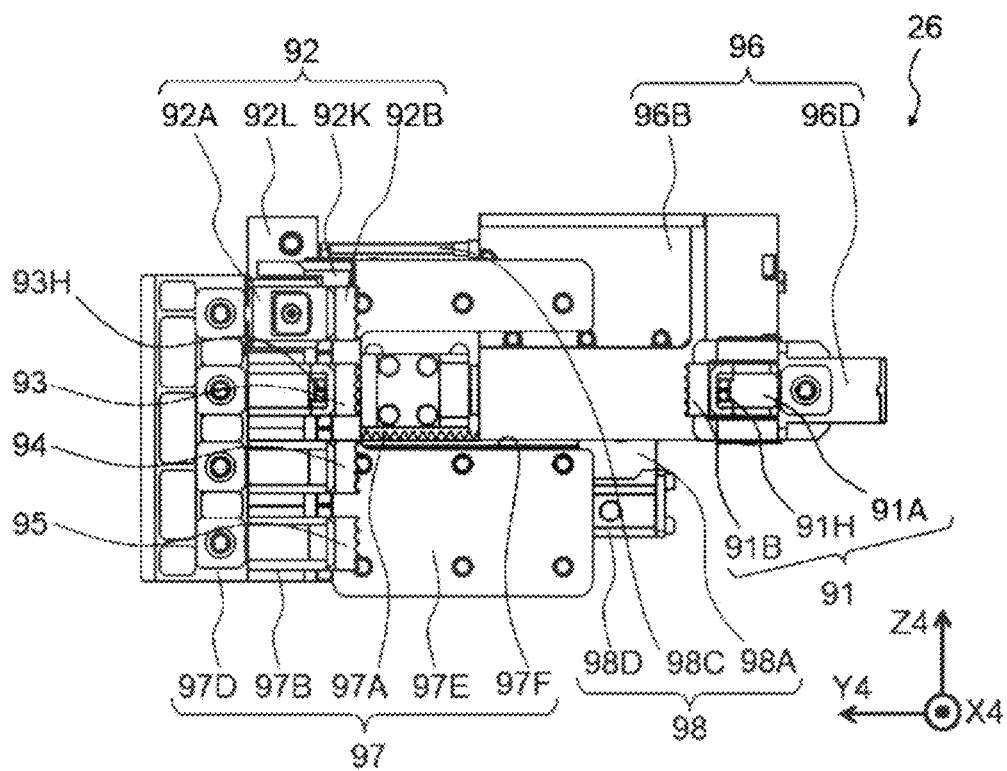
FIG. 44 is a left side view illustrating the hand included in the robot operated by the robot operation system according to the first embodiment.
Figure 45:
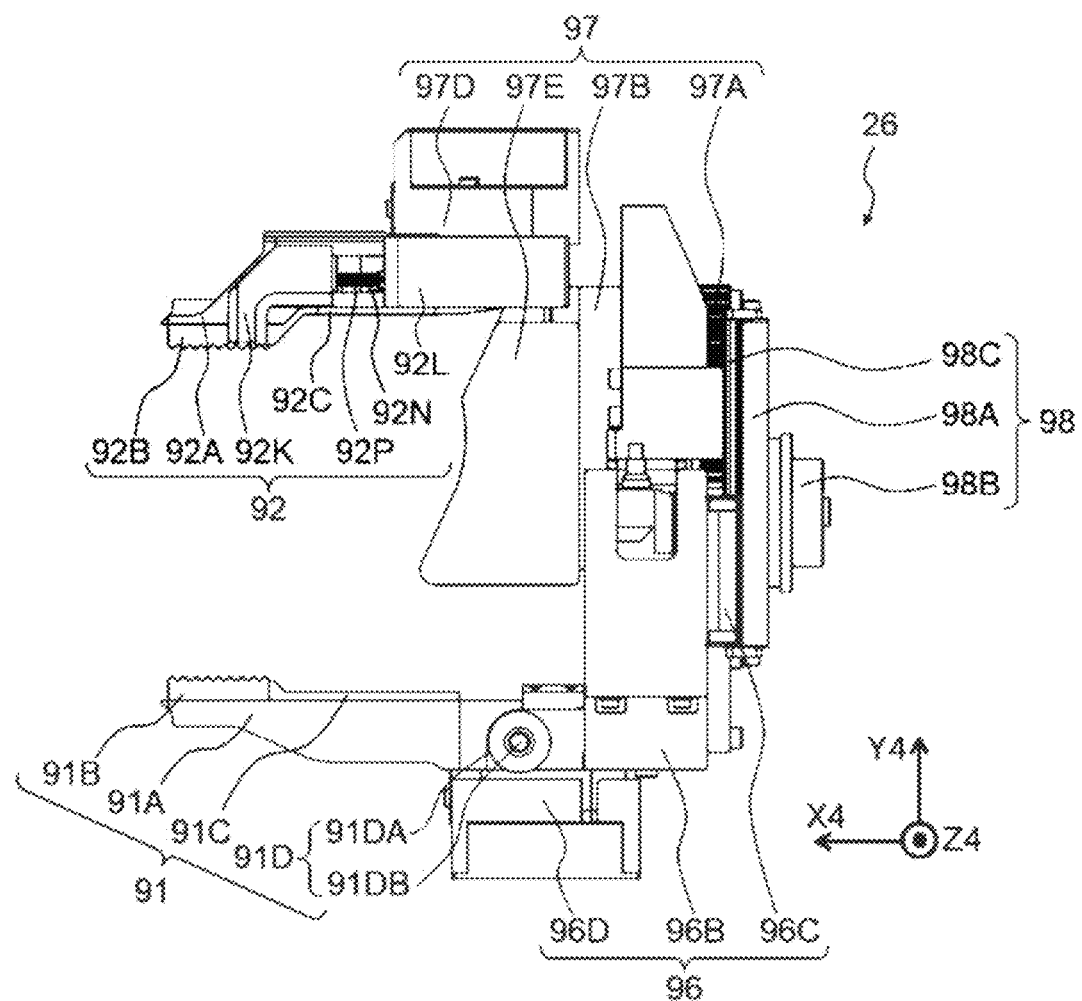
FIG. 45 is a plan view illustrating the hand included in the robot operated by the robot operation system according to the first embodiment.
Figure 46:
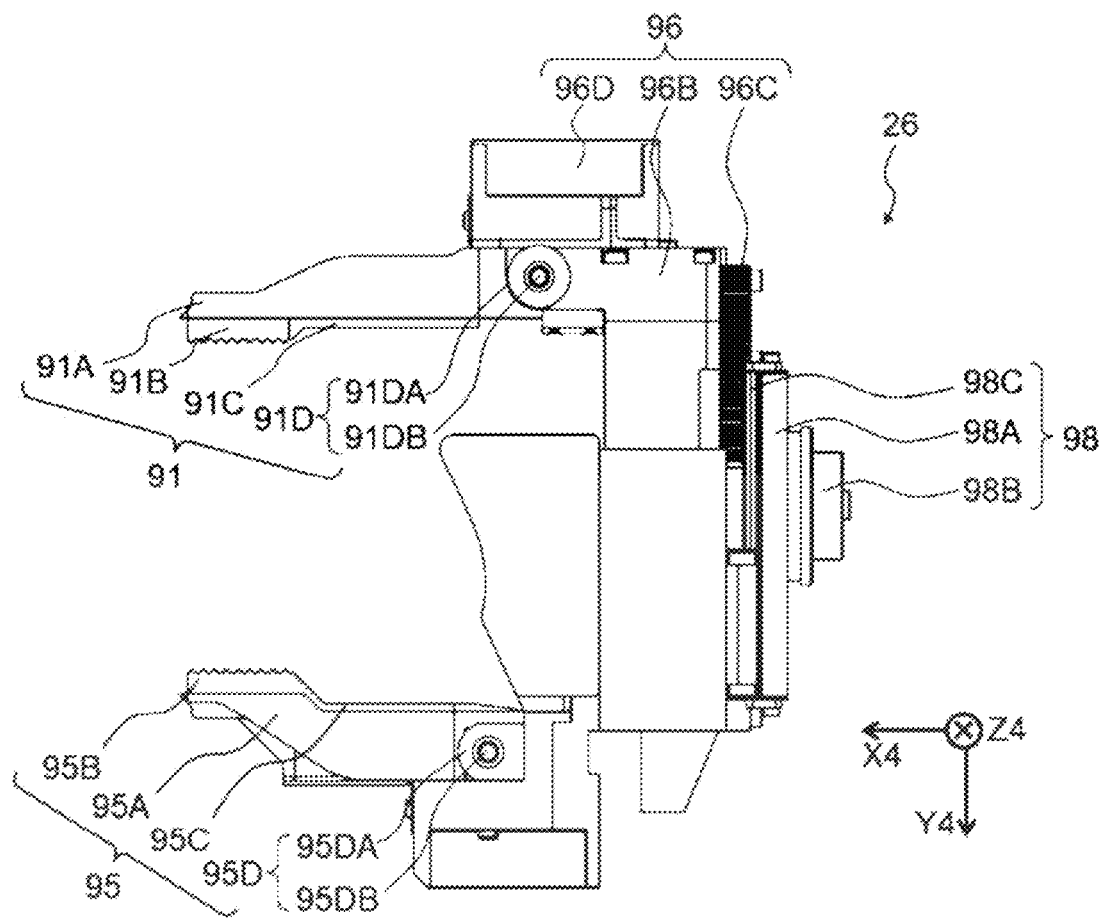
FIG. 46 is a bottom view illustrating the hand included in the robot operated by the robot operation system according to the first embodiment.

Referring to FIGS. 40 to 53, the structure of hand 26 is described. FIG. 40 is a perspective view of hand 26. FIGS. 41 to 46 are a front view, aright side view, a rear view, a left side view, a plan view, and a bottom view of hand 26. When hand 26 is used, the fingers are often directed to horizontal direction. Here, the front direction of hand 26 is determined to the direction orthogonal to the direction in which the fingers extend while the fingers are directed to horizontal direction. Hand 26 has five fingers. Hand 26 is disposed such that four fingers being disposed side by side and one finger face each other. The one finger and the four fingers move linearly such that the distance therebetween increases or decreases. In each of the five fingers, the entire finger is rotatable from its base. FIGS. 47 to 51 are perspective views illustrating states 1 to 5 in which hand 26 is changed. FIG. 52 is a perspective view in which an electric screwdriver is operated in the changed state 5.

Hand 26 includes a first finger 91, four fingers being disposed side bay side, that are, a second finger 92, a third finger 93, a fourth finger 94, and a fifth finger 95, a first finger connection portion 96, a second finger connection portion 97, and a wrist connector 98. First finger 91 is disposed to face third finger 93. Second finger 92 is disposed side by side with third finger 93. Fourth finger 94 is disposed side by side with third finger 93 on the side opposite to the side where second finger 92 is disposed. Fifth finger 95 is disposed side by side with fourth finger 94 on the side opposite to the side where third finger 93 is disposed. First finger 91 is connected to first finger connection portion 96 rotatably. Second finger 92, third finger 93, fourth finger 94, and fifth finger 95, which are four fingers, are connected to second finger connection portion 97 independently and rotatably. Wrist connector 98 is connected to wrist joint 29. It can be considered that first finger 91 corresponds to the thumb of a human hand, second finger 92 corresponds to the index finger, third finger 93 corresponds to the middle finger, fourth finger 94 corresponds to the ring finger, and fifth finger 95 corresponds to the little finger.

In order to describe the structure of hand 26, a fourth orthogonal coordinate system is defined as follows.

X4-axis: An axis perpendicular to wrist connector 98.

Y4-axis: An axis parallel to the direction in which the finger is moved linearly.

Z4-axis: An axis parallel to the direction in which the four fingers are disposed.

The direction of fingertip in the reference state is defined as the positive direction of the X4-axis, the direction from first finger 91 toward third finger 93 is defined as the positive direction of the Y4-axis, and the direction from fifth finger 95 toward second finger 92 is defined as the positive direction of the Z4-axis. The direction parallel to the X4-axis is referred to as a fingertip direction. The side where an X4-coordinate value is large is referred to as fingertip side, and the side where X4-coordinate value is small is referred to as a finger base side. The direction parallel to the Z4-axis is referred to as a hand width direction. The side where Z4-coordinate value is large is referred to as a second finger side, and the side where Z4-coordinate value is small is referred to as a fifth finger side. The direction parallel to the Y4-axis is referred to as a sliding direction. The side where Y4-coordinate value is large is referred to as a third finger side, and the side where Y4-coordinate value is small is referred to as a first finger side.

First finger connection portion 96 is movable in the sliding direction with respect to wrist connector 98. First finger 91 is connected to first finger connection portion 96 rotatably. Second finger connection portion 97 is movable in the sliding direction with respect to wrist connector 98. Second finger 92, third finger 93, fourth finger 94, and fifth finger 95 are connected to second finger connection portion 97 rotatably. Both first finger connection portion 96 and second finger connection portion 97 move in linkage when they move in the sliding direction. The distance of movement with respect to wrist connector 98 is the same at first finger connection portion 96 and second finger connection portion 97, and the moving directions are opposite to each other.

Wrist connector 98 includes a hand base 98A, a connection columnar portion 98B, a first rail 98C, a second rail 98D, a pinion 98E (illustrated in FIG. 41), and a motor (not illustrated). Hand base 98A is a plate-like member parallel to a Y4Z4-plane. First finger connection portion 96 and second finger connection portion 97 are connected to hand base 98A. When viewed from the direction parallel to the X4-axis, hand base 98A has a rectangular shape in which a ratio of a length in the Z4-axis direction to a length in the Y4-axis direction is about 10:11. Connection columnar portion 98B is a member connected to wrist joint 29. Connection columnar portion 98B is connected to the principal surface on the finger base side of hand base 98A. In connection columnar portion 98B, the outer shape is columnar, the diameter is large on the fingertip side, and the diameter decreases stepwise on the side where wrist joint 29 is provided. Connection columnar portion 98B is fixed to wrist base 29D of wrist joint 29. The center axis of connection columnar portion 98B is defined as the X4-axis. The center axis of connection columnar portion 98B is located at the center in the Z4-axis direction of hand base 98A and at the position slightly on the side where first finger 91 exists in the Y4-axis direction. The intersection of the X4-axis and the principal surface of hand base 98A on which first rail 98C and the like are provided is set to be an origin of the fourth orthogonal coordinate system.

The center axis (X4-axis) of connection columnar portion 98B passes through the intersection of the EL6-axis and the XEL-axis that are the two rotation axes included in wrist joint 29. The forearm rotation axis (AZ6-axis) also passes through the intersection of the EL6-axis and the XEL-axis. Consequently, wrist joint 29 can connect hand 26 to forearm 25 while the X4-axis coincides with the AZ6-axis (the state where the X4-axis exists on the same straight line as the AZ6-axis). When forearm 25 and hand 26 are rotated around the forearm rotation axis (AZ6-axis) while the X4-axis coincides with the AZ6axis, hand 26 is rotated around the X4-axis.

First rail 98C is a rail on which first finger connection portion 96 is slid and is moved in the direction parallel to the Y4-axis. Second rail 98D is a rail on which second finger connection portion 97 is slid and is moved in the direction parallel to the Y4-axis. First rail 98C and second rail 98D are provided on the principal surface on the fingertip side of hand base 98A. First rail 98C is provided along a side on the second finger side of the principal surface of hand base 98A. Second rail 98D is provided along a side on the fifth finger side of the principal surface of hand base 98A. Pinion 98E is a gear that is rotated around the X4-axis. Pinion 98E is engaged with a first rack 96A provided on first finger connection portion 96 and a second rack 97A provided on second finger connection portion 97. When pinion 98E is rotated, first rack 96A, namely, first finger connection portion 96 and second rack 97A, namely, second finger connection portion 97 move in opposite directions by the same distances. Meter 98F A motor generates the power that moves first rack 96A and second rack 97A with respect to pinion 98E.

Hand 26 may include a moving mechanism that moves only one of first finger connection portion 96 and second finger connection portion 97, instead of the moving mechanism that moves first finger connection portion 96 and second finger connection portion 97. Hand 26 may include a moving mechanism that moves at least one of first finger connection portion 96 and second finger connection portion 97.

First finger connection portion 96 includes first rack 96A, a first frame 96B, a first holder 96C, and a first finger connection frame 96D. First frame 96B is a frame having a rectangular parallelepiped outer shape including a principal surface parallel to Y4Z4-plane. First rack 96A is provided along a side (parallel to the Y4-axis) on the finger base side of the side surface on the fifth finger side of first frame 96B. First holder 96C is a member that holds first rail 98C. First holder 96C holds first rail 98C, and first finger connection portion 96 can be moved along first rail 98C without being separated from hand base 98A. First holder 96C is provided along the side (parallel to the Y4-axis) on the second finger side of the principal surface on the finger base side of first frame 96B. First finger connection frame 96D is a member to which first finger 91 is connected rotatably. First finger connection frame 96D is connected to the side surface of first frame 96B on the first finger side.

Second finger connection portion 97 includes second rack 97A, a second frame 97B, a second holder 97C, a second finger connection frame 97D, and a palm flesh portion 97E. Second frame 97B is a frame having a rectangular parallelepiped outer shape including the principal surface parallel to Y4Z4-plane. The length in the X4-axis direction of second frame 97B is slightly shorter than that of first frame 96B. Second rack 97A is provided along the side (parallel to the Y4-axis) on the finger base side of the side surface on the second finger side of second frame 97B. The distance between second rack 97A and hand base 98A is the same as the distance between first rack 96A and hand base 98A. Second holder 97C is a member that holds second rail 98D. When second holder 97C holds second rail 98D, second finger connection portion 97 can be moved along second rail 98D without being separated from hand base 98A. Second holder 97C is provided along the side (parallel to the Y4-axis) on the fifth finger side of the principal surface on the finger base side of second frame 97B. Second finger connection frame 97D is a member to which second finger 92, third finger 93, and fourth finger 95 are connected rotatably. Second finger connection frame 97D is connected to the side surface on the third finger side of second frame 97B.

A finger moving portion is composed of first rail 98C, first holder 96C, second rail 98D, second holder 97C, first rack 96A, second rack 97A, pinion 98E, and a motor. The finger moving portion is a moving mechanism that moves at least one of first finger connection portion 96 and second finger connection portion 97 with respect to hand base 98 such that the distance between first finger 91 and third finger 93 increases or decreases.

The finger moving portion included in hand 26 moves first finger connection portion 96 and second finger connection portion 97. As the finger moving portion, a The finger moving portion that moves only one of the first finger connection portion and the second finger connection portion with respect to the hand base may be used.

Palm flesh portion 97E is connected to the side surface on the first finger side of second finger connection frame 97D at the position closer to the fingertip side than second frame 97B. Palm flesh portion 97E has a rectangular parallelepiped notch 97F in the sliding direction at a portion facing to first finger 91 in the hand width direction. First finger 91 rotated with respect to first finger connection frame 96D can be housed in notch 97F. Palm flesh portion 97E comes into contact with an object on the finger base side when hand 26 holds the object. Palm flesh portion 97E supports second finger 92, fourth finger 94, and fifth finger 95 that are rotated with respect to second finger connection frame 97D on the finger base side.

Each of second finger 92, fourth finger 94, and fifth finger 95 can be rotated in the range from the angle perpendicular to hand base 98A to the angle at which each of second finger 92, fourth finger 94, and fifth finger 95 comes into contact with palm flesh portion 97E. First finger 91 can be rotated in the range from the angle perpendicular to hand base 98A to the angle at which first finger 91 comes into contact with first frame 96B or third finger 93. Third finger 93 can be rotated in the range from the angle perpendicular to hand base 98A to the angle at which third finger 93 comes into contact with palm flesh portion 97E or first finger 91.

The structure of finger is described. First finger 91 includes a finger body 91A, a fingertip 91B, a finger inside cover 91C, a finger joint 91D, a worm wheel 91E (illustrated in FIG. 48), a worm (not illustrated), a motor (not illustrated), a distance sensor 91H, and an opening 91J. Finger body 91A has a shape including an inside surface of a finger and side surfaces on both sides of the inside surface. The inside surface and the side surfaces are made of steel plates. The inside surface of first finger 91 is a surface moving toward hand base 98A when first finger 91 is rotated. The inside is defined similarly in second finger 92 and the like. The side surface of finger body 91A has a low height on the fingertip side and a high height on the finger base side. Finger body 91A includes a bottom surface thicker than the side surface and provided at a part of the bottom on the finger base side. The fingertip side of finger body 91A is open. A steel material part having a narrow width in the hand width direction is provided on the finger base side of the bottom surface of finger body 91A.

Fingertip 91B is a resin member attached to the inside of the fingertip of finger body 91A. Irregularities having a height of about 2 mm are provided on the surface of fingertip 91B so that fingertip 91B and the object are more firmly in contact with each other. Fingertip 91B has a sufficient area that is in contact with the object when holding the object. Finger inside cover 91C is a resin member attached to the inside surface of finger body 91A. Finger inside cover 91C is thinner than fingertip 91B.

Finger joint 91D has a configuration in which a yoke 91DA provided in first finger connection frame 96D holds a dactylus rotation axis 91 DB provided in first finger 91 rotatably. Worm wheel 91E is connected to the bottom surface on the finger base side of finger body 91A so as to be rotated together with dactylus rotation axis 91 DB. Worm 91F A worm is fitted to worm wheel 91E. Werm 91F The worm is contained in first finger connection frame 96D. The opening is provided on the surface of first finger connection frame 96D on the side where finger joint 91D is provided, and worm wheel 91E exists in the opening and is fitted to the worm 91F.

Motor 91G A motor generates power rotating the worm 91F. Motor 91G The motor is contained in first finger connection frame 96D. First finger connection frame 96D also contains the gear that transmits the rotation of the motor 916 to the worm 91F.

Distance sensor 91H is a sensor that measures the distance between fingertip 91B and a nearby object. Distance sensor 91H emits a light beam passing through opening 91J provided in finger body 91A and measures the distance to the object. Distance sensor 91H is a first distance sensor provided at the fingertip of first finger 91.

Third finger 93 has the same structure as first finger 91. Third finger 93 includes a finger body 93A, a fingertip 93B, a finger inside cover 93C, a finger joint 93D, a worm wheel 93E (illustrated in FIG. 49), a worm 93F (illustrated in FIG. 49), a motor 93G (not illustrated), a distance sensor 93H, and an opening 93J. Distance sensor 93H is a second distance sensor provided at the fingertip of third finger 93. Finger body 93A is made of steel plates. Fingertip 93B and finger inside cover 93C are made of resin. Finger body 93A has an inside surface with a difference in thickness. On the inside surface of finger body 93A, the difference in thickness is provided between a part where fingertip 93B is provided and a part where finger inside cover 93C is provided. The part where fingertip 93B is provided and the part where finger inside cover 93C is provided are parallel to each other, and the part where fingertip 93B is provided to be thicker. Worm 93F and the motor 93G are contained in second finger connection frame 97D.

Fourth finger 94 and fifth finger 95 have the same shape as third finger 95. Fourth finger 94 and fifth finger 95 do not include a distance sensor or an opening. Fourth finger 94 is disposed on a side of third finger 93, the side is opposite to the side where second finger 92 is disposed, and connected to second finger connection portion 97 rotatably. Fifth finger 95 is disposed on a side of fourth finger 94, the side is opposite to the side where third finger 93 is disposed, and connected to second finger connection portion 97 rotatably.

In addition to the structure similar to that of fourth finger 94, second finger 92 includes a slide fingertip 92K that is moved to the finger base side along a finger body 92A and a drive mechanism that moves slide fingertip 92K. Second finger 92 includes finger body 92A, a fingertip 92B, a finger inside cover 92C, a finger joint 92D, a worm wheel 92E (illustrated in FIG. 49), a worm 92F (illustrated in FIG. 49), a first motor (not illustrated), slide fingertip 92K, a motor container 92L, a second motor (not illustrated), a screw rod 92N (illustrated in FIG. 45), an opening 92P (illustrated in FIG. 45), and a nut (not illustrated). Slide fingertip 92K is provided on the side surface of finger body 92A on the side that is opposite to third finger 93. Slide fingertip 92K has a shape bent inward when viewed from the direction of Z4-axis. The position of the curved tip of slide fingertip 92K in the direction perpendicular to fingertip 92B is substantially the same as the position of the surface of fingertip 92B, and the position in the direction in which second finger 92 extends is substantially the same as the end on the finger base side of fingertip 92B. For this reason, slide fingertip 92K does not interfere when second finger 92 holds the object. Slide fingertip 92K can be moved to the finger base side along finger body 92A by the distance of about 20% of the length of finger body 92A. Slide fingertip 92K is a hook portion that is provided on the side of second finger 92 opposite to the side where third finger 93 is disposed and is bent to the side (inside) on which first finger 91 is provided.

Finger body 92A contains a mechanism that moves slide fingertip 92K, and has a rectangular tubular outer shape. Opening 92P extending in the length direction of finger body 92A is provided on the side surface of finger body 92A on the side where third finger 93 is not disposed. The length of opening 92P is substantially equal to the length in which slide fingertip 92K can be moved. Screw rod 92N is provided in opening 92P. Screw rod 92N is provided in finger body 92A on the finger base side. A nut in which a through hole including a female screw fitted with screw rod 92N is provided inside of finger body 92A. The position of the nut in the length direction with respect to finger body 92A is determined, and the length of screw rod 92N being out of finger body 92A is changed as the nut 92Q is rotated. The first motor generates power rotating the nut 92Q. Motor container 92L contains the first motor. The mechanism that moves slide fingertip 92K is a hook portion moving portion that moves slide fingertip 92K along second finger 92 in the direction toward second finger connection portion 97.

The number of movable parts included in hand 26 is seven. Five fingers, namely, first finger 91, second finger 92, third finger 93, fourth finger 94, and fifth finger 95 can be rotated in hand 26. The distance between first finger connection portion 96 and second finger connection portion 97 can be changed. Slide fingertip 92K of second finger 92 can be moved. Hand 26 has a simple structure. For example, when each of five fingers is able to be bent at two finger joints, at least 10 drive mechanisms are required.

First finger 91 can be rotated from the position perpendicular to hand base 98A to the position parallel to hand base 98A. When first finger 91 is parallel to hand base 98A, first finger 91 is housed in notch 97F provided in palm flesh portion 97E. Second finger 92, third finger 93, fourth finger 94, and fifth finger 95 can be changed the angle with respect to hand base 98A independently. Second finger 92, third finger 93, fourth finger 94, and fifth finger 95 can be rotated from the position perpendicular to hand base 98A to the position that is in contact with palm flesh portion 97E.

Figure 47:
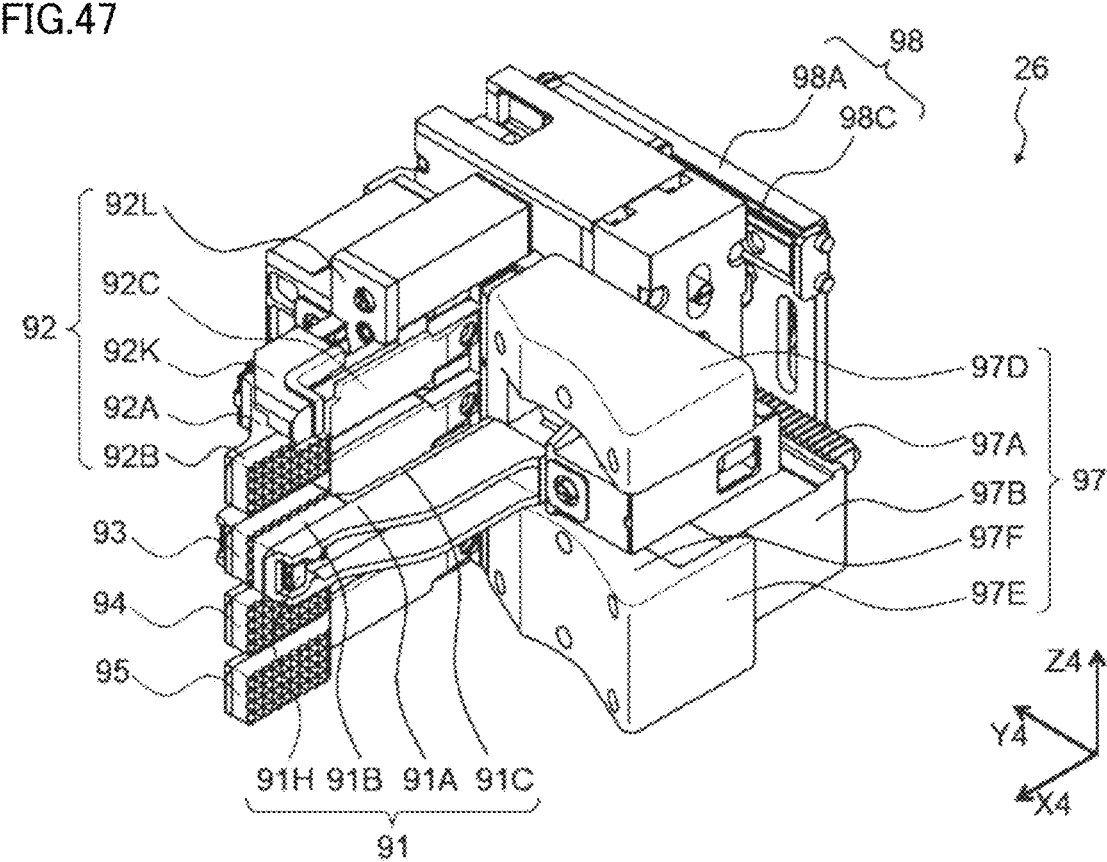
FIG. 47 is a perspective view illustrating the hand included in the robot operated by the robot operation system according to the first embodiment in a changed state 1.

In state 1 illustrated in FIG. 47, first finger 91, second finger 93, third finger 93, fourth finger 94, and fifth finger 95 are perpendicular to hand base 98A, and fingertip 91B of first finger 91 and fingertip 93B of third finger 93 can be in contact with each other. In state 1, the object can be held between fingertip 91B and fingertip 93B. Hand 26 in state 1 can hold a thin object such as paper. In hand 26 in state 1, the object is sandwiched between the four fingers and first finger 91, so that even a large object can be sandwiched.

Figure 48:
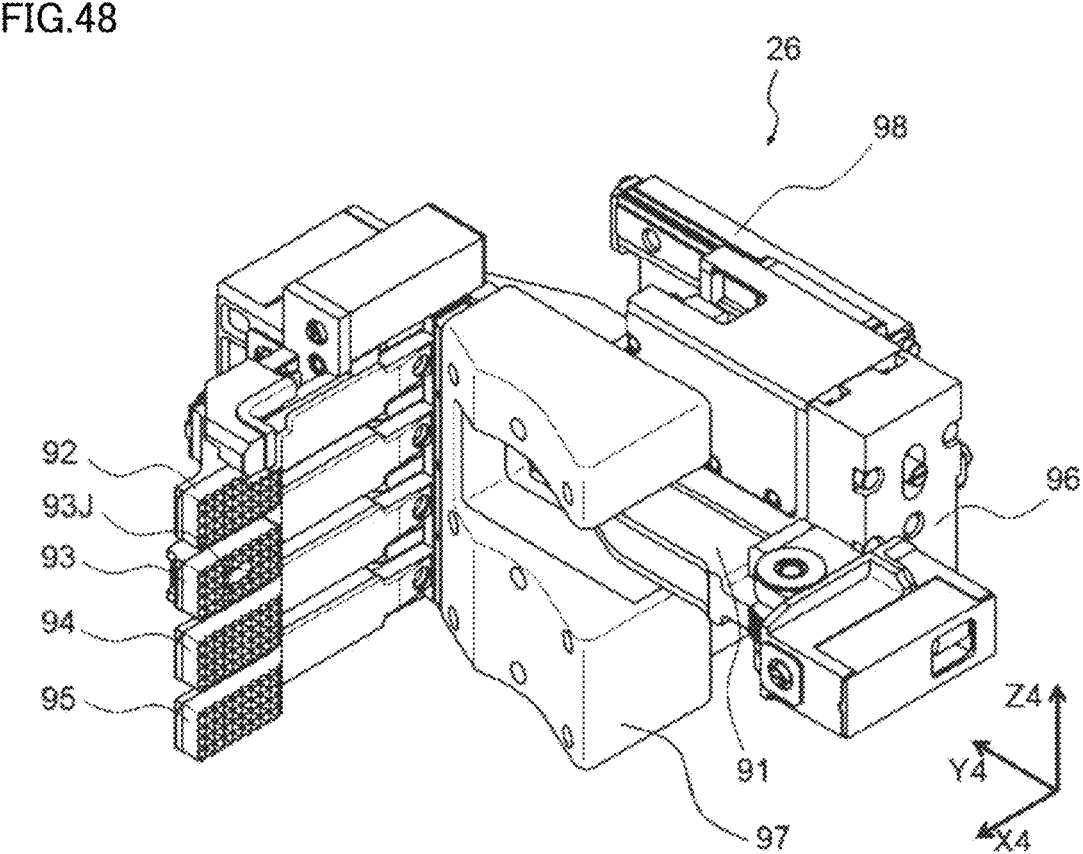
FIG. 48 is a perspective view illustrating the hand included in the robot operated by the robot operation system according to the first embodiment in a changed state 2.

In state 2 illustrated in FIG. 48, only first finger 91 can be made parallel to hand base 98A, and second finger 93, third finger 93, fourth finger 94, and fifth finger 95 can be made perpendicular to hand base 98A. In hand 26 in state 2, when wrist joint 29 is rotated such that the inside surfaces of second finger 93, third finger 93, fourth finger 94, and fifth finger 95 included in hand 26 in state 2 are directed upward, the object can be placed on the four fingers included in hand 26. In addition, the four fingers can be used like a scoop.

Figure 49:
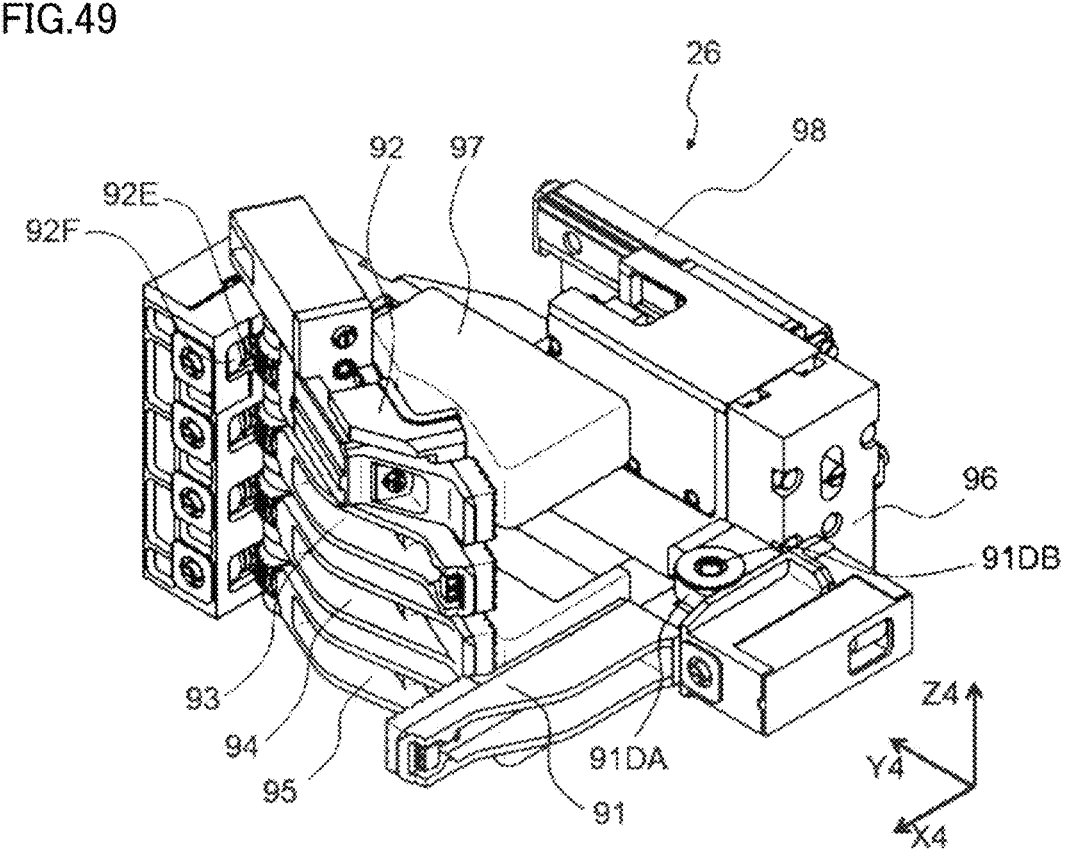
FIG. 49 is a perspective view illustrating the hand included in the robot operated by the robot operation system according to the first embodiment in a changed state 3.

In state 3 illustrated in FIG. 49, only first finger 91 is perpendicular to hand base 98A, and second finger 93, third finger 93, fourth finger 94, and fifth finger 95 are in contact with palm flesh portion 97E. Hand 26 in state 3 can press a button or the like with fingertip 91B of first finger 91.

Figure 50:
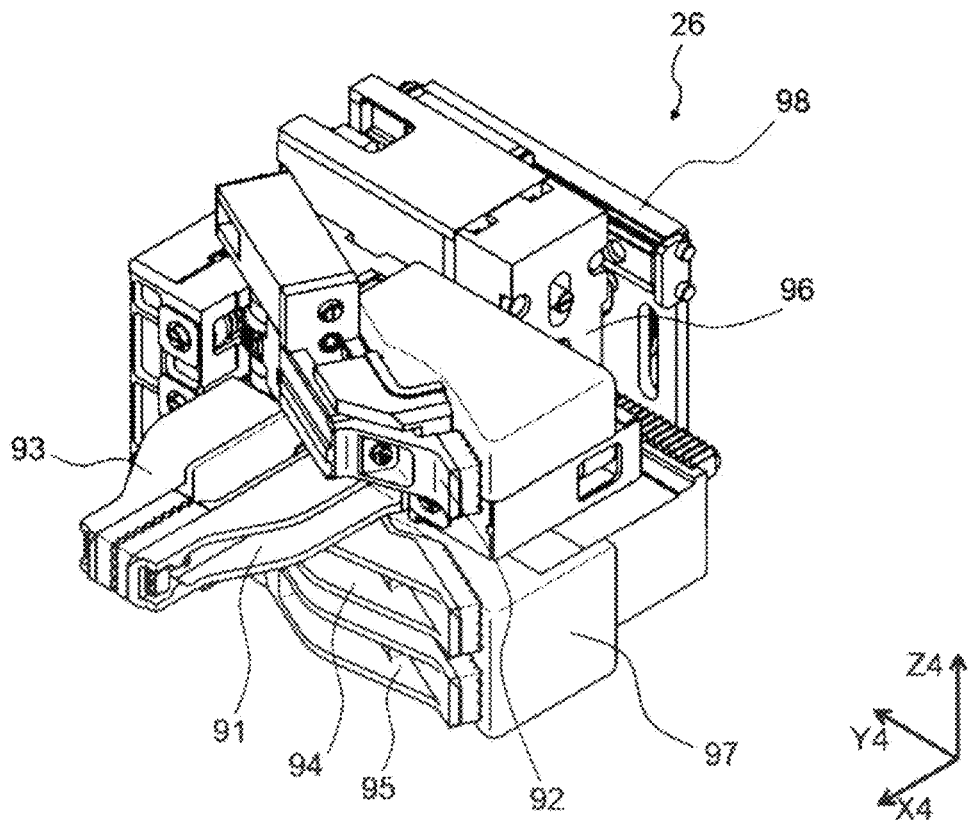
FIG. 50 is a perspective view illustrating the hand included in the robot operated by the robot operation system according to the first embodiment in a changed state 4.

In state 4 illustrated in FIG. 50, first finger 91 and third finger 93 are perpendicular to hand base 98A, and second finger 93, fourth finger 94, and fifth finger 95 are in contact with palm flesh portion 97E. Similarly to state 1, hand 26 in state 4 can hold the object between fingertip 91B and fingertip 93B. Fingertips of first finger 91 and third finger 93 can be put in a narrow space where second finger 93, fourth finger 94, and fifth finger 95 being in a standing state cannot be put in to hold the object.

Figure 51:
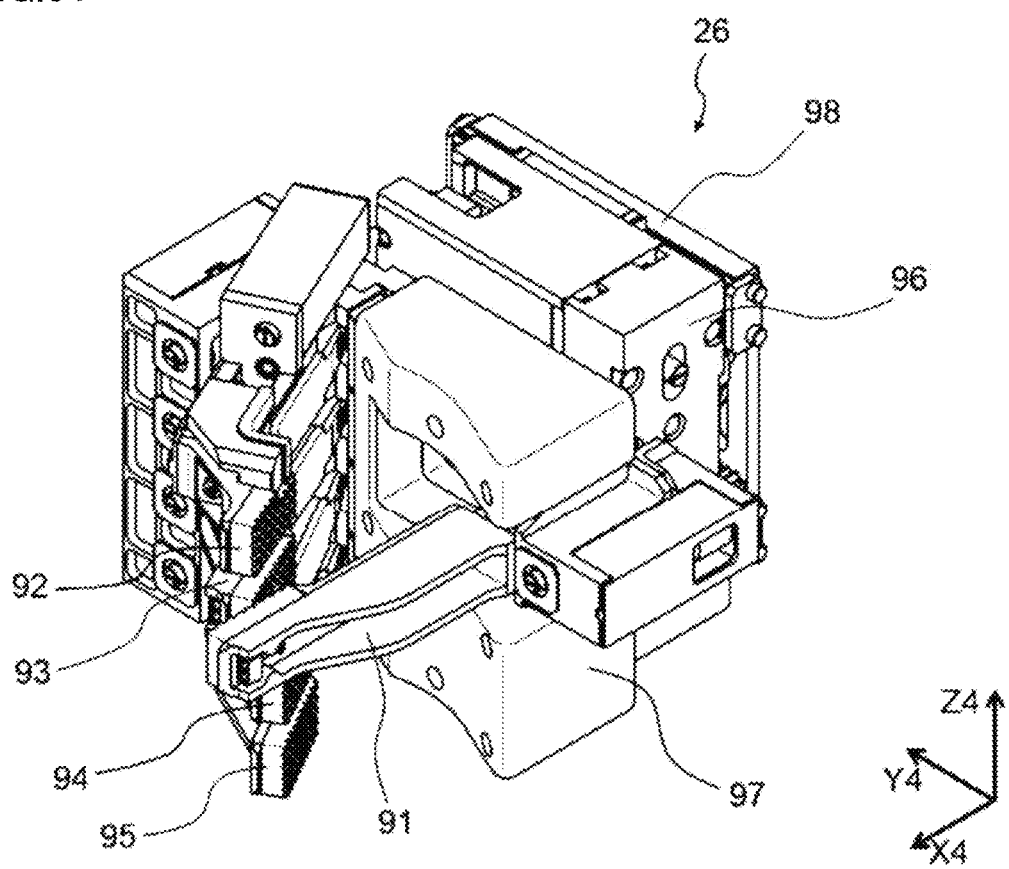
FIG. 51 is a perspective view illustrating the hand included in the robot operated by the robot operation system according to the first embodiment in a changed state 5.
Figure 52:
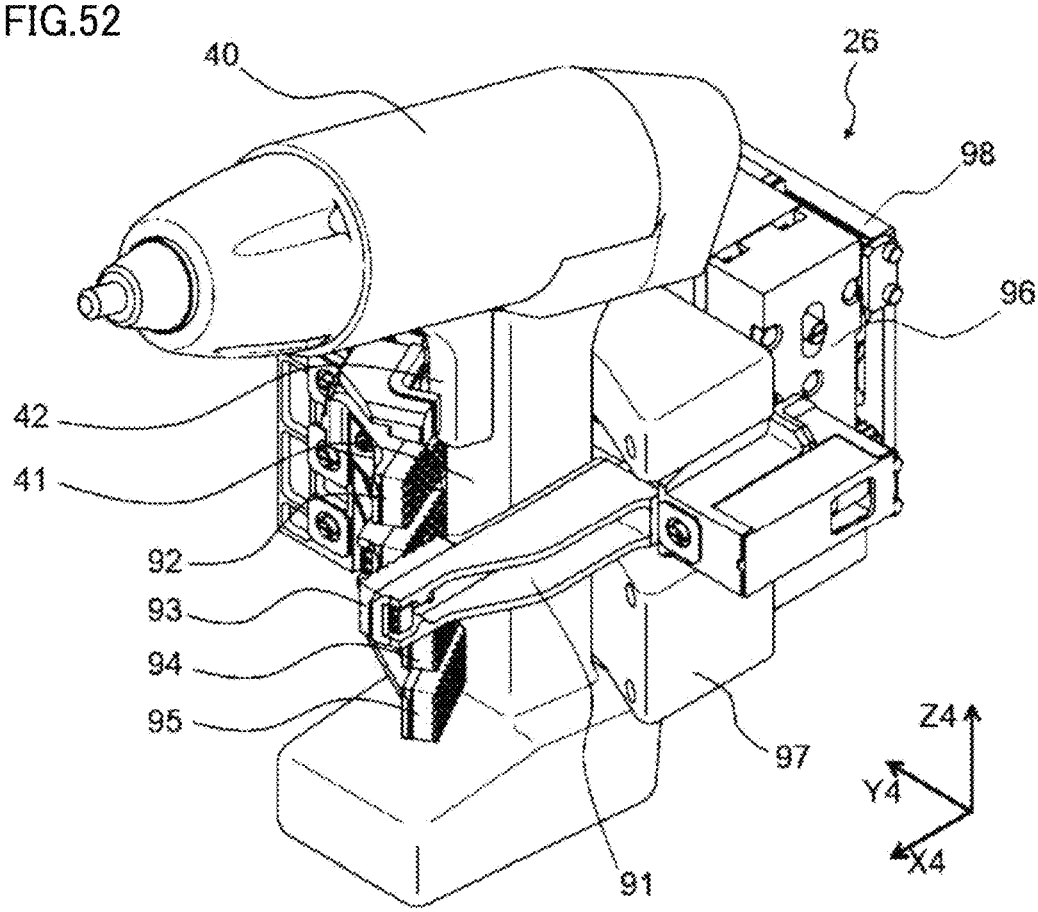
FIG. 52 is a perspective view illustrating an example of use of state 5 in which the hand included in the robot operated by the robot operation system according to the first embodiment is changed.

In state 5 illustrated in FIG. 51, first finger 91 is perpendicular to hand base 98A, second finger 93, third finger 93, fourth finger 94, and fifth finger 95 are inclined, and fingertip 93B of third finger 93 is in obliquely contact with first fingertip 911B. As illustrated in FIG. 52, for example, hand 26 in state 5 is a state to be taken by hand 26 when hand 26 holds a grip of an electric screwdriver. As illustrated in FIG. 52, a grip 41 of an electric screwdriver 40 is held by the five fingers. Furthermore, slide fingertip 92K is moved to the finger base side while slide fingertip 92K of second finger 92 is placed on a lever 42 of electric driver 40, so that lever 42 can be pulled. That is, hand 26 in state 5 can use, for example, electric screwdriver 40.

Figure 53:
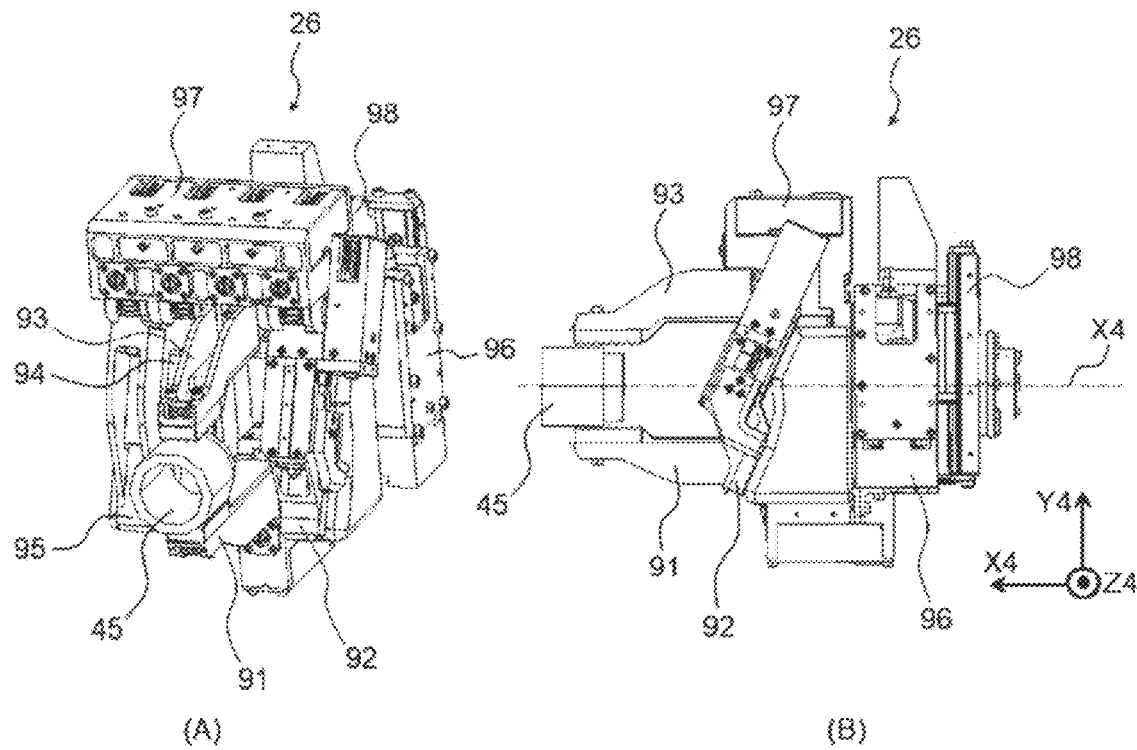
FIG. 53 is a perspective view and a front view illustrating another example of use of the hand included in the robot operated by the robot operation system according to the first embodiment.

FIG. 53 is a view illustrating an example in which hand 26 in state 4 is used. FIG. 53(A) illustrates a right side view, and FIG. 53(B) illustrates a front view. Hand 26 in state 4 holds a regular octagonal cylindrical object 45 sandwiched between fingertip 91B of first finger 91 and fingertip 93B of third finger 93. As illustrated in FIG. 53(B), when first finger 91 and third finger 93 are perpendicular to hand base 98A, fingertip 91B and fingertip 93B are parallel to each other. The rotation axis (X4-axis) that rotates hand base 98A passes through the center of the space between fingertip 91B and fingertip 93B. The center of the space is also a midpoint between the fingertips of first finger 91 and third finger 93. When hand 26 is rotated around the X4-axis, the position of object 45 is rotated without being changed. Hand 26 can rotate object 45 stably and easily.

In arm 5, hand 26 is rotated together with forearm 25 around the forearm rotation axis (AZ6-axis) of elbow joint 28. In wrist joint 29, hand 26 cannot be rotated around the center axis (X the 4-axis) of connection columnar portion 98B. When the AZ6-axis is used instead of the X4-axis, arm 5 can rotate hand 26 around the AZ6-axis (X4-axis). To use AZ-6 axis instead of X4-axis, hand 26 is directed toward the forearm rotation axis (AZ6 axis). That is, the X4-axis is matched with the AZ6-axis. In other words, hand 26 is connected to forearm 25 such that the X4-axis and the AZ6-axis are present on one straight line. Thus, the forearm rotation axis (AZ6-axis) becomes the rotation axis (X4 axis) that allows hand base 98A to be rotated. When forearm 25 is rotated around the forearm rotation axis (AZ6-axis) at elbow joint 26 in this state, hand 26 also is rotated around the X4-axis. In this manner, robot 1 can rotate hand 26 while holding a screwdriver or the like that is a kind of tool. As described above, although the total rotational degrees of freedom of the joints is seven, arm 10 can perform various actions including the action rotating hand 26.

The wrist joint may have three rotational degrees of freedom that enables to be rotatable around the rotation axis passing through hand 26. In this case, even in a state where hand 26 is directed in a direction different from forearm 25, hand 26 can be rotated while holding a screwdriver or the like. When the wrist joint has three rotational degrees of freedom, forearm 25 may not be able to be rotatable around the forearm rotation axis at elbow joint 28. In the case where the wrist joint has three rotational degrees of freedom, a spherical bearing is required to be used or a member holding the biaxial gimbal rotatably is required to be added, and three links that drives the joint are required further. As a result, the structure of the wrist joint with three rotational degrees of freedom becomes more complicated than that of wrist joint 29 with two rotational degrees of freedom.

Hand 26 is operated in three modes of a finger rotation mode, a distance change mode, and a slide mode. In the finger rotation mode, the angle formed by first finger 91 and first finger connection portion 96 can be changed, and the angle formed by each of second finger 92, third finger 93, fourth finger 94, and fifth finger 95 with respect to second finger connection portion 97 can be changed independently. In the distance change mode, the distance between first finger connection portion 96 and second finger connection portion 97 can be changed. In state 2 illustrated in FIG. 48, the distance between first finger connection portion 96 and second finger connection portion 97 cannot be changed. State 2 can be taken when the distance between first finger connection portion 96 and second finger connection portion 97 is the widest. In the slide mode, slide fingertip 92K can be moved to the finger base side. The action modes of hand 26 and a hand operation device 80 can be changed easily by operator 90 through action mode switching pedal 9 with a foot. Therefore, operator 90 can change the action mode of hand 26 and hand operation device 80 while hand 26 maintains the state in which hand 26 holds the object. Operation instructions to move hand 26 other than the mode switching are inputted by operator 90 through hand operation device 80. Hand operation device 80 is held by operator 90 with hand. Hand operation device 80 may be provided with a button, a switch, a lever, or the like that switches the action mode. Hand operation device 80 is described later.

Hand 26 that can be used in a plurality of action modes can be considered as a hybrid robot hand having a plurality of functions. Hand 26 has a simple structure in which the number of movable parts is only seven. Even so, hand 26 can be used in many use forms, such as holding an object in many variations, using a tool, and performing an action such as snow shoveling with the four fingers. Hand 26 can perform many works equivalent to or close to those performed by a human. Only a set of hand 26, hand operation device 80, and the control calculation device can be used. A robot hand system is composed of the set of hand 26, hand operation device 80, and the control calculation device. The robot hand system operates a robot hand.

Hand 26 can hold the object in various forms. For example, the object can be sandwiched and held between first finger 91 and third finger 93. First finger 91, second finger 92, third finger 93, fourth finger 94, and fifth finger 95 can sandwich and hold the object. When the object is held using the five fingers, even in the case where the object is heavy, the rotational moment acting on the object is received by the five fingers in a dispersed manner, and the object is held stably. When the tool or the like is held and wrist joint 29 is rotated for the purpose of the use of the tool, reaction force against the rotational moment can be received by five fingers. First finger 91, second finger 92, third finger 93, fourth finger 94, and fifth finger 95 can be bent appropriately to hold the object in a holding manner suitable for the shape of the object. The usual manipulator can hold the object only with two fingers, but hand 26 can hold the object with two to five fingers. Hand 26 can hold even the object having no flat surface with rotating the five fingers appropriately according to the shape of the object. Operator 90 determines the angle at which the finger is bent and operator 90 operates the five fingers, first finger connection portion 96, and second finger connection portion 97 such that hand 26 is operated to have the appropriate shape. Because the number of fingers and the angle of each finger used in holding the object can be changed according to the object, the variation of the object held by hand 26 is expanded greatly.

Second finger 92 corresponding to the index finger includes slide fingertip 92K in which the fingertip is bent inward and movable to the finger base side. An electric screwdriver, a water discharge nozzle, or the like can be held with five fingers, and slide fingertip 92K is hooked on the lever (moving the lever to the finger base side), so that the electric driver, the water discharge nozzle, and the like can be operated easily. As long as slide fingertip 92K can be hooked, the lever or the like may have any shape. The inventors do not know other robot hands or manipulators that can operate the electric screwdriver, the water discharge nozzle, and the like and can hold an object in a various forms.

Figure 54:
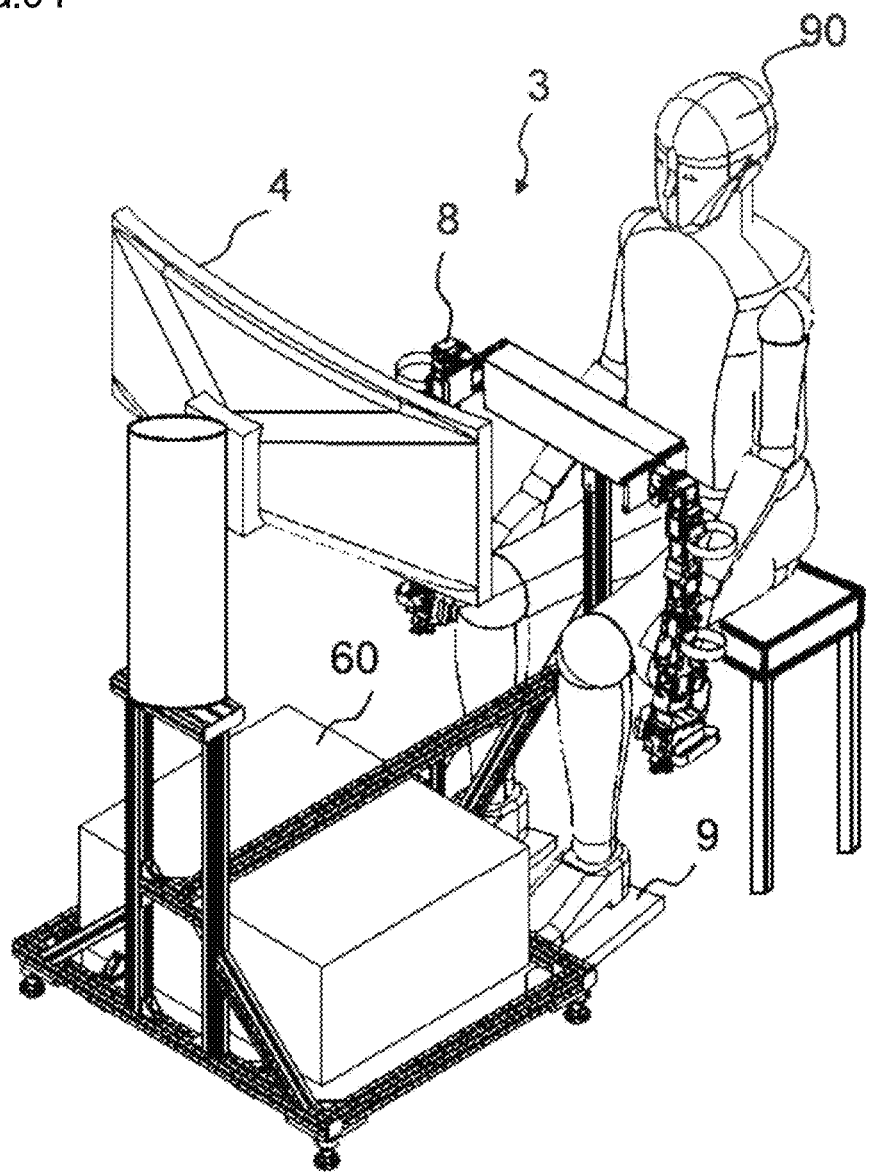
FIG. 54 is a perspective view illustrating an operation device included in the robot operation system according to the first embodiment in a use state.
Figure 55:
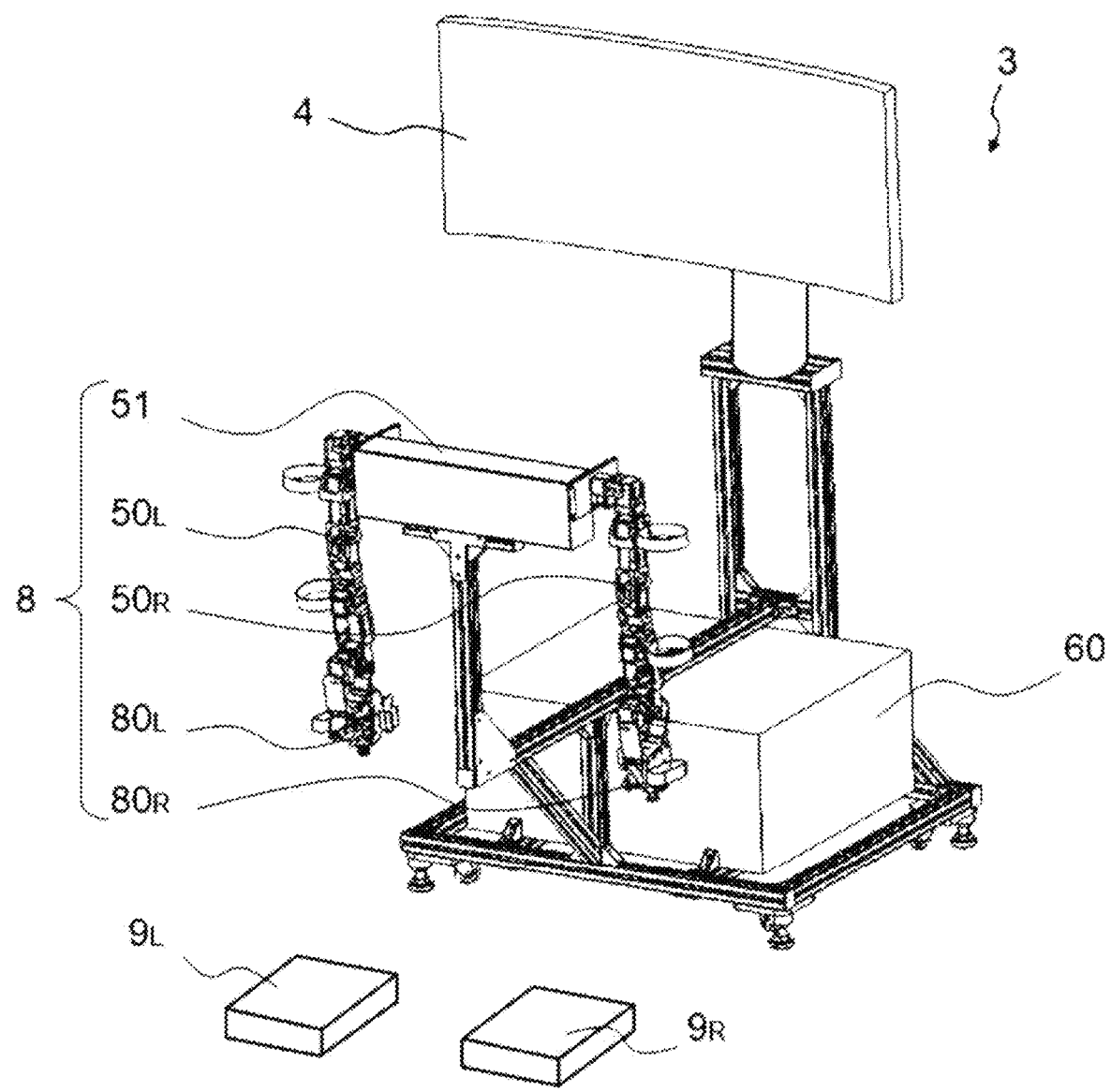
FIG. 55 is a perspective view illustrating the operation device included in the robot operation system according to the first embodiment.

Referring to FIGS. 54 and 55, the structure of operation device 3 is described. FIG. 54 is a perspective view of operation device 3 in a use state. In FIG. 54, operator 90 is also illustrated. FIG. 55 is a perspective view of operation device 3. In FIG. 55, operator 90 is not illustrated. Operation device 3 includes display device 4, upper body input device 8, mode switching pedal 9, foot operation input device 10 (not illustrated), and control calculation device 60. Display device 4 displays an image captured by on-site camera 2, a model image which is an image of a three dimensional model of robot 1 and the surrounding environment viewed from a viewpoint designated by operator 90, and the like. Control calculation device 60 has a function of generating an image to be displayed on display device 4. Display device 4 may be a display device capable of stereoscopic display. The stereoscopic display means that the display is performed so as to be viewed stereoscopically. The stereoscopic display device and other types of display devices may be used in combination.

Upper body input device 8 is a device that inputs the operation instruction to operate left and right arms 5 and left and right hands 26 included in robot 1. Mode switching pedal 9 is used by operator 90 to input switching of the mode in which hand 26 is moved. When operator 90 takes a posture toward upper body input device 8, mode switching pedal 9 existing on the right side of operator 90 is referred to as mode switching pedal $9_R$, and mode switching pedal 9 existing on the left side of operator 90 is referred to as mode switching pedal 9L. Operator 90 steps on mode switching pedal $9_R$ with the right foot and steps on mode switching pedal 9L with the left foot. The foot operation input device is operated by operator 90 with foot in order to operate humanoid 1H that does not include vehicle portion 1 W and arms 5. A device similar to that described in Japanese Patent Application No. 2020-57275 (filing date: Mar. 27, 2020) is used as the foot operation input device. The foot operation input device is not described herein. Japanese Patent Application No. 2020-57275 is published as Japanese Patent Laid-Open No. 2021-49633 on Apr. 1, 2021. The contents of Japanese Patent Application No. 2020-57275 are incorporated herein by reference.

Upper body input device 8 is the same as that described in PCT/JP2021/045527 (filed on Dec. 10, 2021), which is an international patent application. PCT/JP2021/045527 is a patent application claiming priority to Japanese Patent Application No. 2020-205183 (filed on Dec. 10, 2020). The contents of PCT/JP2021/045527 are incorporated in the present application by reference.

The structure of upper body input device 8 is described. Upper body input device 8 includes arm operation devices $50_R$, $50_L$, hand operation devices $80_R$, $80_L$, and a support frame 51. Operator 90 operates right arm 5 by arm operation device $50_R$. Left arm 5 is operated by arm operation device $50_L$. Right hand 26 is operated by hand operation device $80_R$. Left hand 26 is operated by hand operation device $80_L$. Support frame 51 disposes arm operation devices $50_R$, $50_L$ at determined positions. The upper end of arm operation device $50_R$ is connected to the right side of support frame 51. The upper end of arm operation device $50_L$ is connected to the left side of support frame 51. In support frame 51, the upper ends of arm operation devices $50_R$, $50_L$ are disposed in front of the position slightly lower than a chest of operator 90 sitting on a chair. Hand operation device $80_R$ is connected to the tip of arm operation device $50_R$. Hand operation device $80_L$ is connected to the tip of arm operation device $50_L$.

Control calculation device 60 controls right arm 5 based on the operation instruction inputted through right arm operation device $50_R$, and controls left arm 5 based on the operation instruction inputted through left arm operation device $50_L$. Control calculation device 60 controls right hand 26 based on the operation instruction inputted through right hand operation device $80_R$, and controls left hand 26 based on the operation instruction inputted through left hand operation device $80_L$.

Arm operation device 50 uses a mechanical angle input device that is operated by operator 90 with an arm and a hand to change the angle of each measurement joint. The joint included in arm operation device 50 is referred to as measurement joint to be distinguished from the joint included in robot 1. Consequently, arm 5 (robot arm) included in robot 1 can be operated stably without depending on a behavioral characteristic of operator 90. In the arm operation device in which an acceleration sensor or the like is used, a time that can be driven may be limited by a capacity of a battery or the like. In addition, in the acceleration sensor, a minute angular difference may be generated due to the generation of drift or the like. In arm operation device 50, operator 90 inputs the angle of each measurement joint mechanically and controls each joint based on the angle data, so that arm 10 (robot arm) can be operated stably even in the case where arm 10 is operated for a long time.

Arm operation device 50 has a function of maintaining (locking) the angle of each measurement joint. In the case where maintaining the posture of arm operation device 50 corresponding to the posture to be taken by arms 5 becomes a burden on the muscle of operator 90, operator 90 turns on the angle maintaining mechanism (lock mechanism) of each measurement joint included in arm operation device 50. In doing so, operator 90 can rest the arms or the like. Because arm operation device 50 has the total of seven degrees of freedom of joints similar to those of a human, operator 90 can operate arm operation devices 50 and operate arms 5 with a feeling similar to that of moving own arms of operator 90. Arm operation device 50 can reduce the burden on operator 90 that operates arm 5 as compared with the conventional one.

A switch (lock switch) that determines whether to activate the lock mechanism included in arm operation device 50 is provided in hand operation device 80. The lock switch included in hand operation device $80_R$ locks and unlocks arm operation device $50_R$. The lock switch included in hand operation device $80_L$ locks and unlocks arm operation device $50_L$. Both of arm operation devices $50_R$, $50_L$ may be locked and unlocked by operating one of the lock switches included in hand operation device $80_R$, $80_L$. Hand operation device 80 may be configured to be lockable. Locking hand operation device 80 means that the operation instruction is not generated even when a joystick is moved. The lock switch that locks hand operation device 80 may be provided in hand operation device 80, or provided separately from hand operation device 80. When the lock switch that locks hand operation device 80 is provided in hand operation device 80, only the lock switch can be operated even when hand operation device 80 is locked.

The lock switch switches uniformly between a locked state in which the measurement joints of the shoulder, elbow, and wrist are locked so as not to be moved and an unlocked state in which the measurement joints are not locked in arm operation device 50. In the locked state, the angle of each measurement joint included in arm operation device 50 is not changed. In the unlocked state, the angle of each measurement joint included in arm operation device 50 can be changed. The lock switch may be provided separately from hand operation device 80. The lock switch may be operated by operator 90 with a foot.

Figure 56:
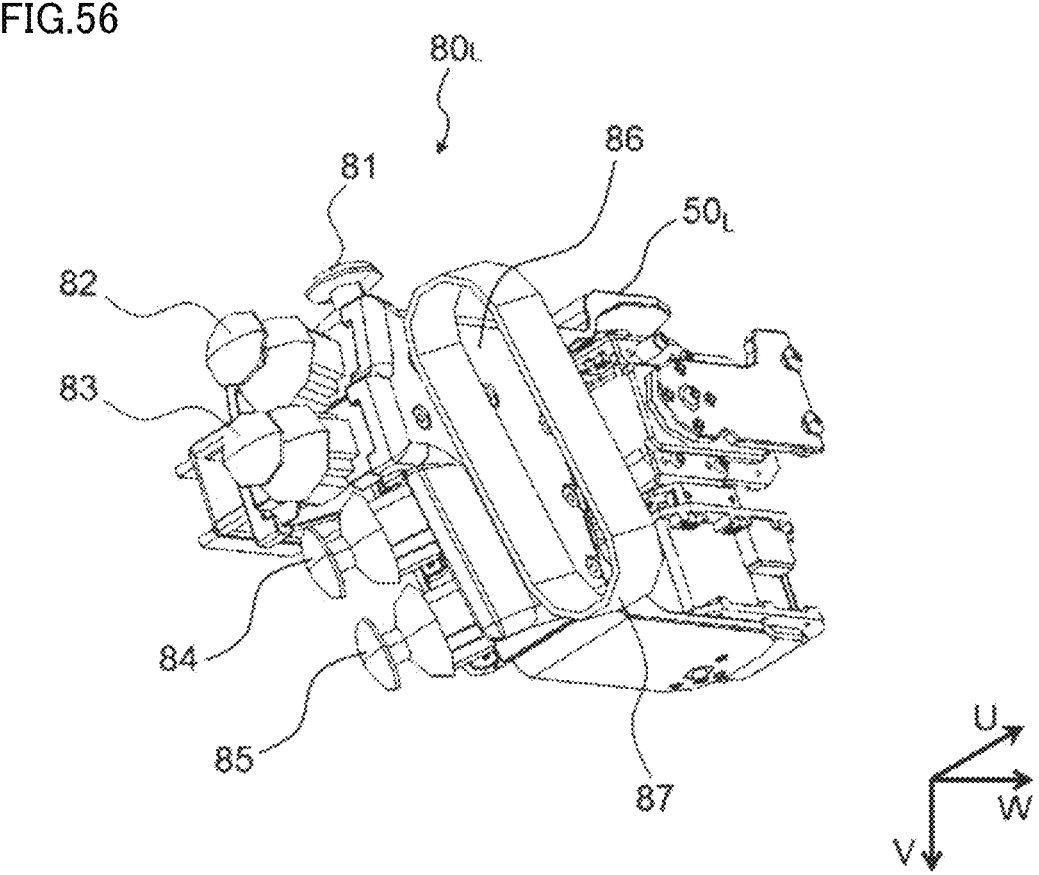
FIG. 56 is a perspective view illustrating a left hand operation device included in the robot operation system according to the first embodiment.
Figure 57:
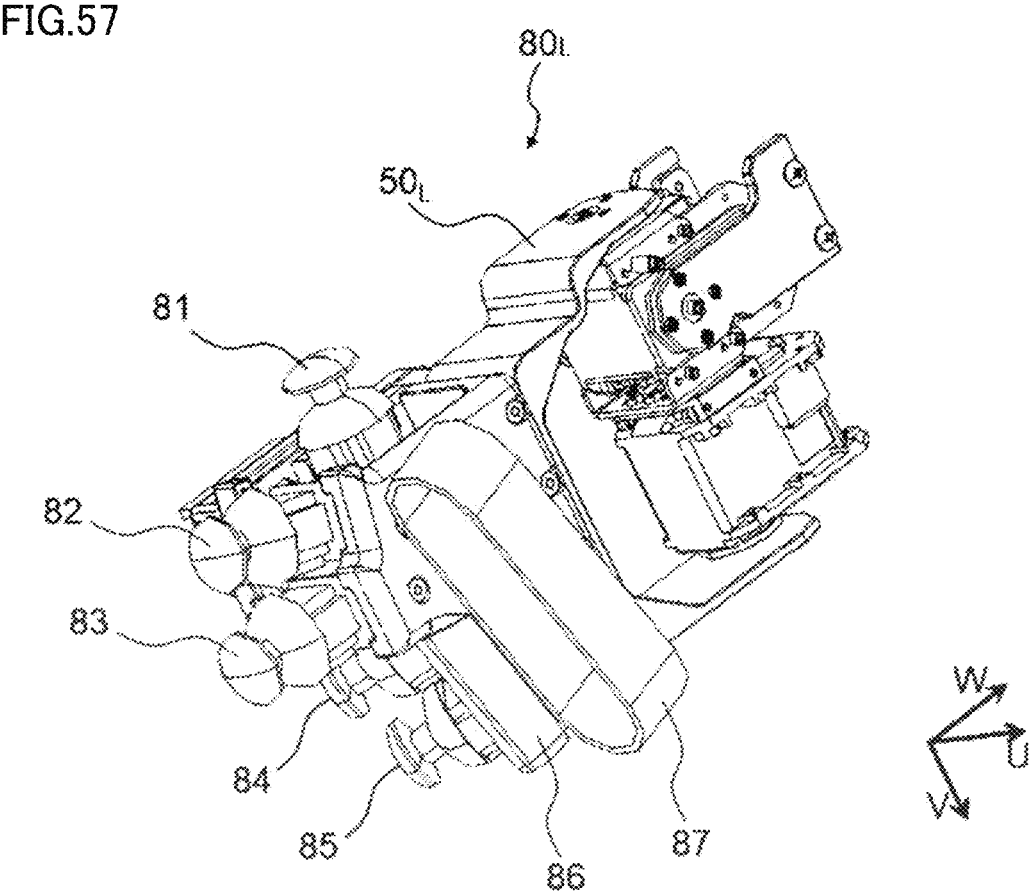
FIG. 57 is another perspective view illustrating the left hand operation device included in the robot operation system according to the first embodiment.
Figure 58:
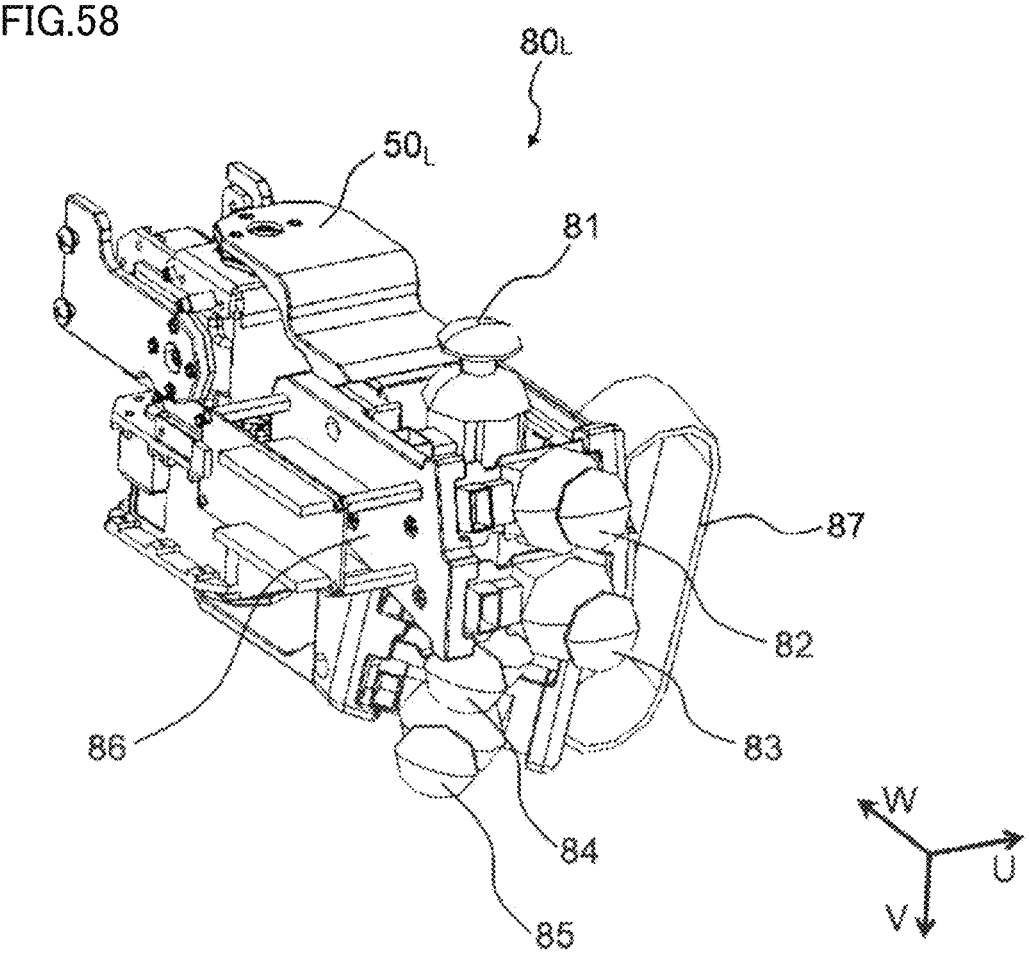
FIG. 58 is still another perspective view illustrating the left hand operation device included in the robot operation system according to the first embodiment.

With reference to FIGS. 56 to 58, the structure of hand operation device 80 is described. Hand operation device $80_R$ and hand operation device $80_L$ have the similar structure. Hand operation device $80_R$ and hand operation device $80_L$ are in a mirror image relationship with each other like a right hand and a left hand of a human. FIG. 56 is a perspective view illustrating hand operation device $80_L$ that is operated by operator 90 with the left hand to move left hand $26_L$. FIGS. 57 and 58 are perspective views illustrating hand operation device $80_L$ as viewed from another direction. In the drawings, the vicinity of the lower end of arm operation device $50_L$ is also illustrated.

FIGS. 56 to 58 also illustrate a UVW coordinate system that is an orthogonal coordinate system defined by using hand operation device 80 as a reference. A U-axis is an axis in the thickness direction of hand operation device 80. The side on which the hand of operator 90 is present is defined as the positive direction of U-axis. A V-axis is an axis in the front-rear direction of hand operation device 80. The positive direction of V-axis is the direction from the front to the rear. A W-axis is an axis in the height direction of hand operation device 80. The positive direction of W-axis is the direction from the bottom to the top.

Hand operation device 80 includes a first joystick 81, a second joystick 82, a third joystick 83, a fourth joystick 84, a fifth joystick 85, a main body portion 86, and a hand mounting portion 87. First joystick 81, second joystick 82, third joystick 83, fourth joystick 84, and fifth joystick 85 correspond to first finger 91, second finger 92, third finger 93, fourth finger 94, and fifth finger 95 included in hand 26, respectively.

Main body portion 86 is a portion to be held by operator 90. Hand mounting portion 87 is provided on the principal surface on the outer side (the back side of the hand of operator 90) of main body portion 86. When operator 90 puts a hand into hand mounting portion 87, main body portion 86 is not separated from the hand of operator 90 even if operator 90 does not hold main body portion 86.

Main body portion 86 has a substantially rectangular shape when viewed from the front, and has a substantially pentagonal shape in which one side of a rectangle is bent slightly by 30 degrees in the middle when viewed from the side surface. In hand operation device 80, the five joysticks are disposed at positions where the joysticks are easily operated with the five fingers of the human hand. Operator 90 operates first joystick 81 with the thumb. Second joystick 82 is operated with the index finger. Third joystick 83 is operated with the middle finger. Fourth joystick 84 is operated with the ring finger. Fifth joystick 85 is operated with the little finger. In the finger rotation mode, when first joystick 81 is operated, first finger 91 is moved. When second joystick 82 is operated, second finger 92 is moved. When third joystick 83 is operated, third finger 93 is moved. When fourth joystick 84 is operated, fourth finger 94 is moved. When fifth joystick 85 is operated, fifth finger 95 is moved. When a plurality of joysticks are operated simultaneously, a plurality of fingers are moved simultaneously.

Mode switching pedals $6_R$, $6_L$ allow operator 90 to switch the action modes of hand 26 and hand operation device 80. When the action mode is switched, hand 26 and hand operation device 80 is operated in the action mode being switched to. Left and right hands 26 are operated in the same action mode. When hand operation device $80_R$ is operated, right hand 26 is moved. When hand operation device 80 is operated, left hand 26 is moved. For example, when neither of mode switching pedals $9_R$ and $9_L$ is stepped, left and right hands 26 can be operated in the finger rotation mode by operating hand operation devices $80_R$, $80_L$. For example, when only mode switching pedal $9_R$ is stepped, left and right hands 26 can be operated in the distance change mode by operating hand operation devices $80_R$, $80_L$. For example, when only mode switching pedal $9_L$ is stepped, left and right hands 26 can be operated in the slide mode by operating hand operation devices $80_R$, $80_L$. For example, when mode switching pedals $9_R$ and $9_L$ are stepped simultaneously, left and right hands 26 can be operated in the finger rotation mode by operating hand operation devices $80_R$, $80_L$.

In hand operation device 80, the joystick is operated to rotate the corresponding finger. When the joystick is not inclined, the finger is not rotated. Operator 90 inclines the joystick until the finger is rotated to an intended angle, and releases the finger from the joystick when the finger is rotated to the intended angle. With such the operation, operator 90 can bring each finger to the intended angle. The finger corresponding to the joystick is rotated at a speed determined to be monotonous un-decrease according to the speed of movement of the joystick. For example, when first joystick 81 is moved fast, first finger 91 is rotated fast. When first joystick 81 is moved slowly, first finger 91 is rotated slowly. The same applies to the fingers corresponding to the other joysticks. Thus, operator 90 can rotate the fingers easily in both the case where the operator wants to move the finger fast and the case where the operator wants to move the finger accurately at the intended angle.

In the distance change mode, for example, first joystick 81 controls first finger connection portion 96 and second finger connection portion 97. When first joystick 81 is inclined in the direction (the positive direction of the U-axis) toward the palm of operator 90 in the right-left direction, first finger connection portion 96 and second finger connection portion 97 are moved in the direction in which the distance between first finger connection portion 96 and second finger connection portion 97 is increased. When first joystick 81 is inclined in the direction (the negative direction of the U-axis) away from the palm of operator 90 in the right-left direction, first finger connection portion 96 and second finger connection portion 97 are moved in the direction in which the distance between first finger connection portion 96 and second finger connection portion 97 is decreased. However, when the rotation angle of first finger 91 is less than or equal to the threshold, first finger connection portion 96 and second finger connection portion 97 are not moved even when first joystick 81 is operated in the distance change mode. The rotation angle of first finger 91 is set to zero degrees when first finger 91 is parallel to the upper surface of first frame 96B. For example, the threshold is determined appropriately such as three degrees.

When the distance between first finger connection portion 96 and second finger connection portion 97 becomes the maximum of the possible range, the distance does not expand any more. When the distance between first finger connection portion 96 and second finger connection portion 97 becomes the minimum of the possible range, the distance is not narrowed any more. In the case where at least one of first finger 91 and third finger 93 is not perpendicular to hand base 98A, when first finger 91 and third finger 93 come into contact with each other, the distance cannot be narrowed any more.

In hand 26, the finger rotation mode and the distance change mode can be switched regardless of the states of the five fingers. After the finger is rotated, the distance can be changed and the finger can be rotated further. After the distance is changed, the finger can be rotated to change the distance further. In the situation where first finger 91 and third finger 93 are in contact with each other, first finger 91 and third finger 93 can only be rotated or moved to the side where the contact is released.

In order to grip an object, for example, operator 90 operates in the following procedure. In the finger rotation mode, the angle of first finger 91 with respect to first finger connection portion 96 is set to an intended angle. The angle of each of second finger 92, third finger 93, fourth finger 94, and fifth finger 95 with respect to second finger connection portion 97 is set to the intended angle. Then, in the distance change mode, first finger connection portion 96 and second finger connection portion 97 are moved until the distance between first finger connection portion 96 and second finger connection portion 97 is an intended distance. Returning to the finger rotation mode, and the angles of first finger 91, second finger 92, third finger 93, fourth finger 94, and fifth finger 95 are adjusted finely. As required, the distance between first finger connection portion 96 and second finger connection portion 97 is changed further in the distance change mode.

In some objects, first, first finger connection portion 96 and second finger connection portion 97 are moved in the distance changing mode until the distance between first finger connection portion 96 and second finger connection portion 97 becomes an intended distance. Then, in the finger rotation mode, first finger 91 is set to an intended angle with respect to first finger connection portion 96. Each of second finger 92, third finger 93, fourth finger 94, and fifth finger 95 is set to an intended angle with respect to second finger connection portion 97.

Hand 26 can hold an object with two fingers of first finger 91 and third finger 93. Hand 26 can hold an object with three to five fingers including at least one of second finger 92, fourth finger 94, and fifth finger 95.

In the slide mode, for example, second joystick 82 controls the movement of slide fingertip 92K. When second joystick 82 is inclined in the direction (the negative direction of the U-axis) away from the palm of operator 90 in the right-left direction, slide fingertip 92K is moved in the direction toward palm flesh portion 97E. When second joystick 82 is inclined in the direction (the positive direction of the U-axis) toward the palm of operator 90 in the right-left direction, slide fingertip 92K is moved in the direction away from palm flesh portion 97E. While second joystick 82 is being inclined, slide fingertip 92K is moved. When the force is no longer applied and second joystick 82 returns to the perpendicular position, movement of slide fingertip 92K is stopped. The moving speed of slide fingertip 92K is changed according to the speed at which second joystick 82 is inclined. According to the speed of inclination, the speed at which slide fingertip 92K is moved is determined to be monotonous un-decrease. When second joystick 82 is inclined fast, slide fingertip 92K is moved fast. When second joystick 82 is inclined slowly, slide fingertip 92K is moved slowly.

Because hand 26 is also operated in the slide mode, the electric screwdriver, the water discharge nozzle, or the like can be operated by moving slide fingertip 92K toward the finger base side in a state where the grip of the electric screwdriver, the water discharge nozzle, or the like is held and slide fingertip 92K is hooked on an operation lever. When the electric screwdriver, the water discharge nozzle, or the like is operated, replacement of hand 26 is not required.

By using the joysticks to operate the fingers included in hand 26, the burden on operator 90 can be reduced as compared with the conventional one. The use of the joysticks facilitates keeping of the state in which hand 26 holds the object. When the joystick is not operated, the finger can keep the state at that time. For this reason, operator 90 can rest hands and nerves in the middle of the operation. By using the joysticks, operator 90 can perform an operation such as hold of the object or release of the object with the sense of on and off control.

The operation is described. Robot 1 is moved to a work place in the stored posture. When robot 1 arrives at the work place, operator 90 operates body position changing mechanism 1B and arms 5 to move hands 26 to the vicinity of the object to be worked on. Hands 26 and arms 5 are operated to cause robot 1 to handle the object.

When the work at a place is finished and robot 1 is moved to another work place, robot 1 is moved to the next work place in the stored posture. Thus, the work at all the places is performed. After all the work is finished, robot 1 is moved to a storage site in the stored posture.

Even when an obstacle is present between arm connector 19 and hand 26, robot 1 can handle the object while avoiding the obstacle by bending two arms 5 appropriately. Even when the obstacle is located on the side closer than arm connector 19 between the object to be handled and robot 1, robot 1 can handle the object while avoiding the obstacle. In this case, robot 1 can handle the object by directing the direction in which body 12 extends in a direction in which no obstacle is present and directing two arms 5 to the object. It is required that the object is present within the reach of arms 5 in a posture in which body 12 is directed in a direction in which no obstacle is present.

Robot 1 can make the height of the robot lower than that of the conventional one in the posture (stored posture) in which the height of the robot is lowered. In the robot of PTL 5, a body support arm and the body support portion are required to be disposed so as to be overlapped each other in the up-down direction, and it is difficult to reduce the height of the robot.

In the robot and the robot operation system according to the present disclosure, even in a situation where an unexpected event is occurred, the remote control can be performed by determination of the operator such that the robot can perform an action suitable for the situation. In various environments, an autonomous robot to which an artificial intelligence technology is applied cannot cope with the situation, the robot operation system according to the present disclosure enables the operator to give a flexible operation instruction. The robot operation system according to the present disclosure can reduce the burden on the operator to operate the robot as compared with the conventional one.

The robot and the robot operation system according to the present disclosure are applied to a very wide variety of applications. For example, the following applications are conceivable examples.

A field where human alternative work is required in a hazardous work related to a human life.

A field requiring labor saving. Care field, agricultural field, and the like.

A remote operation business field for implementing telework.

For example, the robot and the robot operation system according to the present disclosure is expected to be used for the following works.

Work of handling landmines, explosives, and the like.

Dangerous work related to human life, such as in response to terrorism.

Work at a nuclear power plant where an accident has occurred.

Work in a working environment where long-time work is impossible with chemical substances or the like. Coating work and the like.

Work of supporting or assisting a human at a nursing care site.

Various works in agricultural work.

Security and monitoring work. For example, security work in an unmanned facility for 24 hours.

Any work illustrated in the above example is work that requires determination according to the situation at that time, and cannot be handled only by the robot. Even when the robot has artificial intelligence, it is difficult for the current technology to cope with the work only by the robot. In these works, the work contents cannot be determined in advance. These works are works in which unpredictable situations are occurred and flexible determination is required. In order to enable the robot to perform various tasks being appropriate for the situation and depending on the situation, the remote control using human determination is required. It would be greatly beneficial for society when a human could operate the robot remotely even up to a variety of fine tasks using both hands. The robot and the robot operation system according to the present disclosure enable a human to operate the robot remotely for a wide variety of task including fine tasks using both hands.

The robot operation system can also be used in the field of security of important facilities. The present disclosure can be applied to, for example, 24-hour security in an unmanned facility such as an unmanned communication station and an unmanned station. When required, the remote control of the robot by a human can improve, for example, the quality of work in monitoring and security services.

The robot may move with ordinary wheels instead of the crawler. The vehicle portion may be any vehicle portion as long as the vehicle portion moves by rotating the wheels. Humanoid may be any humanoid as long as it includes two arms and a body to which the two arms are connected. Any robot may be used as long as it includes a vehicle portion, a body, and a body position changing mechanism that supports the body such that the position of the body with respect to the vehicle portion can be changed. The body position changing mechanism may not include an expansion mechanism. When no expansion mechanism is provided, the first link supports the body directly.

Modifications of the embodiment, omission of some components, and free combinations of modifications and omissions are possible.

Although the preferred embodiments and the like are described in detail above, the present disclosure is not limited to the above-described embodiments and the like, and various modifications and substitutions can be made to the above-described embodiments and the like without departing from the scope recited in the claims.

Hereinafter, various aspects of the present disclosure is described collectively as supplementary notes.

(Supplementary Note 1)

A robot including:

two arms;

a body to which the two arms are connected;

a vehicle portion to move by rotation of wheels; and a body position changing mechanism to support the body such that a position of the body with respect to the vehicle portion is changeable, in which the body position changing mechanism includes an elevation angle changing mechanism to support the body such that an elevation angle, which is an angle formed by a vehicle portion reference plane, which is a plane perpendicular to an azimuth axis intersecting the vehicle portion, and a direction in which the body extends, is changeable, and an azimuth angle changing mechanism to support the elevation angle changing mechanism rotatably around the azimuth axis, the azimuth angle changing mechanism being provided in the vehicle portion, and the elevation angle changing mechanism includes a base supported by the azimuth angle changing mechanism, a moving portion to be moved along a straight line parallel to the vehicle portion reference plane on an upper side of the base, a first link to support the body, the first link having a lower end connected to the moving portion rotatably and extending in a direction which forms the elevation angle with respect to the vehicle portion reference plane, a second link having an upper end connected to the first link rotatably, and a link lower end support portion to which a lower end of the second link is connected rotatably, the link lower end support portion being provided in the base.

(Supplementary Note 2)

The robot according to Supplementary Note 1, in which the link lower end support portion is provided below a straight line along which the moving portion is moved.

(Supplementary Note 3)

The robot according to Supplementary Note 1 or Supplementary Note 2, in which a minimum elevation angle, which is a minimum value of the elevation angle in each state in which the moving portion is moved in a movable range which is a range in which the moving portion can be moved, is less than or equal to a predetermined minimum allowable limit value of elevation angle, a maximum elevation angle, which is a maximum value of the elevation angle in each state in which the moving portion is moved in the movable range, is greater than or equal to a predetermined maximum allowable limit value of elevation angle, and a minimum robot height, which is a minimum value of a robot height which is a distance between the vehicle portion reference plane and a predetermined point of the body in each state in which the moving portion is moved in the movable range, is less than or equal to a predetermined allowable limit value of robot height.

(Supplementary Note 4)

The robot according to Supplementary Note 3, in which a distance between a connection point with the moving portion in the first link and a connection point with the second link in the first link, a distance between a connection point with the first link in second link and the link lower end support portion, a difference in height between a straight line along which the moving portion is moved and the link lower end support portion, and a distance between the link lower end support portion and the azimuth axis are predetermined so that the minimum robot height is minimized in the movable range which is predetermined.

(Supplementary Note 5)

The robot according to any one of Supplementary Notes 1 to 4, further including:

a body support portion to support the body, the body support portion being supported by the first link; and an expansion mechanism to enable the body support portion to be moved along the first link.

(Supplementary Note 6)

The robot according to any one of Supplementary Notes 1 to 5, further including:

a camera that is provided on an upper side of the body;

a neck to support the camera such that a visual line elevation angle, which is an angle formed by a body reference plane perpendicular to a head rotation axis and an optical axis of the camera, is changeable, the neck being supported by the body rotatably around the head rotation axis intersecting with the body;

a head rotation portion to connect the neck to the body rotatably around the head rotation axis; and a visual line elevation angle changer to connect the camera to the neck such that the visual line elevation angle is changeable.

(Supplementary Note 7)

The robot according to Supplementary Note 6, further including a visual line linked controller to control the visual line elevation angle changer so as to change the visual line elevation angle by a second angle having a same absolute value as a first angle and a different sign from the first angle when the elevation angle changing mechanism changes the elevation angle by the first angle.

(Supplementary Note 8)

The robot according to any one of Supplementary Notes 1 to 6, further including:

two arm base joints to connect the two arms respectively to the body rotatably around an arm base rotation axis parallel to a body reference plane; and an arm linked controller to control the arm base joint so as to change an arm base rotation angle, which is an angle formed by a direction in which the arm extends and the body reference plane, by a second angle having a same absolute value as a first angle and a different sign from the first angle when the elevation angle changing mechanism changes the elevation angle by the first angle.

(Supplementary Note 9)

The robot according to Supplementary Note 7, further including:

two arm base joints to connect the two arms respectively to the body rotatably around an arm base rotation axis parallel to the body reference plane; and an arm linked controller to control the arm base joint so as to change an arm base rotation angle, which is an angle formed by a direction in which the arm extends and the body reference plane, by the second angle when the elevation angle changing mechanism changes the elevation angle by the first angle.

REFERENCE SIGNS LIST

100: robot operation system, 1: crawler mobile robot (robot), 1 W: vehicle portion, 1WA: side cover, 1H: humanoid, 1B: body position changing mechanism, 2, $2_R$, $2_L$, 2c: on-site camera, $2_R$: right-eye camera, $2_L$: left-eye camera, 2c: wide-angle camera, 3: operation device, 4: display device, 5: arm (robot arm), 6: wireless communication device, 7: battery, 8: upper body input device, 9, $9_R$, $9_L$: mode switching pedal, 11: head, 11A: head cover, 11B: body connector, 11C: neck, 11D: camera holder, 11E: elevation angle shaft bearing, 11F: pulley (head rotation portion), 11G: drive pulley (head rotation portion), 11H: drive belt (head rotation portion), 11J: motor (head rotation portion), 11K: pulley (visual line elevation angle changer), 11L: drive pulley (visual line elevation angle changer), 11M: drive belt (visual line elevation angle changer), 11N: motor 11 (visual line elevation angle changer), 12: body, 13, 13R, 13L: crawler moving portion, 15: crawler, 16: vehicle connector (azimuth angle changing mechanism), 16A: vehicle-side fixing portion, 16B: vehicle-side pulley, 16C: rotation-side base, 16D: slide mechanism base (base), 16E: drive mechanism container, 16G: drive belt, 16H: motor, 16J: drive gear, 16K: moving-side pulley, 17: slide mechanism (elevation angle changing mechanism), 17A: first link, 17B: slide-moving member (moving portion), 17C: second link, 17CA: link portion, 17CB: connector, 17D: rail, 17E: rail holder, 17F: screw rod, 17G: nut, 17H: motor, 17J: drive mechanism container, 17K: protective plate, 18: expansion mechanism, 18A: expansion moving member (body support portion), 18B: rail, 18C: rail holder, 18D: screw rod, 18E: nut, 18F: motor, 18G: drive mechanism container, 18H: protective plate, 18J: cable, 19: arm connector, 19A: arm connection structure, 19B: arm rotation portion, 19D: motor, 19E: worm wheel, 19F: worm, 20: control board container, 22: arm base, 24: upper arm, 24A: joint connected portion, 24B: intermediate cylindrical portion, 24C: lid, 24D: lower column, 25: forearm, 25A: rotation shaft connected portion, 25B: forearm base, 25C: forearm bone, 25D: actuator structure, 25E: screw rod holder, 25F: screw rod holder, 26: hand (robot hand), 27: shoulder joint, 27A: shoulder joint structure, 27C: motor installation portion, 27D: rotation shaft member, 27E: opening, 28: elbow joint, 28A: rotation shaft holding yoke, 28B: rotation shaft member, 28C: worm wheel, 28D: worm, 28E: gear portion, 28F: motor, 28G: gear portion, 28J: gear cover, 29: wrist joint, 29A: T-shaped member, 29B: T-shaped member holding yoke, 29C: T-shaped member holder, 29D: wrist base, 29E: bearing, 29F: bearing, 35: forearm outside actuator, 35L: forearm outside link, 35M: motor, 35A: screw rod, 35B: moving member, 35C: rail, 35D: link, 35E: motor installation plate, 35F: motor, 35G: belt, 35H: pulley, 35J: pulley, 36: forearm inside actuator, 36L: forearm inside link, 36M: motor, 36A: screw rod, 36B: moving member, 36C: rail, 36D: link, 36E: motor installation plate, 36F: motor, 36G: belt, 36H: pulley, 36J: pulley, 40: electric screwdriver, 41: grip, 42: lever, 45: object, 50, 50R, 50L: arm operation device, 51: support frame, 60: control calculation device, 61: CPU, 62: memory, 80, 80R, 80L: hand operation device, 90: operator (person who operates), 91: first finger, 92: second finger, 93: third finger, 94: fourth finger, 95: fifth finger, 91A, 92A, 93A, 94A, 95A: finger body, 91B, 92B, 93B, 94B, 95B: fingertip, 91C, 92C, 93C, 94C, 95C: finger inside cover, 91D, 92D, 93D, 94D, 95D: finger joint, 91DA, 92DA, 93DA, 94DA, 95DA: yoke, 91 DB, 92 DB, 93 DB, 94 DB, 95 DB: dactylus rotation axis, 91E, 92E, 93E, 94E, 95E: worm wheel, 92F, 93F, 94F, 95F: worm, 94GF, 95F: motor, 91H: distance sensor (first distance sensor), 93H: distance sensor (second distance sensor), 91J, 93J: opening, 92K: slide fingertip (hook portion), 92L: motor container, 92N: screw rod (hook portion moving portion), 92P: opening (hook portion moving portion), 96: first finger connection portion, 96A: first rack (finger moving portion), 96B: first frame, 96C: first holder (finger moving portion), 96D: first finger connection frame, 97: second finger connection portion, 97A: second rack (finger moving portion), 97B: second frame, 97C: second holder (finger moving portion), 97D: second finger connection frame, 97E: palm flesh portion, 97F: notch, 98: wrist connector, 98A: hand base, 98B: connection columnar portion, 98C: first rail (finger moving portion), 98D: second rail (finger moving portion), 98E: pinion (finger moving portion), J1: vehicle-side link attaching unit (link lower end support portion), J2: moving member attaching unit, J3: moving-side link attaching unit, J11: forearm outside link attaching unit, J12: forearm inside link attaching unit, J13: hand outside link attaching unit, J13A: rotation yoke, J13B: bearing, J13C: bearing, J14: hand inside link attaching unit, J14A: rotation yoke, J14B: bearing, J14C: bearing.

The invention claimed is:

1. A robot comprising:
   two arms;
   a body to which the two arms are connected;
   a vehicle portion to move by rotation of wheels; and
   a body position changing mechanism to support the body such that a position of the body with respect to the vehicle portion is changeable, wherein
   the body position changing mechanism includes
      an elevation angle changing mechanism to support the body such that an elevation angle, which is an angle formed by a vehicle portion reference plane, which is a plane perpendicular to an azimuth axis intersecting the vehicle portion, and a direction in which the body extends, is changeable, and a vehicle connector to support the elevation angle changing mechanism rotatably around the azimuth axis, the vehicle connector being provided in the vehicle portion, and the elevation angle changing mechanism includes a base supported by the vehicle connector, a moving slide to be moved along a straight line parallel to the vehicle portion reference plane on an upper side of the base, a first link to support the body, the first link having a lower end connected to the moving slide rotatably and extending in a direction which forms the elevation angle with respect to the vehicle portion reference plane, a second link having an upper end connected to the first link rotatably, and a link lower end support base to which a lower end of the second link is connected rotatably, the link lower end support base being provided in the base.

2. The robot according to claim 1, wherein the link lower end support base is provided below a straight line along which the moving slide is moved.

3. The robot according to claim 2, wherein a minimum elevation angle, which is a minimum value of the elevation angle in each state in which the moving slide is moved in a movable range which is a range in which the moving slide can be moved, is less than or equal to a predetermined minimum allowable limit value of elevation angle, a maximum elevation angle, which is a maximum value of the elevation angle in each state in which the moving slide is moved in the movable range, is greater than or equal to a predetermined maximum allowable limit value of elevation angle, and a minimum robot height, which is a minimum value of a robot height which is a distance between the vehicle portion reference plane and a predetermined point of the body in each state in which the moving slide is moved in the movable range, is less than or equal to a predetermined allowable limit value of robot height.

4. The robot according to claim 3, wherein a distance between a connection point with the moving slide in the first link and a connection point with the second link in the first link, a distance between a connection point with the first link in the second link and the link lower end support base, a difference in height between the straight line along which the moving slide is moved and the link lower end support base, and a distance between the link lower end support base and the azimuth axis are predetermined so that the minimum robot height is minimized in the movable range which is predetermined.

5. The robot according to claim 4, further comprising:

a body support portion having a shape of a square cylinder and configured to support the body, the body support portion being supported by the first link; and an expansion mechanism including an expansion motor to enable the body support portion to be moved along the first link.

6. The robot according to claim 1, wherein a minimum elevation angle, which is a minimum value of the elevation angle in each state in which the moving slide is moved in a movable range which is a range in which the moving slide can be moved, is less than or equal to a predetermined minimum allowable limit value of elevation angle, a maximum elevation angle, which is a maximum value of the elevation angle in each state in which the moving slide is moved in the movable range, is greater than or equal to a predetermined maximum allowable limit value of elevation angle, and a minimum robot height, which is a minimum value of a robot height which is a distance between the vehicle portion reference plane and a predetermined point of the body in each state in which the moving slide is moved in the movable range, is less than or equal to a predetermined allowable limit value of robot height.

7. The robot according to claim 6, wherein a distance between a connection point with the moving slide in the first link and a connection point with the second link in the first link, a distance between a connection point with the first link in the second link and the link lower end support base, a difference in height between a straight line along which the moving slide is moved and the link lower end support base, and a distance between the link lower end support base and the azimuth axis are predetermined so that the minimum robot height is minimized in the movable range which is predetermined.

8. The robot according to claim 1, further comprising:

a body support portion having a shape of a square cylinder and configured to support the body, the body support portion being supported by the first link; and an expansion mechanism including an expansion motor to enable the body support portion to be moved along the first link.

9. The robot according to claim 8, further comprising:

a camera that is provided on an upper side of the body;

a neck to support the camera such that a visual line elevation angle, which is an angle formed by a body reference plane perpendicular to a head rotation axis and an optical axis of the camera, is changeable, the neck being supported by the body rotatably around the head rotation axis intersecting with the body;

a head rotation portion including a head rotation motor and configured to connect the neck to the body rotatably around the head rotation axis; and a visual line elevation angle changer including a visual line motor and configured to connect the camera to the neck such that the visual line elevation angle is changeable.

10. The robot according to claim 9, further comprising a visual line linked controller to control the visual line elevation angle changer so as to change the visual line elevation angle by a second angle having a same absolute value as a first angle and a different sign from the first angle when the elevation angle changing mechanism changes the elevation angle by the first angle.

11. The robot according to claim 10, further comprising:

two arm base joints to connect the two arms respectively to the body rotatably around an arm base rotation axis parallel to the body reference plane; and an arm linked controller to control the arm base joint so as to change an arm base rotation angle, which is an angle formed by a direction in which the arm extends and the body reference plane, by the second angle when the elevation angle changing mechanism changes the elevation angle by the first angle.

12. The robot according to claim 9, further comprising:

two arm base joints to connect the two arms respectively to the body rotatably around an arm base rotation axis parallel to the body reference plane; and an arm linked controller to control the arm base joint so as to change an arm base rotation angle, which is an angle formed by a direction in which the arm extends and the body reference plane, by a second angle having a same absolute value as a first angle and a different sign from the first angle when the elevation angle changing mechanism changes the elevation angle by the first angle.

13. The robot according to claim 8, further comprising:
two arm base joints to connect the two arms respectively to the body rotatably around an arm base rotation axis parallel to a body reference plane; and
an arm linked controller to control the arm base joint so as to change an arm base rotation angle, which is an angle formed by a direction in which the arm extends and the body reference plane, by a second angle having a same absolute value as a first angle and a different sign from the first angle when the elevation angle changing mechanism changes the elevation angle by the first angle.

14. The robot according to claim 1, further comprising:
a camera that is provided on an upper side of the body;
a neck to support the camera such that a visual line elevation angle, which is an angle formed by a body reference plane perpendicular to a head rotation axis and an optical axis of the camera, is changeable, the neck being supported by the body rotatably around the head rotation axis intersecting with the body;
a head rotation portion including a head rotation motor and configured to connect the neck to the body rotatably around the head rotation axis; and
a visual line elevation angle changer including a visual line motor and configured to connect the camera to the neck such that the visual line elevation angle is changeable.

15. The robot according to claim 14, further comprising a visual line linked controller to control the visual line elevation angle changer so as to change the visual line elevation angle by a second angle having a same absolute value as a first angle and a different sign from the first angle when the elevation angle changing mechanism changes the elevation angle by the first angle.

16. The robot according to claim 15, further comprising:
two arm base joints to connect the two arms respectively to the body rotatably around an arm base rotation axis parallel to the body reference plane; and
an arm linked controller to control the arm base joint so as to change an arm base rotation angle, which is an angle formed by a direction in which the arm extends and the body reference plane, by the second angle when the elevation angle changing mechanism changes the elevation angle by the first angle.

17. The robot according to claim 14, further comprising:
two arm base joints to connect the two arms respectively to the body rotatably around an arm base rotation axis parallel to a body reference plane; and
an arm linked controller to control the arm base joint so as to change an arm base rotation angle, which is an angle formed by a direction in which the arm extends and the body reference plane, by a second angle having a same absolute value as a first angle and a different sign from the first angle when the elevation angle changing mechanism changes the elevation angle by the first angle.

18. The robot according to claim 1, further comprising:
two arm base joints to connect the two arms respectively to the body rotatably around an arm base rotation axis parallel to a body reference plane; and
an arm linked controller to control the arm base joint so as to change an arm base rotation angle, which is an angle formed by a direction in which the arm extends and the body reference plane, by a second angle having a same absolute value as a first angle and a different sign from the first angle when the elevation angle changing mechanism changes the elevation angle by the first angle.

19. A robot comprising:
two arms;
a body to which the two arms are connected;
a vehicle portion to move by rotation of wheels; and
a body position changing mechanism to support the body such that a position of the body with respect to the vehicle portion is changeable, wherein
the body position changing mechanism includes
an elevation angle changing mechanism to support the body such that an elevation angle, which is an angle formed by a vehicle portion reference plane, which is a plane perpendicular to an azimuth axis intersecting the vehicle portion, and a direction in which the body extends, is changeable, and
an azimuth angle changing mechanism to support the elevation angle changing mechanism rotatably around the azimuth axis, the azimuth angle changing mechanism being provided in the vehicle portion, and the elevation angle changing mechanism includes
a base supported by the azimuth angle changing mechanism,
a moving portion to be moved along a straight line parallel to the vehicle portion reference plane on an upper side of the base,
a first link to support the body, the first link having a lower end connected to the moving portion rotatably and extending in a direction which forms the elevation angle with respect to the vehicle portion reference plane,
a second link having an upper end connected to the first link rotatably, and
a link lower end support portion to which a lower end of the second link is connected rotatably, the link lower end support portion being provided in the base.

* * * * *